United States Patent
Hasegawa

(10) Patent No.: US 6,383,412 B1
(45) Date of Patent: May 7, 2002

(54) RARE EARTH ELEMENT-ACTIVATED, ALKALINE EARTH METAL FLUOROHALIDE BASED STIMULABLE PHOSPHOR, PROCESS AND APPARATUS FOR THE PREPARATION THEREOF, AND RADIOGRAPHIC IMAGE CONVERSION PANEL

(75) Inventor: Kazuhiro Hasegawa, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/472,076

(22) Filed: Dec. 23, 1999

(30) Foreign Application Priority Data

| | | |
|---|---|---|
| Dec. 25, 1998 | (JP) | 10-369769 |
| Dec. 25, 1998 | (JP) | 10-369770 |
| Dec. 25, 1998 | (JP) | 10-370243 |
| Dec. 25, 1998 | (JP) | 10-370472 |

(51) Int. Cl.$^7$ .................. C09K 11/08; C09K 11/61
(52) U.S. Cl. .................................. 252/301.4 H
(58) Field of Search ................... 252/301.4 H

(56) References Cited

U.S. PATENT DOCUMENTS 5,534,191 A * 7/1996 Hasegawa et al. ... 252/301.4 H
5,895,604 A   4/1999 Funabashi et al. ..... 252/301.44
5,904,995 A * 5/1999 Maezawa et al. ..... 252/301.4 R

FOREIGN PATENT DOCUMENTS

| | | | |
|---|---|---|---|
| EP | 0 144 772 | 6/1985 | |
| JP | 7-233369 | 9/1995 | ........... C09K/11/61 |
| JP | 10-140148 | 5/1998 | ........... C09K/11/55 |
| JP | 10-147778 | 6/1998 | ........... C09K/11/61 |
| JP | 10-195431 | 7/1998 | ........... C09K/11/61 |

* cited by examiner

Primary Examiner—C. Melissa Koslow
(74) Attorney, Agent, or Firm—Sughrue Mion, PLLC

(57) ABSTRACT

Disclosed are a rare earth element-activated, alkaline earth metal fluorohalide based stimulable phosphor capable of producing high-quality images having a very high sharpness and exhibiting high sensitivity and erasure characteristics when used in radiographic image recording and reproduction, a process for preparing the phosphor, an apparatus for the preparation thereof, and a radiographic image conversion panel using the phosphor. More specifically, disclosed are a rare earth element-activated, alkaline earth metal fluorohalide based stimulable phosphor which is represented by the basic compositional formula: $Ba_{1-x} MII_x FX: _yMI, _zLn$ [wherein MII represents an alkaline earth metal; MI represents an alkaline metal; Ln represents a rare earth element; and x, y, and z represent numerals within the respective ranges of $0 \leq x \leq 0.5$, $0 \leq y \leq 0.05$, and $0 < z \leq 0.2$], having a grain size median diameter (Dm) of 1 to 10 $\mu$m, $\sigma$/Dm of 50% or less where $\sigma$ is a standard deviation of grain size distribution, and a grain aspect ratio within the range of from 1.0 to 2.0, a process for preparing the phosphor, an apparatus for the preparation thereof, and a radiographic image conversion panel using the phosphor.

28 Claims, 19 Drawing Sheets

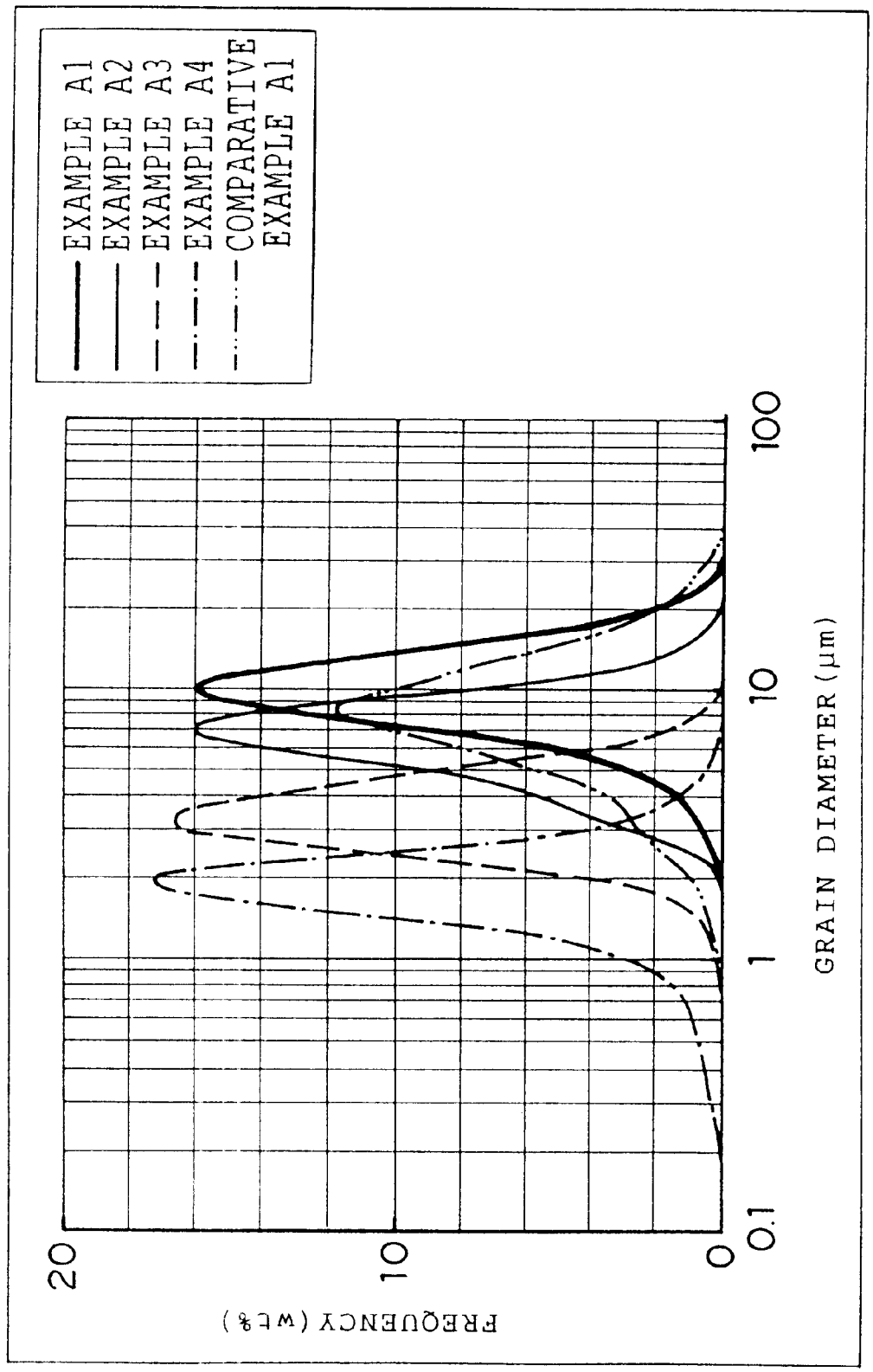

FIG.14

| Size (Dm) | EXAMPLE C1 | EXAMPLE C2 | EXAMPLE C3 | COMPARATIVE EXAMPLE C1 | COMPARATIVE EXAMPLE C2 |
|---|---|---|---|---|---|
| 101.4 | 0 | 0 | 0 | 0 | 0 |
| 88.58 | 0 | 0 | 0 | 0 | 0 |
| 77.34 | 0 | 0 | 0 | 0 | 0 |
| 67.52 | 0 | 0 | 0 | 0 | 0 |
| 58.95 | 0 | 0 | 0 | 0 | 0 |
| 51.47 | 0 | 0 | 0 | 0 | 0 |
| 44.94 | 0 | 0 | 0 | 0 | 0 |
| 39.23 | 0 | 0 | 0 | 0 | 0 |
| 34.25 | 0 | 0 | 0 | 0 | 0.1 |
| 29.91 | 0 | 0 | 0 | 0 | 0.4 |
| 26.11 | 0 | 0 | 0 | 0 | 0.9 |
| 22.8 | 0 | 0 | 0 | 0 | 1.1 |
| 19.9 | 0 | 0 | 0 | 0 | 2.3 |
| 17.38 | 0 | 0 | 0 | 0 | 3 |
| 15.17 | 0 | 0 | 0 | 0.2 | 4.4 |
| 13.25 | 0.2 | 0 | 0 | 0.6 | 7 |
| 11.56 | 0.7 | 0.2 | 0 | 1.4 | 8.4 |
| 10.1 | 2 | 0.8 | 0.2 | 3 | 10 |
| 8.82 | 4.5 | 2 | 0.6 | 5.9 | 11.5 |
| 7.7 | 8.4 | 4.3 | 1.6 | 9.3 | 11 |
| 6.72 | 12.4 | 7.6 | 3.4 | 12.4 | 9.7 |
| 5.87 | 14 | 10.2 | 5.5 | 13.7 | 7.5 |
| 5.12 | 13.6 | 12.5 | 9.4 | 12.9 | 5.8 |
| 4.47 | 11.9 | 13.2 | 12.5 | 11 | 4 |
| 3.9 | 10.8 | 13.4 | 13.3 | 8.8 | 3.1 |
| 3.41 | 9.3 | 12.7 | 13.9 | 7.3 | 2.8 |
| 2.98 | 6.8 | 10.6 | 14 | 5.9 | 2.2 |
| 2.6 | 3.5 | 6.7 | 11.9 | 4.3 | 1.8 |
| 2.27 | 1.3 | 3.3 | 7.6 | 2.2 | 1.2 |
| 1.98 | 0.5 | 1.4 | 3.6 | 0.8 | 0.7 |
| 1.73 | 0.2 | 0.6 | 1.4 | 0.3 | 0.5 |
| 1.51 | 0 | 0.3 | 0.6 | 0 | 0.3 |
| 1.32 | 0 | 0.2 | 0.2 | 0 | 0.3 |
| 1.15 | 0 | 0 | 0.1 | 0 | 0.1 |
| 1 | 0 | 0 | 0 | 0 | 0 |
| 0.88 | 0 | 0 | 0 | 0 | 0 |
| 0.77 | 0 | 0 | 0 | 0 | 0 |
| 0.67 | 0 | 0 | 0 | 0 | 0 |
| 0.58 | 0 | 0 | 0 | 0 | 0 |
| 0.51 | 0 | 0 | 0 | 0 | 0 |
| 0.45 | 0 | 0 | 0 | 0 | 0 |
| 0.39 | 0 | 0 | 0 | 0 | 0 |
| 0.34 | 0 | 0 | 0 | 0 | 0 |
| 0.3 | 0 | 0 | 0 | 0 | 0 |
| 0.26 | 0 | 0 | 0 | 0 | 0 |
| 0.23 | 0 | 0 | 0 | 0 | 0 |
| 0.2 | 0 | 0 | 0 | 0 | 0 |
| 0.17 | 0 | 0 | 0 | 0 | 0 |
| 0.15 | 0 | 0 | 0 | 0 | 0 |
| 0.13 | 0 | 0 | 0 | 0 | 0 |
| 0.11 | 0 | 0 | 0 | 0 | 0 |

FIG. 18
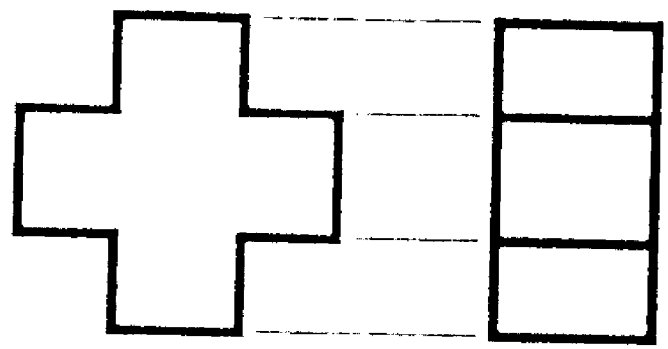
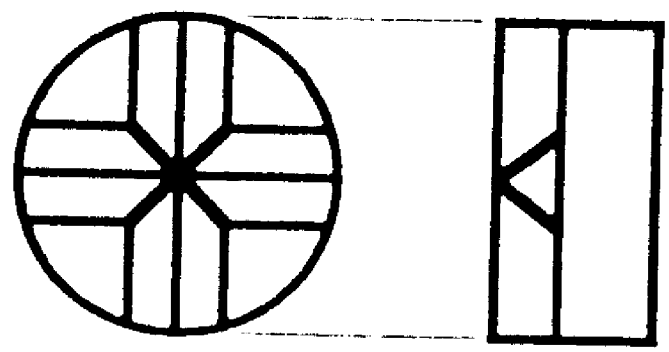

FIG. 19

| Size (Dm) | EXAMPLE D1 | EXAMPLE D2 | EXAMPLE D3 | EXAMPLE D4 | COMPARATIVE EXAMPLE D1 | COMPARATIVE EXAMPLE D2 |
|---|---|---|---|---|---|---|
| 101.4 | 0 | 0 | 0 | 0 | 0 | 0 |
| 88.58 | 0 | 0 | 0 | 0 | 0 | 0 |
| 77.34 | 0 | 0 | 0 | 0 | 0 | 0 |
| 67.52 | 0 | 0 | 0 | 0 | 0 | 0 |
| 58.95 | 0 | 0 | 0 | 0 | 0 | 0 |
| 51.47 | 0 | 0 | 0 | 0 | 0 | 0 |
| 44.94 | 0 | 0 | 0 | 0 | 0 | 0 |
| 39.23 | 0 | 0 | 0 | 0 | 0 | 0 |
| 34.25 | 0 | 0 | 0 | 0 | 0 | 0.1 |
| 29.91 | 0 | 0 | 0 | 0 | 0 | 0.4 |
| 26.11 | 0 | 0 | 0 | 0 | 0 | 0.9 |
| 22.8 | 0 | 0 | 0 | 0 | 0 | 1.1 |
| 19.9 | 0.3 | 0 | 0 | 0 | 0 | 2.3 |
| 17.38 | 0.9 | 0 | 0 | 0 | 0 | 3 |
| 15.17 | 2.4 | 0.2 | 0 | 0 | 0.2 | 4.4 |
| 13.25 | 5.1 | 0.6 | 0.3 | 0 | 0.6 | 7 |
| 11.56 | 9.6 | 1.5 | 1.1 | 0 | 1.4 | 8.4 |
| 10.1 | 14.9 | 3.5 | 3 | 0.1 | 3 | 10 |
| 8.82 | 17 | 6.4 | 6.3 | 0.4 | 5.9 | 11.5 |
| 7.7 | 15 | 9.9 | 10.9 | 1 | 9.3 | 11 |
| 6.72 | 10.2 | 12.8 | 14.6 | 2.4 | 12.4 | 9.7 |
| 5.87 | 7.2 | 13.4 | 15.1 | 4.4 | 13.7 | 7.5 |
| 5.12 | 5.9 | 12.4 | 13.3 | 8 | 12.9 | 5.8 |
| 4.47 | 4.3 | 10.5 | 10.6 | 11.3 | 11 | 4 |
| 3.9 | 2.7 | 9.1 | 8.9 | 14.1 | 8.8 | 3.1 |
| 3.41 | 1.8 | 7.6 | 7.3 | 16.1 | 7.3 | 2.8 |
| 2.98 | 1.4 | 5.8 | 5.1 | 15.8 | 5.9 | 2.2 |
| 2.6 | 0.9 | 3.4 | 2.4 | 12 | 4.3 | 1.8 |
| 2.27 | 0.4 | 1.6 | 0.8 | 6.9 | 2.2 | 1.2 |
| 1.98 | 0 | 0.7 | 0.3 | 3.5 | 0.8 | 0.7 |
| 1.73 | 0 | 0.3 | 0 | 1.7 | 0.3 | 0.5 |
| 1.51 | 0 | 0.2 | 0 | 0.8 | 0 | 0.3 |
| 1.32 | 0 | 0 | 0 | 0.5 | 0 | 0.3 |
| 1.15 | 0 | 0 | 0 | 0.4 | 0 | 0.1 |
| 1 | 0 | 0 | 0 | 0.3 | 0 | 0 |
| 0.88 | 0 | 0 | 0 | 0.2 | 0 | 0 |
| 0.77 | 0 | 0 | 0 | 0.1 | 0 | 0 |
| 0.67 | 0 | 0 | 0 | 0 | 0 | 0 |
| 0.58 | 0 | 0 | 0 | 0 | 0 | 0 |
| 0.51 | 0 | 0 | 0 | 0 | 0 | 0 |
| 0.45 | 0 | 0 | 0 | 0 | 0 | 0 |
| 0.39 | 0 | 0 | 0 | 0 | 0 | 0 |
| 0.34 | 0 | 0 | 0 | 0 | 0 | 0 |
| 0.3 | 0 | 0 | 0 | 0 | 0 | 0 |
| 0.26 | 0 | 0 | 0 | 0 | 0 | 0 |
| 0.23 | 0 | 0 | 0 | 0 | 0 | 0 |
| 0.2 | 0 | 0 | 0 | 0 | 0 | 0 |
| 0.17 | 0 | 0 | 0 | 0 | 0 | 0 |
| 0.15 | 0 | 0 | 0 | 0 | 0 | 0 |
| 0.13 | 0 | 0 | 0 | 0 | 0 | 0 |
| 0.11 | 0 | 0 | 0 | 0 | 0 | 0 |
| 計 | 100 | 99.9 | 100 | 100 | 100 | 100.1 |

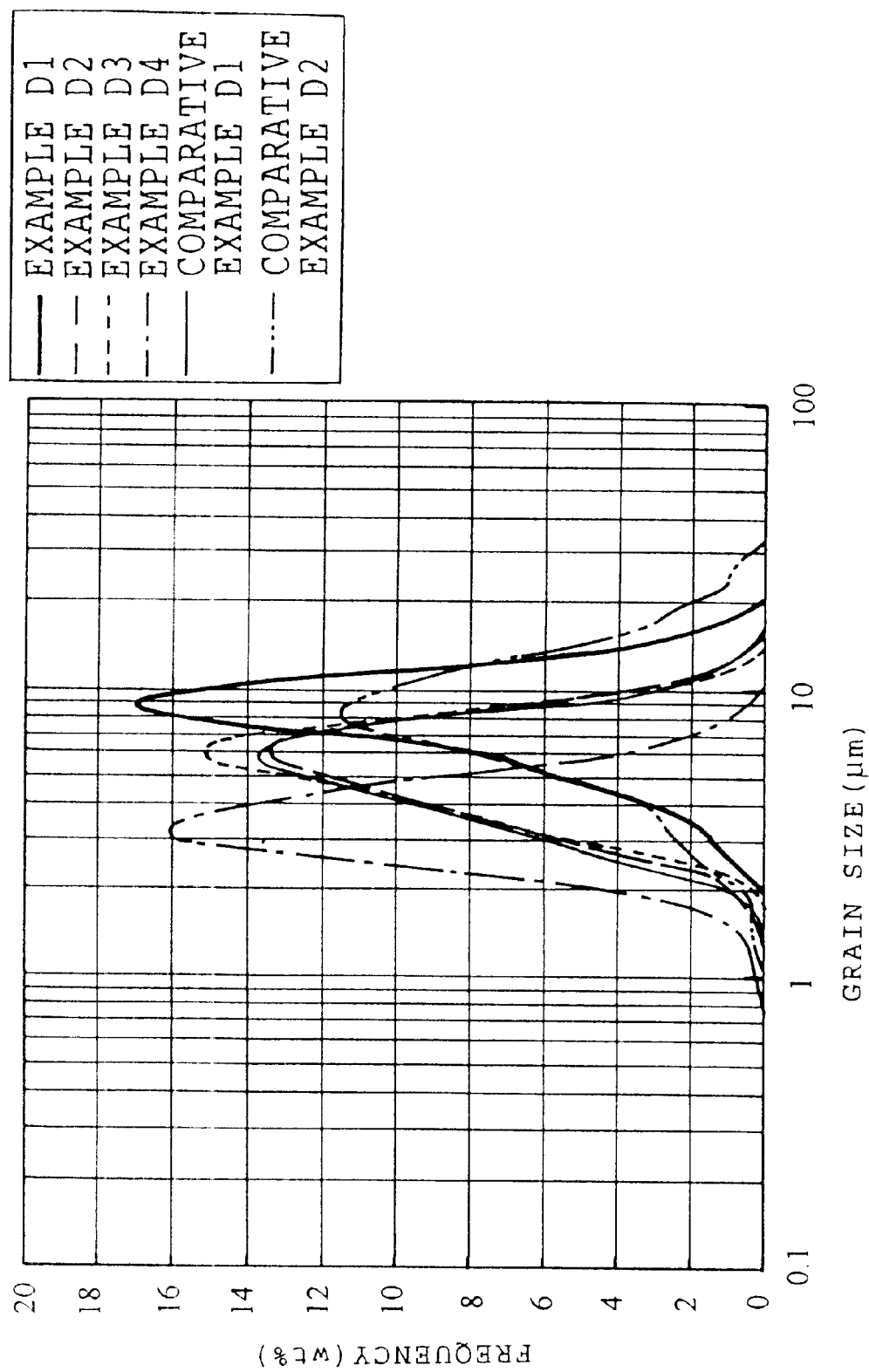

RARE EARTH ELEMENT-ACTIVATED, ALKALINE EARTH METAL FLUOROHALIDE BASED STIMULABLE PHOSPHOR, PROCESS AND APPARATUS FOR THE PREPARATION THEREOF, AND RADIOGRAPHIC IMAGE CONVERSION PANEL

BACKGROUND OF THE INVENTION

1. Field of the Invention

The present invention relates to a rare earth element-activated, alkaline earth metal fluorohalide based stimulable phosphor, a rare earth element-activated, alkaline earth metal fluorohalide based stimulable phosphor having a tetradecahedral structure in particular, a process for preparing the phosphor, and a radiographic image conversion panel using the phosphor.

2. Description of the Related Art

As a method which can replace conventional radiography, a radiographic image recording and reproducing method using a stimulable phosphor is known as described, for example, in Japanese Patent Application Laid-Open (JP-A) No. 55-12,145. This method utilizes a radiographic image conversion panel containing the stimulable phosphor (cumulative phosphor sheet) This method comprises the steps of absorbing radiation, which has passed through a subject or been emitted from an object to be examined, into the stimulable phosphor of the panel, then exciting the stimulable phosphor in accordance with a time series by an electromagnetic wave (exciting light) such as visible light, infrared light, or the like to thereby allow the radiation energy accumulated in the stimulable phosphor to emerge as fluorescent emission (stimulable emission), obtaining an electric signal by photoelectrically reading the fluorescence, and subsequently reproducing the radiographic image of the subject or object to be examined as a visible image based on the electric signal obtained. The panel, after being read, is subjected to the erasure of the remaining images so as to be made ready for subsequent photographing. That is, the radiographic image conversion panel can be used repeatedly.

The above-described radiographic image recording and reproducing method provides an advantage that radiographic images having abundant information can be obtained by a radiation dosage far smaller than that in conventional radiography using a combination of a radiographic film and sensitized paper. In addition, whereas a radiographic film is consumed for each photographing operation in conventional radiography, the above-described radiographic image recording and reproducing method makes it possible to use the radiographic image conversion panel repeatedly, thereby providing advantages in terms of the aspects of resource protection and economic efficiency.

The stimulable phosphor is a phosphor which emits stimulable emission when irradiated with exciting light subsequent to irradiation with radiation. In practical terms, generally used is a phosphor which emits stimulable emission in a wavelength range of from 300 to 500 nm by an exciting light in a wavelength range of from 400 to 900 nm. Examples of the stimulable phosphor hitherto used in a radiographic image conversion panel may include a rare earth element-activated alkaline earth metal fluorohalide based phosphor. The basic structure of the radiographic image conversion panel for use in the radiographic image recording and reproducing method is composed of a support and a stimulable phosphor layer provided on the support. However, the support is not necessarily needed if the stimulable phosphor layer is a self-supporting layer. Normally, the stimulable phosphor layer is composed of a stimulable phosphor and a binder which contains and maintains the substance in a state of a dispersion. Further, there has been known a stimulable phosphor layer which does not contain a binder and is composed solely of a stimulable phosphor in a state of a flocculated body formed by vapor deposition or sintering thereof. Furthermore, there has been known a radiographic image conversion panel having a stimulable phosphor layer in which a polymeric substance is impregnated into the gaps in the flocculated body of a stimulable phosphor. Whichever type is selected from these stimulable phosphor layers, the stimulable phosphor emits stimulable emission when irradiated with an exciting light subsequent to irradiation with radiation such as X-rays. Therefore, the radiation transmitted through a subject or emitted from an object to be examined causes the energy in an amount proportionate to the amount of the radiation to be absorbed in the stimulable phosphor layer of the radiographic image conversion panel so that a radiographic image of the subject or the object to be examined is formed as an image of accumulated radiation energy in the panel. This accumulated image can be released as a stimulable emission by the irradiation of the exciting light. Consequently, the photoelectric reading of this stimulable emission and the conversion thereof into an electric signal make it possible to convert the accumulated radiation energy image into a visible image.

The surface of stimulable phosphor layer (i.e., the surface of the layer not facing the support) has normally a protective layer composed of a polymer film or a vapor-deposited film of an inorganic substance to thereby protect the stimulable phosphor layer from chemical deterioration or physical impact.

Since the rare earth element-activated, alkaline earth metal fluorohalide based stimulable phosphor has an excellent sensitivity and provides a radiographic reproduction image having a high level of sharpness when the substance is used as a radiographic image conversion panel, it can be a practically excellent stimulable phosphor. However, as the practical use of radiographic image recording and reproduction method has advanced, there has been a growing demand for further advances in the stimulable phosphor. Because of this demand, after the examination of the grain shape of the rare earth element-activated, alkaline earth metal fluorohalide based stimulable phosphors hitherto utilized, the present inventors have found that these substances are made up of tabular grains. Conventionally known processes for the preparation of the rare earth element-activated, alkaline earth metal fluorohalide based stimulable phosphors comprise the steps of dry-blending or blending by suspending in a water-based medium the material compounds, which are an alkaline earth metal fluoride, an alkaline earth metal halide other than fluoride, a halide of a rare earth element, ammonium fluoride, and so on, firing these compounds, after the addition of a sintering preventing agent if necessary, and pulverizing the fired product. Accordingly, since the pulverizing step after the firing step is substantially essential to the conventional processes, most of the grains of the rare earth element-activated, alkaline earth metal fluorohalide based stimulable phosphors produced in the above-described manner were tabular (hereinafter referred to simply as "tabular phosphor" on occasion).

In a stimulable phosphor layer obtained by coating a mixture of the above-described tabular-grained phosphor and a binder resin solution on a support and drying the coating, the tabular-grained phosphor tends to be arranged such that the surface of the tabular-grained phosphor is parallel to the surface of the support, as illustrated in FIG. 1. If a radiographic image is stored in a radiographic image conversion panel having a stimulable phosphor layer, in which the tabular-grained phosphor is arranged in the above-described manner, and thereafter the panel is irradiated with an exciting light, the exciting light and the stimulable emission generated tend to extend in a transverse direction (i.e., a direction parallel to the surface of the support) (refer to the horizontal arrow in FIG. 1). This phenomenon presents a problem that the sharpness of radiographic reproduction images is liable to drop.

Based on the foregoing, in order to inhibit the drop in the sharpness of the radiographic reproduction images in the radiographic image recording and reproduction methods, an attempt to use a stimulable phosphor made up of approximately cubic grains has been proposed, as disclosed in JP-A No. 62-86,086. However, the reproducibility of the process for preparing the stimulable phosphor made up of approximately cubic grains disclosed above is not sufficient for industrial use.

Further, JP-A No. 7-233,368, Japanese Patent Application No. 6-315,673, and JP-A No. 10-195,431 disclose a process for preparing a rare earth element-activated, alkaline earth metal fluorohalide based stimulable phosphor having a tetradecahedral grain structure in which grain shape and grain aspect ratio are controlled (hereinafter referred to simply as "tabular phosphor" on occasion). In a radiographic image conversion panel having a stimulable phosphor layer in which a rare earth element-activated, alkaline earth metal fluorohalide based stimulable phosphor having a tetradecahedral grain structure (hereinafter referred to simply as "tetradecahedron-structured phosphor" on occasion) is provided, the polarity of the tetradecahedron-structured phosphor is so reduced, as illustrated in FIG. 2, that the undesirable transverse extension of the exciting light and the stimulable emission is lessened and therefore the sharpness of resultant radiographic reproduction images increases. Despite very high-level emission characteristics, sharpness in particular, of the phosphors obtained by the processes for preparation thereof disclosed in the above-mentioned publications, further improvement of sensitivity and erasure characteristics of the phosphors has been required of the phosphors for use in radiographic image recording and reproduction.

Furthermore, in the above-mentioned processes for preparing the phosphors, use is made of ammonium halide as a reactant mother liquor, to which an aqueous solution of a barium halide and an aqueous solution of an inorganic fluoride salt are simultaneously added so as to allow the reaction to proceed to there by synthesize stimulable phosphors. However, the grains produced by this procedure tend to have high aspect ratios. In contrast, although the aspect ratios can be brought somewhat closer to 1 if the barium halide is added to the reactant mother liquor in advance, this procedure is not satisfactory from the standpoint of controllability of grain shape, grain size, and grain size distribution.

SUMMARY OF THE INVENTION

Accordingly, it is an object of the present invention to provide a rare earth element-activated, alkaline earth metal fluorohalide based stimulable phosphor capable of producing high-quality images having a very high sharpness and exhibiting other excellent emission characteristics, high sensitivity and erasure characteristics in particular, when used in radiographic image recording and reproduction, a process suited for the preparation of the phosphor, an apparatus for the preparation, and a radiographic image conversion panel using the phosphor.

Another object of the present invention is to provide a novel process for preparing a rare earth element-activated, alkaline earth metal fluorohalide based stimulable phosphor, which process is highly capable of controlling the grain shape, grain size, and grain size distribution of the grains of the stimulable phosphor. In particular, it is an object of the present invention to provide a novel process for preparing a rare earth element-activated, alkaline earth metal fluorohalide based stimulable phosphor capable of providing high-quality images exhibiting a very high sharpness together with good sensitivity and granularity, when utilized in a radiographic image conversion panel, and a reaction apparatus in which the process is used.

In the aforesaid literature concerning phosphors, no mention is made of grain size and grain size distribution of the phosphors. However, for the improvement of image quality when a phosphor is used in a radiographic image conversion panel, the mere control of the grain shape and the grain aspect ratio of the phosphor to be used is not sufficient and it is desired to simultaneously control the grain size and grain size distribution. The present invention has been achieved by finding that the grain size and the grain size distribution are factors capable of significantly influencing the image quality when the phosphor is used in a radiographic image conversion panel and by finding proper ranges for the grain size and the grain size distribution.

The simultaneous control of the grain shape, grain aspect ratio, grain size, and grain size distribution is performed in a precipitation reaction of crystals of phosphor precursor wherein an aqueous solution of $BaX_2$ (X is at least one halogen selected from the group consisting of Cl, Br, and I) is the reactant mother liquor. In this case, it is difficult to satisfy all of the required conditions for the grains at the same time by mere control of the concentration of $BaX_2$ because the controllable range is narrow. Therefore, the present invention has been achieved based on the finding that the required conditions for the grains can be satisfied at the same time by a combination of control of the concentration of $BaX_2$ in the reactant mother liquor and the control of the adding rate of a reactant solution comprising an aqueous solution of an inorganic fluoride.

The present invention is as follows:

<1> A rare earth element-activated, alkaline earth metal fluorohalide based stimulable phosphor which is represented by the basic compositional formula (I):

$$Ba_{1-x}MII_xFX:yMI,zLn \qquad (I)$$

wherein MII represents at least one alkaline earth metal selected from the group consisting of Sr and Ca; MI represents at least one alkali metal selected from the group consisting of Li, Na, K, Rb, and Cs; X represents at least one halogen selected from the group consisting of Cl, Br, and I; Ln represents at least one rare earth element selected from the group consisting of Ce, Pr, Sm, Eu, Gd, Tb, Tm, and Yb; and x, y, and z represent, respectively, numerals within the ranges of $0 \leq x \leq 0.5$, $0 \leq y \leq 0.05$, and $0 < z \leq 0.2$, and which has a grain size median diameter (Dm) of 1 to 10 μm, σ/Dm of 50% or less where σ is a standard deviation of grain size distribution, and a grain aspect ratio within the range of from 1.0 to 2.0.

<2> The rare earth element-activated, alkaline earth metal fluorohalide based stimulable phosphor of <1>, wherein the grain shape is tetradecahedral.

<3> The rare earth element-activated, alkaline earth metal fluorohalide based stimulable phosphor of <1>, wherein Ln in the basic compositional formula (I) is Ce or Eu.

<4> A process for preparing the rare earth element-activated, alkaline earth metal fluorohalide based stimulable phosphor of <1>, comprising:

a mother liquor preparing step for preparing a reactant mother liquor which is an aqueous solution containing $BaX_2$, a water-soluble compound of Ln, a halide, nitrate, nitrite, or acetate of MII in addition if x in the basic compositional formula (I) is not 0, and a halide, nitrate, nitrite, or acetate of MI in addition if y in the basic compositional formula (I) is not 0, wherein the solution has a $BaX_2$ concentration of 2.5 mol/L or less if X is Cl or Br, or alternatively, a $BaX_2$ concentration of 5.0 mol/L or less if X is I after the foregoing components are dissolved;

a precipitate forming step for preparing the precipitate of crystals of a phosphor precursor by adding an aqueous solution of an inorganic fluoride salt to the reactant mother liquor kept at 20 to 100° C. while adjusting the adding rate in such a manner that the amount of the precipitate of crystals of a phosphor precursor to be formed during the addition is within the range of from 0.001 to 10 N/minute, where N is the amount of the precipitate of crystals of a phosphor precursor to be finally obtained;

a separating step for separating the precipitate of crystals of a phosphor precursor from the aqueous solution; and a firing step for firing the separated precipitate of crystals of a phosphor precursor while avoiding sintering thereof.

<5> The process of <4> for preparing the rare earth element-activated, alkaline earth metal fluorohalide based stimulable phosphor, wherein the inorganic fluoride salt is ammonium fluoride or a fluoride of an alkaline metal.

<6> The process of <4> for preparing the rare earth element-activated, alkaline earth metal fluorohalide based stimulable phosphor, wherein a precision cylinder pump is used for the addition of the aqueous solution of an inorganic fluoride in the precipitate forming step.

<7> The process of <4> for preparing the rare earth element-activated, alkaline earth metal fluorohalide based stimulable phosphor, wherein the adding rate of the aqueous solution of an inorganic fluoride in the precipitate forming step is adjusted to 0.01 to 1.0 N/minute.

<8> The process of <4> for preparing the rare earth element-activated, alkaline earth metal fluorohalide based stimulable phosphor, wherein the adding rate of the aqueous solution of an inorganic fluoride in the precipitate forming step is constant, or alternatively, varies continuously or discontinuously with respect to addition time.

<9> A process for preparing the rare earth element-activated, alkaline earth metal fluorohalide based stimulable phosphor of <1>, comprising:

a mother liquor preparing step for preparing a reactant mother liquor which is an aqueous solution containing $BaX_2$, a halide, nitrate, nitrite, or acetate of MII in addition if x in the basic compositional formula (I) is not 0, and a halide, nitrate, nitrite, or acetate of MI in addition if y in the basic compositional formula (I) is not 0 (excluding, however, any of the above components which is to be added simultaneously with an aqueous solution of an inorganic fluoride salt to thereby cause no deficiency thereof), wherein the solution has a $BaX_2$ concentration of 2.5 mol/L or less if X is Cl or Br, or alternatively, a $BaX_2$ concentration of 5.0 mol/L or less if X is I after the foregoing components are dissolved;

a precipitate forming step for preparing the precipitate of crystals of a phosphor precursor by adding an aqueous solution of an inorganic fluoride salt, an aqueous solution containing a water-soluble compound of Ln, and an aqueous solution of a halide, nitrate, nitrite, or acetate of MI and/or an aqueous solution of a halide, nitrate, nitrite, or acetate of MII simultaneously to the reactant mother liquor which has been kept at 20 to 100° C.;

a separating step for separating the precipitate of crystals of a phosphor precursor from the aqueous solution; and a firing step for firing the separated precipitate of crystals of a phosphor precursor while avoiding sintering thereof.

<10> A process for preparing the rare earth element-activated, alkaline earth metal fluorohalide based stimulable phosphor of <1>, comprising:

a mother liquor preparing step for preparing a reactant mother liquor which is an aqueous solution containing $BaX_2$, a water-soluble compound of Ln, a halide, nitrate, nitrite, or acetate of MII in addition if x in the basic compositional formula (I) is not 0, and a halide, nitrate, nitrite, or acetate of MI in addition if y in the basic compositional formula (I) is not 0 (excluding, however, any of the above components which is to be added simultaneously with an aqueous solution of an inorganic fluoride salt to thereby cause no deficiency thereof), wherein the solution has a $BaX_2$ concentration of 2.5 mol/L or less if X is Cl or Br, or alternatively, a $BaX_2$ concentration of 5.0 mol/L or less if X is I after the foregoing components are dissolved;

a precipitate forming step for preparing the precipitate of crystals of a phosphor precursor by adding an aqueous solution of an inorganic fluoride salt, an aqueous solution containing a water-soluble compound of Ln, and an aqueous solution of a halide, nitrate, nitrite, or acetate of MI and/or an aqueous solution of a halide, nitrate, nitrite, or acetate of MII (excluding the case where both x and y of the basic compositional formula (I) are 0) simultaneously to the reactant mother liquor which has been kept at 20 to 100° C.;

a separating step for separating the precipitate of crystals of a phosphor precursor from the aqueous solution; and a firing step for firing the separated precipitate of crystals of a phosphor precursor while avoiding sintering thereof.

<11> A process for preparing the rare earth element-activated, alkaline earth metal fluorohalide based stimulable phosphor of <1>, comprising:

a mother liquor preparing step for preparing a reactant mother liquor which is an aqueous solution containing $NH_4X$, a halide, nitrate, nitrite, or acetate of MII in addition if x in the basic compositional formula (I) is not 0, and a halide, nitrate, nitrite, or acetate of MI in addition if y in the basic compositional formula (I) is not 0 (excluding, however, any of the above components which is to be added simultaneously with an aqueous solution of an inorganic fluoride salt to thereby cause no deficiency thereof), wherein the solution has an $NH_4X$ concentration of 4.5 mol/L or less after the foregoing components are dissolved;

a precipitate forming step for preparing the precipitate of crystals of a phosphor precursor by adding an aqueous solution of $BaX_2$, an aqueous solution of an inorganic fluoride salt, an aqueous solution containing a water-soluble compound of Ln, and an aqueous solution of a halide, nitrate, nitrite, or acetate of MI and/or an aqueous solution of a halide, nitrate, nitrite, or acetate of MII, simultaneously and in such a manner that the molar ratio of fluorine in the inorganic fluoride to $BaX_2$ is kept constant, to the reactant mother liquor which has been kept at 20 to 100° C.;

a separating step for separating the precipitate of crystals of a phosphor precursor from the aqueous solution; and a firing step for firing the separated precipitate of crystals of a phosphor precursor while avoiding sintering thereof.

<12> A process for preparing the rare earth element-activated, alkaline earth metal fluorohalide based stimulable phosphor of <1>, comprising:

a mother liquor preparing step for preparing a reactant mother liquor which is an aqueous solution containing $NH_4X$, a water-soluble compound of Ln, a halide, nitrate, nitrite, or acetate of MII in addition if x in the basic compositional formula (I) is not 0, and a halide, nitrate, nitrite, or acetate of MI in addition if y in the basic compositional formula (I) is not 0 (excluding, however, any of the above components which is to be added simultaneously with an aqueous solution of an inorganic fluoride salt to thereby cause no deficiency thereof), wherein the solution has an $NH_4X$ concentration of 4.5 mol/L or less after the foregoing components are dissolved;

a precipitate forming step for preparing the precipitate of crystals of a phosphor precursor by adding an aqueous solution of $BaX_2$, an aqueous solution of an inorganic fluoride salt, an aqueous solution containing a water-soluble compound of Ln, and an aqueous solution of a halide, nitrate, nitrite, or acetate of MI and/or an aqueous solution of a halide, nitrate, nitrite, or acetate of MII (excluding the case where both x and y of the basic compositional formula (I) are 0), simultaneously and in such a manner that the molar ratio of fluorine in the inorganic fluoride to $BaX_2$ is kept constant, to the reactant mother liquor which has been kept at 20 to 100° C.;

a separating step for separating the precipitate of crystals of a phosphor precursor from the aqueous solution; and a firing step for firing the separated precipitate of crystals of a phosphor precursor while avoiding sintering thereof.

<13> The process of <9> for preparing the rare earth element-activated, alkaline earth metal fluorohalide based stimulable phosphor, wherein, in the precipitate forming step, the aqueous solution of an inorganic fluoride salt is added by adjusting the adding rate thereof in such a manner that the amount of the precipitate of crystals of a phosphor precursor to be formed during the addition is within the range of from 0.001 to 10 N/minute, where N is the amount of the precipitate of crystals of a phosphor precursor to be finally obtained.

<14> The process of <11> for preparing the rare earth element-activated, alkaline earth metal fluorohalide based stimulable phosphor, wherein, in the precipitate forming step, the aqueous solution of an inorganic fluoride salt and the aqueous solution of $BaX_2$ are added by adjusting the adding rates thereof in such a manner that the amount of the precipitate of crystals of a phosphor precursor to be formed during the addition is within the range of from 0.001 to 10 N/minute, where N is the amount of the precipitate of crystals of a phosphor precursor to be finally obtained.

<15> The process of <9> for preparing the rare earth element-activated, alkaline earth metal fluorohalide based stimulable phosphor, wherein the inorganic fluoride salt is ammonium fluoride or a fluoride of an alkaline metal.

<16> The process of <9> for preparing the rare earth element-activated, alkaline earth metal fluorohalide based stimulable phosphor, wherein the adding rates of the aqueous solutions, which are to be added simultaneously with the aqueous solution of an inorganic fluoride salt and which are other than the solution of an inorganic fluoride salt and the aqueous solution of $BaX_2$, vary continuously or discontinuously during the addition time in the precipitate forming step.

<17> A process for preparing the rare earth element-activated, alkaline earth metal fluorohalide based stimulable phosphor of <1>, comprising:

a mother liquor preparing step for preparing a reactant mother liquor which is an aqueous solution containing $NH_4X$, a water-soluble compound of Ln, a halide, nitrate, nitrite, or acetate of MII in addition if x in the basic compositional formula (I) is not 0, and a halide, nitrate, nitrite, or acetate of MI in addition if y in the basic compositional formula (I) is not 0, wherein the solution has an $NH_4X$ concentration of between 2.0 and 4.5 mol/L;

a precipitate forming step for preparing the precipitate of crystals of a phosphor precursor by adding an aqueous solution of an inorganic fluoride salt and an aqueous solution of $BaX_2$, in such a manner that the molar ratio of fluorine in the inorganic fluoride salt to $BaX_2$ is kept constant, to the reactant mother liquor which has been kept at 20 to 100° C.;

a separating step for separating the precipitate of crystals of a phosphor precursor from the aqueous solution; and a firing step for firing the separated precipitate of crystals of a phosphor precursor while avoiding sintering thereof;

characterized in that, in the precipitate forming step, the average adding rates of the aqueous solution of an inorganic fluoride salt and the aqueous solution of $BaX_2$ in the period ranging from the start of the addition to t (0<t<T, where T indicates the time when the addition ends) are faster than the average adding rates, respectively, in the period ranging from t to T.

<18> The process of <17> for preparing the rare earth element-activated, alkaline earth metal fluorohalide based stimulable phosphor, wherein the precipitate forming step consists of a first precipitate forming step and a second precipitate forming step.

<19> The process of <18> for preparing the rare earth element-activated, alkaline earth metal fluorohalide based stimulable phosphor, wherein N and $N_1$ satisfy the following relational formula where N is the amount of the precipitate of crystals of a phosphor precursor to be finally obtained and $N_1$ is the amount of the crystals of a phosphor precursor to be precipitated in the first precipitate forming step.

$$0 < (N_1/N) \leq 0.8$$

<20> The process of <18> for preparing the rare earth element-activated, alkaline earth metal fluorohalide based stimulable phosphor, wherein, in the precipitate forming step, the curve indicating the change with time of the adding rate of the aqueous solution of an inorganic fluoride salt and the aqueous solution of $BaX_2$ has an inflection or bending point numbering n (where n represents a natural number of 1 or greater) and the first precipitate forming step is defined by the time ranging from the start of addition to the inflection or bending point if n=1, while the first precipitate forming step is defined by the time ranging from the start of addition to the midpoint between the first inflection or bending point and the second first inflection or bending point if n ≧2.

<21> The process of <18> for preparing the rare earth element-activated, alkaline earth metal fluorohalide based stimulable phosphor, wherein the second precipitate forming step is carried out consecutively after the first precipitate forming step, or the second precipitate forming step is carried out when a certain period of time has passed after the first precipitate forming step.

<22> The process of <17> for preparing the rare earth element-activated, alkaline earth metal fluorohalide based stimulable phosphor, wherein the adding rates of the aqueous solution of $BaX_2$ and the solution of an inorganic fluoride salt are kept constant or vary continuously or discontinuously with respect to addition time in the precipitate forming step.

<23> The process of <17> for preparing the rare earth element-activated, alkaline earth metal fluorohalide based stimulable phosphor, wherein the inorganic fluoride salt is ammonium fluoride or a fluoride of an alkaline metal.

<24> The process of <17> for preparing the rare earth element-activated, alkaline earth metal fluorohalide based stimulable phosphor, wherein the adding rates of the solution of an inorganic fluoride salt and the aqueous solution of $BaX_2$ are adjusted so that the amount of the precipitate of crystals of a phosphor precursor to be formed during the addition is within the range of from 0.001 to 10 N/minute, where N is the amount of the precipitate of crystals of a phosphor precursor to be finally obtained.

<25> A process for preparing the rare earth element-activated, alkaline earth metal fluorohalide based stimulable phosphor of <1>, comprising:

a mother liquor preparing step for preparing a reactant mother liquor which is an aqueous solution containing $NH_4X$, a water-soluble compound of Ln, a halide, nitrate, nitrite, or acetate of MII in addition if x in the basic compositional formula (I) is not 0, and a halide, nitrate, nitrite, or acetate of MI in addition if y in the basic compositional formula (I) is not 0, wherein the solution has an $NH_4X$ concentration of between 2.0 and 4.5 mol/L after the foregoing components are dissolved, and for keeping the reactant mother liquor at 20 to 100° C. while being stirred;

a crystal nuclei forming step for forming crystal nuclei of the crystals of a phosphor precursor by stirring the aqueous solution of an inorganic fluoride salt and the aqueous solution of $BaX_2$ at a high speed while these solutions are being added and introducing the reacted suspension into the reactant mother liquor which is kept at 20 to 100° C. and stirred;

a precipitate forming step for preparing the precipitate of crystals of a phosphor precursor by adding the aqueous solution of $BaX_2$ and the aqueous solution of an inorganic fluoride salt, in such a manner that the molar ratio of fluorine in the inorganic fluoride salt to $BaX_2$ is kept constant, to the reactant mother liquor which contains the suspension and is kept at 20 to 100° C.;

a separating step for separating the precipitate of crystals of a phosphor precursor from the aqueous solution; and a firing step for firing the separated precipitate of crystals of a phosphor precursor while avoiding sintering thereof.

<26> A process for preparing the rare earth element-activated, alkaline earth metal fluorohalide based stimulable phosphor of <1>, comprising:

a mother liquor preparing step for preparing a reactant mother liquor which is an aqueous solution containing $BaX_2$, a water-soluble compound of Ln, a halide, nitrate, nitrite, or acetate of MII in addition if x in the basic compositional formula (I) is not 0, and a halide, nitrate, nitrite, or acetate of MI in addition if y in the basic compositional formula (I) is not 0, wherein the solution has a $BaX_2$ concentration of 2.5 mol/L or less if X is Cl or Br, or alternatively, a $BaX_2$ concentration of 5.0 mol/L or less if X is I after the foregoing components are dissolved, and for keeping the reactant mother liquor at 20 to 100° C. while being stirred;

a crystal nuclei forming step for forming crystal nuclei of the crystals of a phosphor precursor by stirring the aqueous solution of an inorganic fluoride salt and the aqueous solution of $BaX_2$ at a high speed while these solutions are being added and introducing the reacted suspension into the reactant mother liquor which is kept at 20 to 100° C. and stirred;

a precipitate forming step for preparing the precipitate of crystals of a phosphor precursor by adding the aqueous solution of an inorganic fluoride salt to the reactant mother liquor which contains the suspension and is kept at 20 to 100° C.;

a separating step for separating the precipitate of crystals of a phosphor precursor from the aqueous solution; and a firing step for firing the separated precipitate of crystals of a phosphor precursor while avoiding sintering thereof.

<27> The process of <25> for preparing the rare earth element-activated, alkaline earth metal fluorohalide based stimulable phosphor, wherein, in the precipitate forming step, the adding rates of the solution of an inorganic fluoride salt and the aqueous solution of $BaX_2$ are adjusted so that the amount of the precipitate of crystals of a phosphor precursor to be formed during the addition is within the range of from 0.001 to 10 N/minute, where N is the amount of the precipitate of crystals of a phosphor precursor to be finally obtained.

<28> The process of <26> for preparing the rare earth element-activated, alkaline earth metal fluorohalide based stimulable phosphor, wherein, in the precipitate forming step, the adding rate of the solution of an inorganic fluoride is adjusted so that the amount of the precipitate of crystals of a phosphor precursor to be formed during the addition is within the range of from 0.001 to 10 N/minute, where N is the amount of the precipitate of crystals of a phosphor precursor to be finally obtained.

<29> The process of <25> for preparing the rare earth element-activated, alkaline earth metal fluorohalide based stimulable phosphor, wherein, in the crystal nuclei forming step, the adding rates of the solution of an inorganic fluoride salt and the aqueous solution of $BaX_2$ are adjusted so that the amount of the crystal nuclei of a phosphor precursor to be formed in the crystal nuclei forming step is between 0 and 0.8 N, where N is the amount of the crystals of a phosphor precursor to be finally obtained in the precipitate forming step.

11

<30> The process of <25> for preparing the rare earth element-activated, alkaline earth metal fluorohalide based stimulable phosphor, wherein the inorganic fluoride salt is ammonium fluoride or a fluoride of an alkaline metal.

<31> The process of <25> for preparing the rare earth element-activated, alkaline earth metal fluorohalide based stimulable phosphor, wherein, in the crystal nuclei forming step, the solution of an inorganic fluoride salt and the aqueous solution of $BaX_2$ are stirred at a high speed using an instant reactor.

<32> A reaction apparatus comprising:
two or more liquid adding devices for accommodating and pumping out a liquid;
an instant reactor for accommodating the liquid pumped from the two or more liquid adding devices, stirring the liquid at a high speed, and thereafter pumping out the liquid; and
a stirring tank for accommodating the liquid pumped from the two or more liquid adding devices and the liquid pumped from the instant reactor and stirring these liquids together with a reactant mother liquid which has been accommodated in the stirring tank in advance.

<33> A radiographic image conversion panel having a stimulable fluorescent layer containing a stimulable phosphor, wherein the stimulable phosphor is the rare earth element-activated, alkaline earth metal fluorohalide based stimulable phosphor of <1>.

BRIEF DESCRIPTION OF THE DRAWINGS

FIG. 7 is a graph illustrating grain size distributions of rare earth element-activated, alkaline earth metal fluorohalide based stimulable phosphors obtained in the Examples and Comparative Examples according to the AA process of the present invention.

12

Figure 11A:
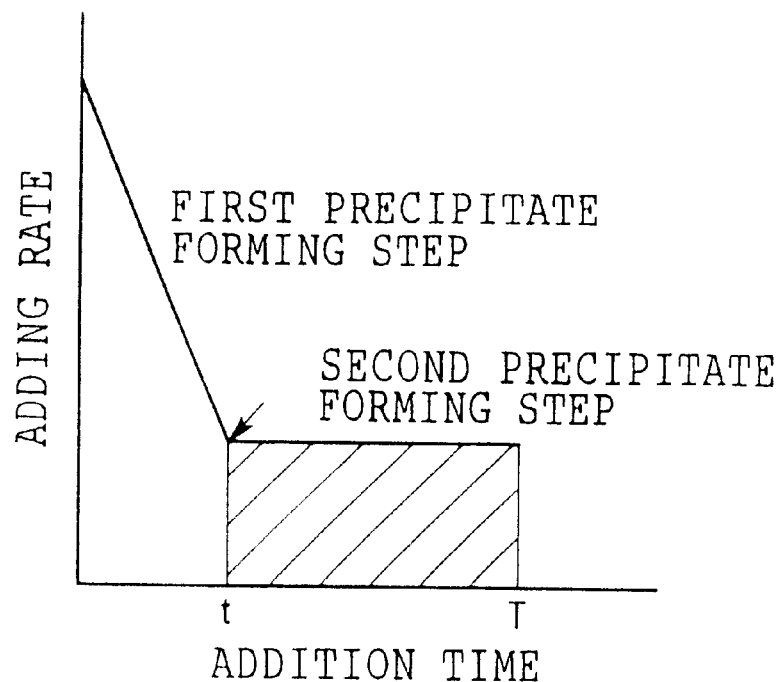
Figure 11B:
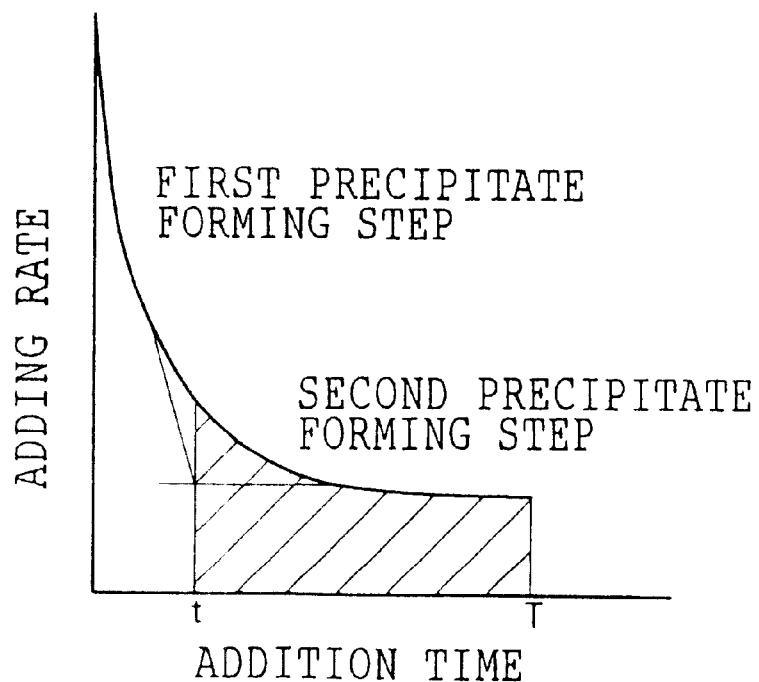

FIGS. 11A and 11B are graphs illustrating examples of addition patterns (having one inflection or bending point) in the first and second adding steps according to the CA process of the present invention.

Figure 12A:
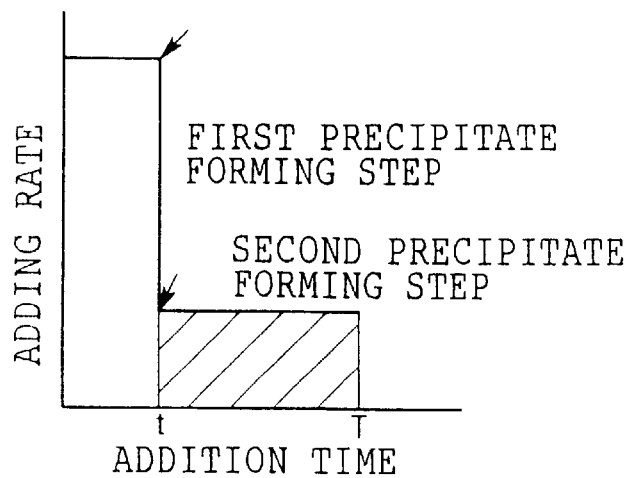
Figure 12B:
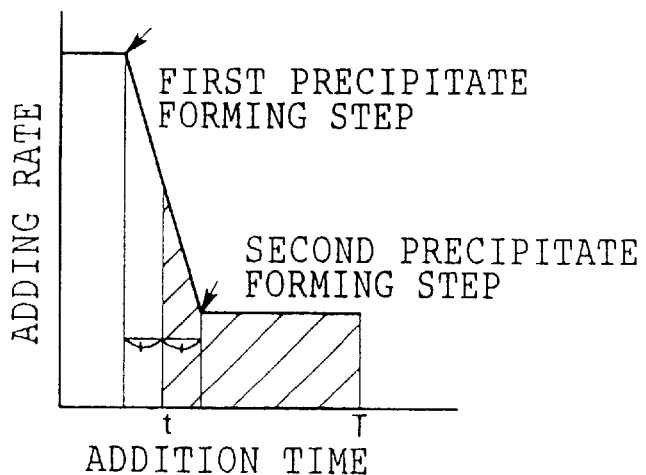
Figure 12C:
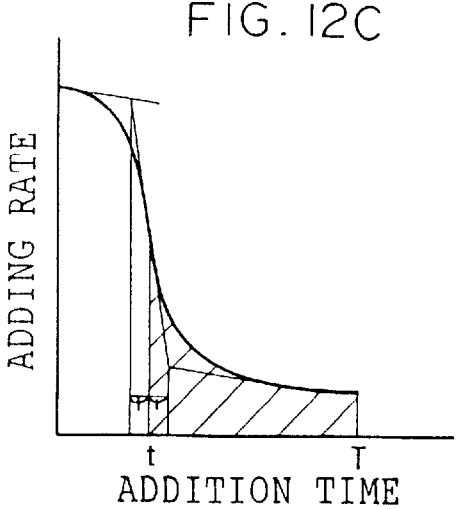

FIGS. 12A, 12B and 12C are graphs illustrating another examples of addition patterns (having two inflection or bending points) in the first and second adding steps according to the CA process of the present invention.

Figure 13A:
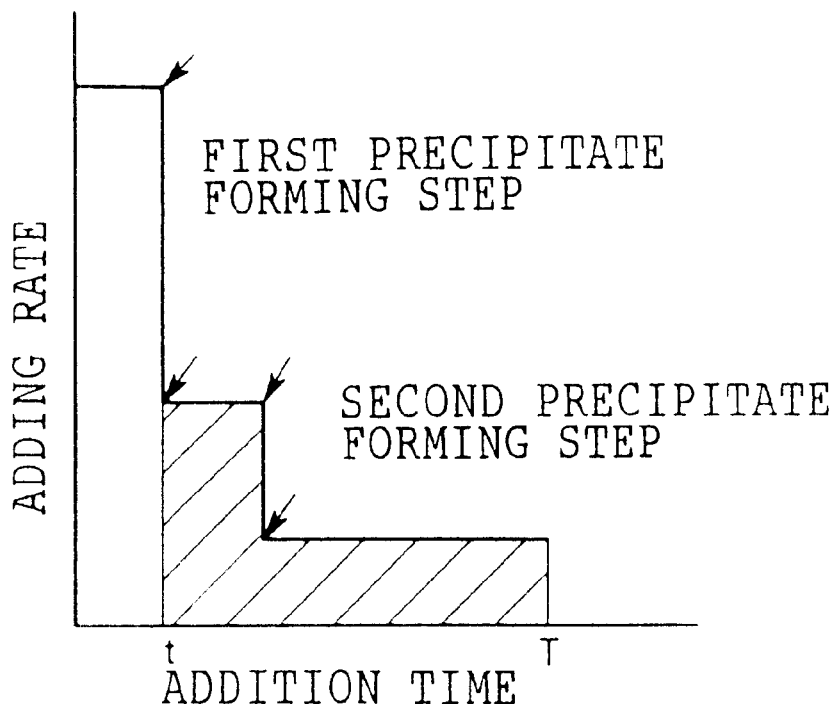
Figure 13B:
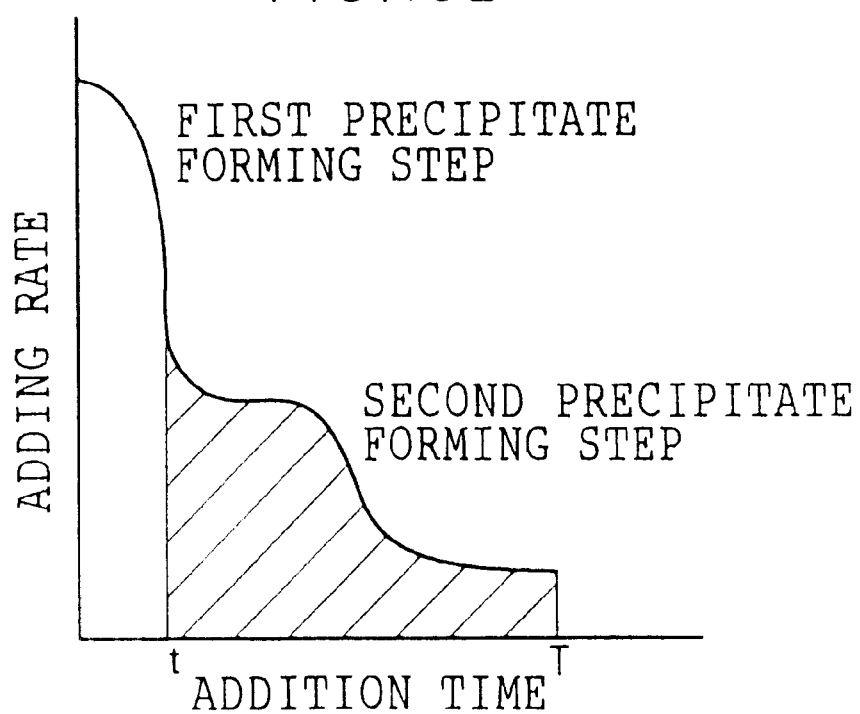

FIGS. 13A and 13B are graphs illustrating yet another examples of addition patterns (having three or more inflection or bending points) in the first and second adding steps according to the CA process of the present invention.

FIG. 14 is a chart of grain size distributions of phosphors obtained in Examples and Comparative Examples according to the CA process of the present invention.

Figure 15:
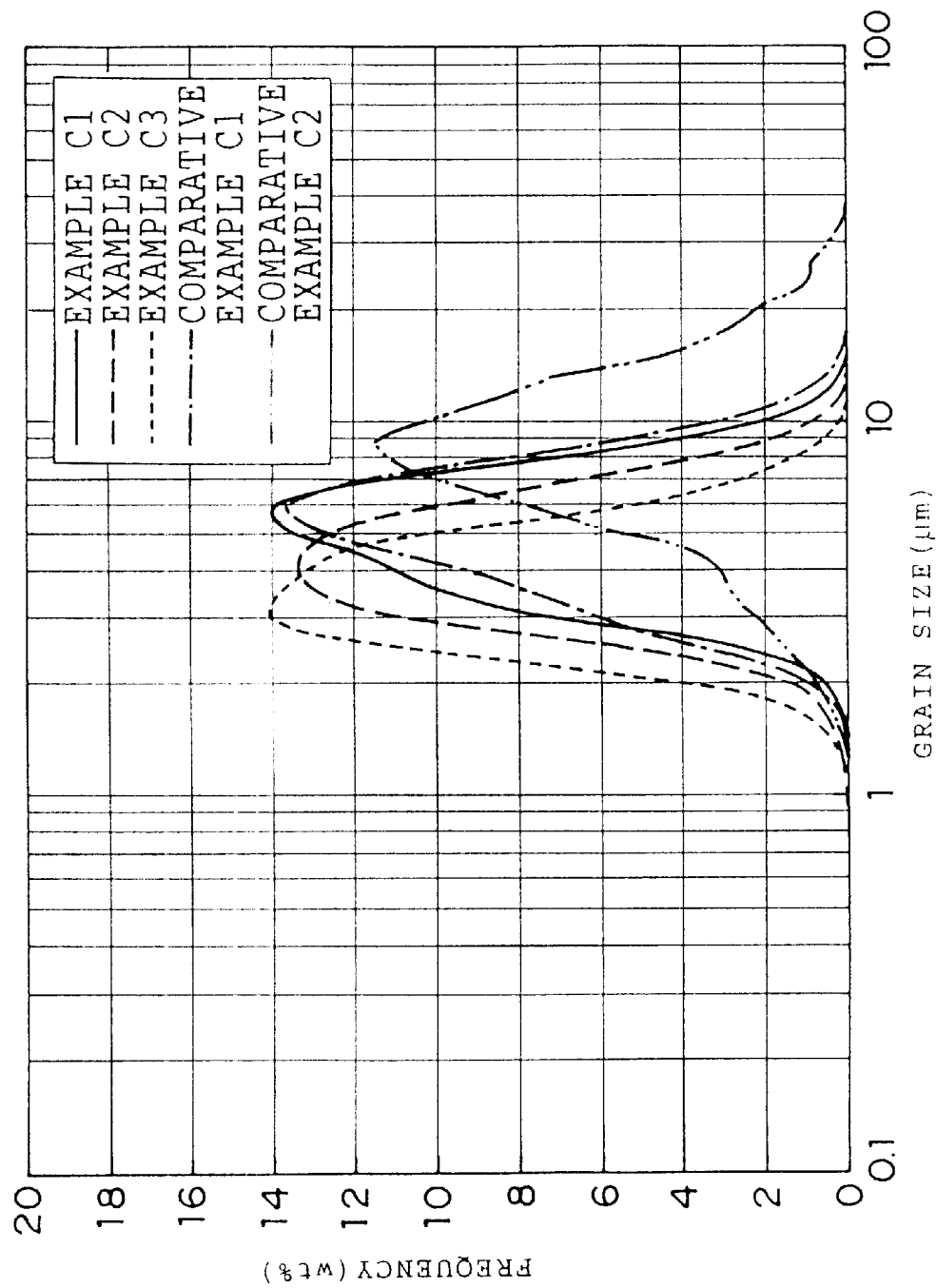

FIG. 15 is a graph illustrating grain size distributions of phosphors obtained in the Examples and Comparative Examples according to the CA process of the present invention.

Figure 16:
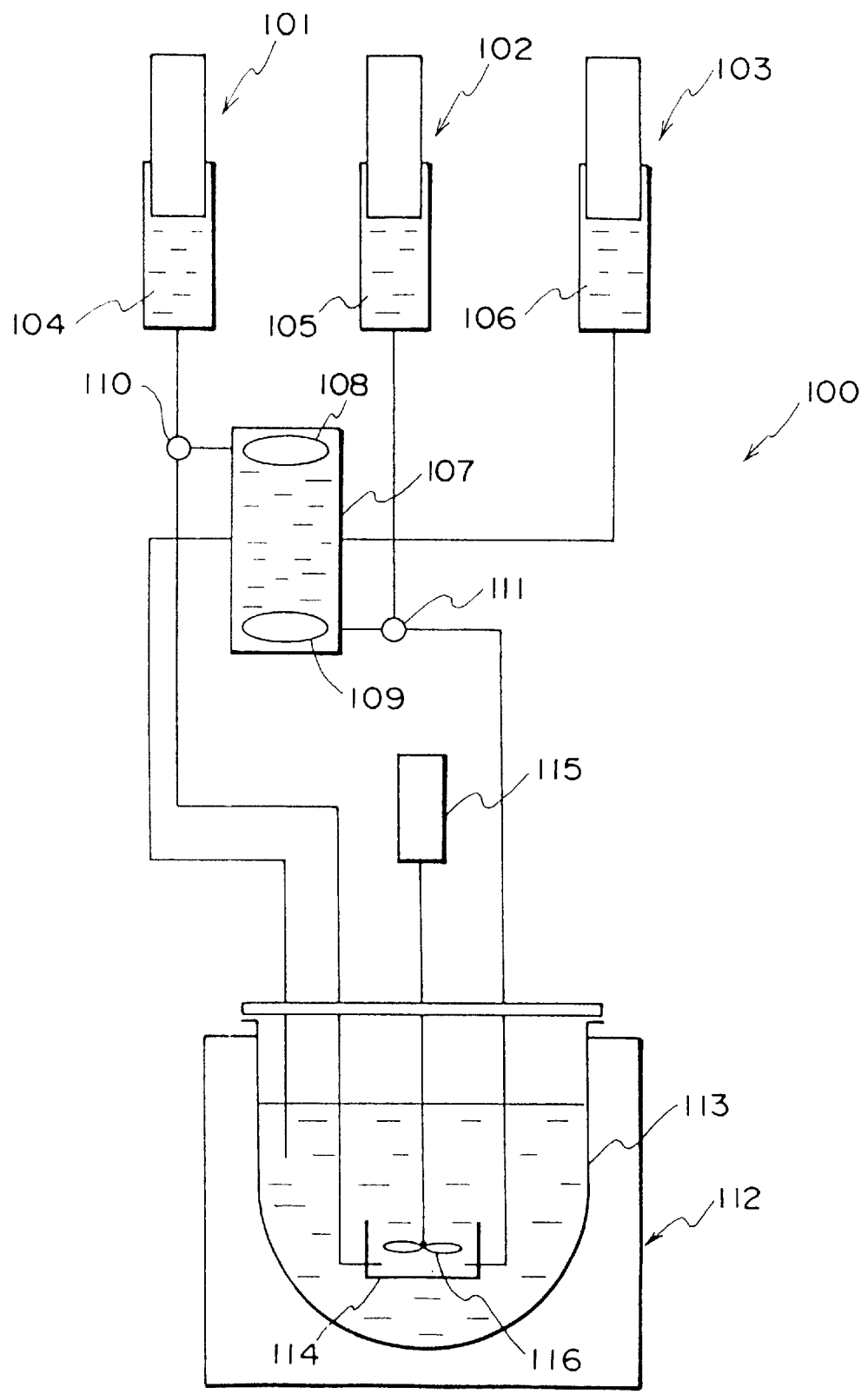

FIG. 16 is a diagram schematically illustrating an example of the reaction apparatus of the present invention.

Figure 17:
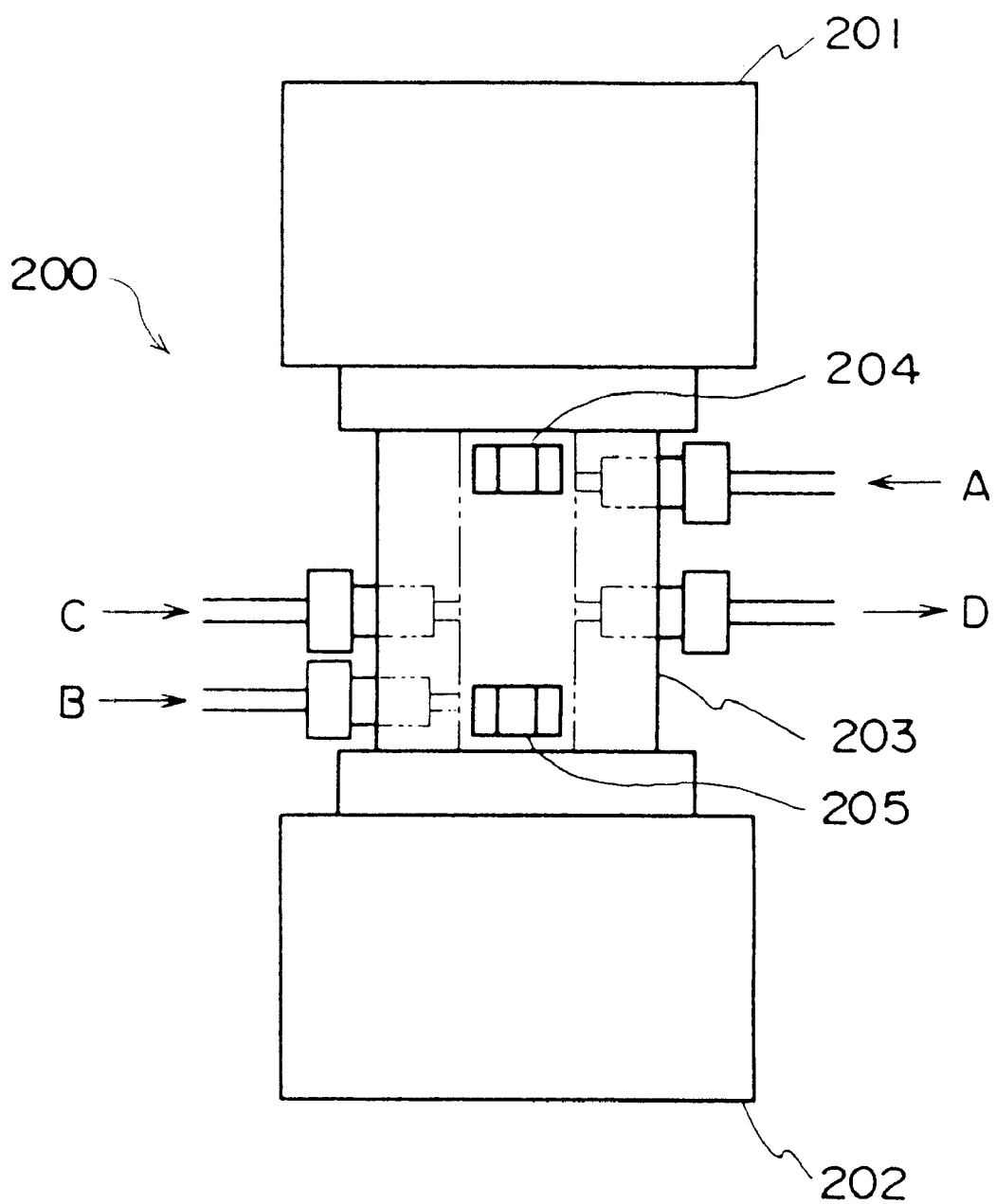

FIG. 17 is a diagram schematically illustrating an example of the instant reactor included in the reaction apparatus of the present invention.

FIG. 18 are example illustrations of the shapes of stirrers to be used in the instant reactor.

FIG. 19 is a chart of grain size distributions of phosphors obtained in Examples and Comparative Examples according to the DA process and DB process of the present invention.

FIG. 20 is a graph illustrating grain size distributions of phosphors obtained in Examples and Comparative Examples according to the DA process and DB process of the present invention.

DETAILED DESCRIPTION OF THE INVENTION

The phosphors of the present invention, processes for preparing them, apparatus for preparing them, and radiographic image conversion panels will be explained in detail.

(1) Rare Earth Element-activated, Alkaline Earth Metal fluorohalide based stimulable phosphor.

First, the rare earth element-activated, alkaline earth metal fluorohalide based stimulable phosphor of the present invention is explained.

The rare earth element-activated, alkaline earth metal fluorohalide based stimulable phosphor of the present invention is represented by the basic compositional formula (I):

$$Ba_{1-x}MII_xFX:_yMI,_zLn \tag{I}$$

wherein MII represents at least one alkaline earth metal selected from the group consisting of Sr and Ca; MI represents at least one alkaline metal selected from the group consisting of Li, Na, K, Rb, and Cs; X represents at least one halogen selected from the group consisting of Cl, Br, and I; Ln represents at least one rare earth element selected from the group consisting of Ce, Pr, Sm, Eu, Gd, Tb, Tm, and Yb; and x, y, and z represent, respectively, numerals within the ranges of $0 \leq x \leq 0.5$, $0 \leq y \leq 0.05$, and $0 < z \leq 0.2$.

It is particularly preferable that Ln in the basic compositional formula (I) is Ce or Eu.

The aspect ratio of the rare earth element-activated, alkaline earth metal fluorohalide based stimulable phosphor represented by the basic compositional formula (I) is ordinarily in the range of from 1.0 to 5.0 The rare earth element-activated, alkaline earth metal fluorohalide based stimulable phosphor in the present invention has a grain aspect ratio in the range of from 1.0 to 2.0 (more preferably in the range of from 1.0 to 1.5), a grain size median diameter (Dm) in the range of from 1 to 10 μm (more preferably in the range of from 2 to 7 μm), and σ/Dm in the range of from 50% or less (more preferably in the range of from 40% or less), where σ is a standard deviation of grain size distribution. Examples of the shape of grains may include a rectangular parallelopipedon, a regular hexahedron, a regular octahedron, the polyhedron in the center of these shapes, a tetradecahedron, and so on. Among these shapes, a tetradecahedron is preferable. However, the phosphor is not necessarily limited to the tetradecahedron, because any phosphor, which fulfills the requirements for the aspect ratio, grain size, and grain size distribution, can achieve the effects of the present invention.

The reason why it is preferable for the grain size median diameter (Dm) to be in the range of from 1 to 10 μm is explained below by using experimental data.

The rare earth element-activated, alkaline earth metal fluorohalide based stimulable phosphors, which had aspect ratios adjusted in the range of from 1.02 to 1.09 and σ/Dm adjusted in the range of from 34.0 to 39.0% but whose grain size median diameters (Dm) varied in the range of from 0.75 to 12.2 μm, were prepared. The sensitivities and values of erasure of these rare earth element-activated, alkaline earth metal fluorohalide based stimulable phosphors were evaluated according to the following methods and the results are shown in Table 1.

Sensitivity: Each of the rare earth element-activated, alkaline earth metal fluorohalide based stimulable phosphors was irradiated with X-rays of 80 kV and 100 mR, followed by the irradiation with He—Ne laser light at 12.4 J/m$^2$. After that, the amount of stimulable emission from the rare earth element-activated, alkaline earth metal fluorohalide based stimulable phosphor was sought to thereby calculate a sensitivity level.

Value of erasure: Each of the rare earth element-activated, alkaline earth metal fluorohalide based stimulable phosphors was irradiated with X-rays of 80 kV and 100 mR, followed by the irradiation with He—Ne laser light at 12.4 J/m$^2$. After that, the amount of stimulable emission from the rare earth element-activated, alkaline earth metal fluorohalide based stimulable phosphor was sought. The value thus obtained was defined as the amount of initial emission (initial value). Subsequently, the rare earth element-activated, alkaline earth metal fluorohalide based stimulable phosphor was irradiated with light of a daylight fluorescent lamp under a condition of 400,000 lx•s, followed by the irradiation with He—Ne laser light at 12.4 J/m$^2$. The amount of stimulable emission from the rare earth element-activated, alkaline earth metal fluorohalide based stimulable phosphor was sought. The value thus obtained was defined as the value of the erased level. The value obtained by standardization of the value of the erased level using the initial value was used as a value of erasure.

TABLE 1

| Grain size median diameter (μm) | Sensitivity | Value of erasure |
|---|---|---|
| 0.75 | 31 | 0.00035 |
| 0.95 | 51 | 0.00027 |
| 1.93 | 82 | 0.00020 |

TABLE 1-continued

| Grain size median diameter (μm) | Sensitivity | Value of erasure |
|---|---|---|
| 3.62 | 98 | 0.00019 |
| 6.96 | 100 | 0.00023 |
| 9.97 | 95 | 0.00051 |
| 12.2 | 85 | 0.00250 |

Figure 1:
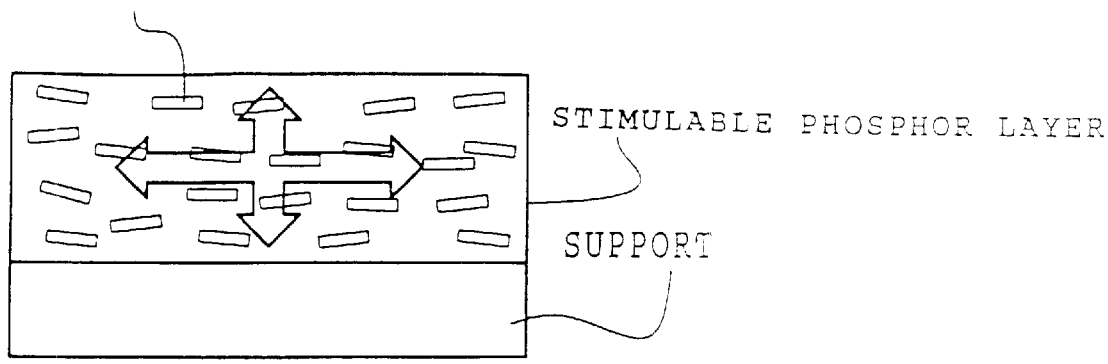
FIG. 1 is a diagram schematically illustrating the arrangement of a conventional rare earth element-activated, alkaline earth metal fluorohalide based stimulable phosphor in a stimulable phosphor layer of a radiographic image conversion panel and the direction of light transmission in the stimulable phosphor layer.
Figure 2:
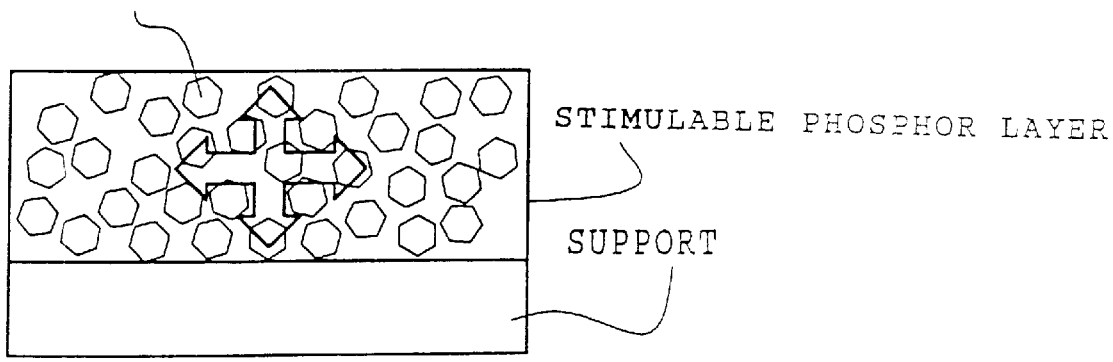
FIG. 2 is a diagram schematically illustrating the arrangement of a rare earth element-activated, alkaline earth metal fluorohalide based stimulable phosphor having a tetradecahedral structure in a stimulable phosphor layer of a radiographic image conversion panel and the direction of light transmission in the stimulable phosphor layer.
Figure 3:
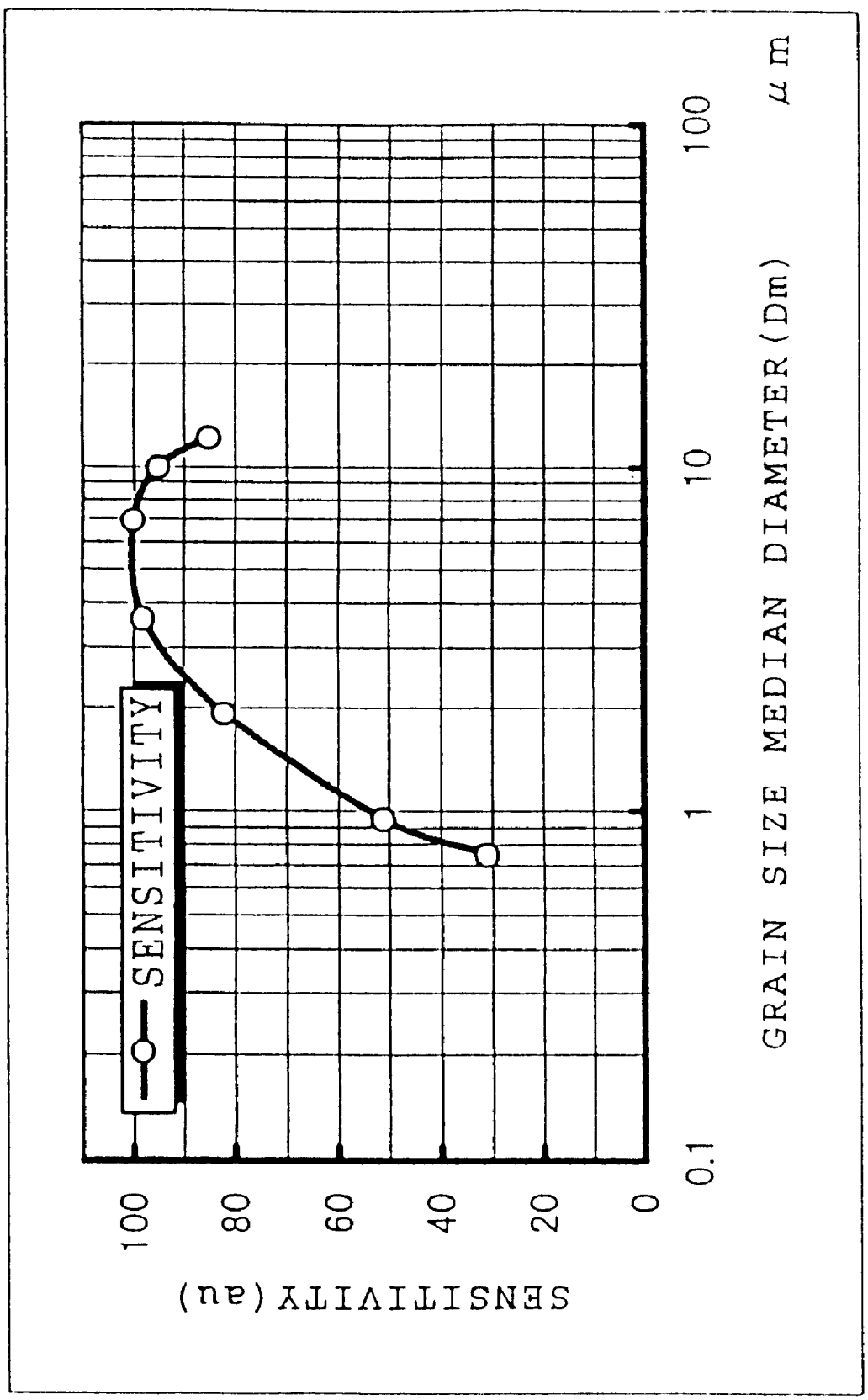
FIG. 3 is a graph illustrating the relationship between grain size median diameter (Dm) and sensitivity.
Figure 4:
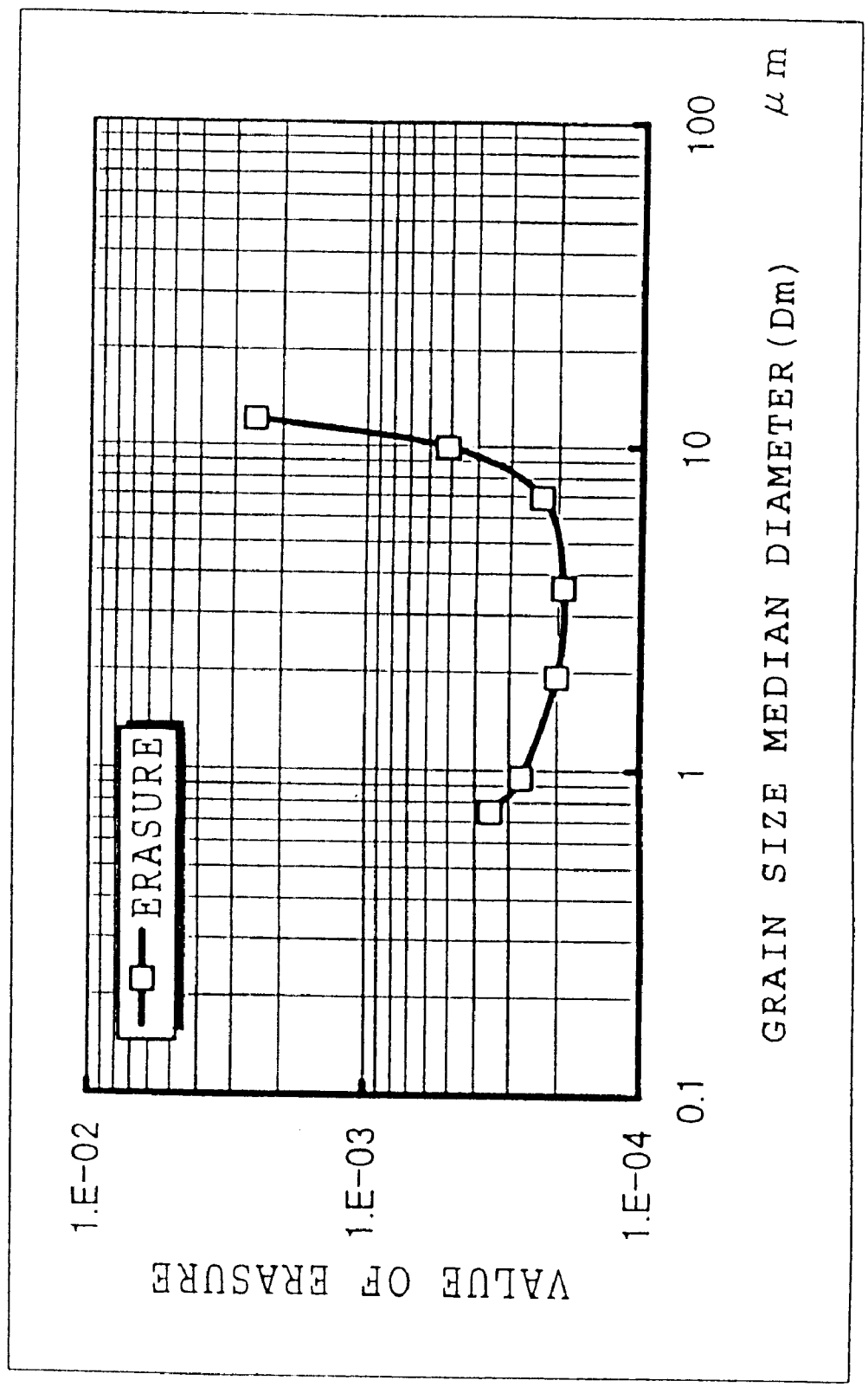
FIG. 4 is a graph illustrating the relationship between grain size median diameter (Dm) and value of erasure.

FIGS. 3 and 4 are each a graph showing the relationship between grain size median diameter (Dm) and sensitivity or value of erasure based on the results shown in Table 1. As can be seen from the graphs of FIGS. 3 and 4, in particular the sensitivity becomes inferior as the grain size median diameter (Dm) of the rare earth element-activated, alkaline earth metal fluorohalide based stimulable phosphor becomes smaller, while the value of erasure becomes inferior as the grain size median diameter (Dm) of the phosphor becomes larger.

Based on these results, the grain size median diameter (Dm) of the rare earth element-activated, alkaline earth metal fluorohalide based stimulable phosphor is preferably in the range of from 1 to 10 μm and more preferably in the range of from 2 to 7 μm from the standpoint of emission characteristics (balance between sensitivity and erasure).

The rare earth element-activated, alkaline earth metal fluorohalide based stimulable phosphor of the present invention can be advantageously used as a stimulable fluorescent material for the formation of the phosphor layer of a radiographic image conversion panel.

(2) Process for Preparation

The rare earth element-activated, alkaline earth metal fluorohalide based stimulable phosphor of the present invention can be prepared by a variety of preparing processes given below. First, the AA process is described.

AA Process

This is a preparing process comprising: a mother liquor preparing step for preparing a reactant mother liquor which is an aqueous solution containing $BaX_2$, a water-soluble compound of Ln, a halide, nitrate, nitrite, or acetate of MII in addition if x in the basic compositional formula (I) is not 0, and a halide, nitrate, nitrite, or acetate of MI in addition if y in the basic compositional formula (I) is not 0, wherein the solution has a $BaX_2$ concentration of 2.5 mol/L or less if X is Cl or Br, or alternatively, a $BaX_2$ concentration of 5.0 mol/L or less if X is I after the foregoing components are dissolved; a precipitate forming step for preparing the precipitate of crystals of a phosphor precursor by adding an aqueous solution of an inorganic fluoride salt to the reactant mother liquor kept at 20 to 100° C. while adjusting the adding rate in such a manner that the amount of the precipitate of crystals of a phosphor precursor to be formed during the addition is in the range of from 0.001 to 10 N/minute, where N is the amount of the precipitate of crystals of a phosphor precursor to be finally obtained; a separating step for separating the precipitate of crystals of a phosphor precursor from the aqueous solution; and a firing step for firing the separated precipitate of crystals of a phosphor precursor while avoiding sintering thereof.

In the present invention, an "aqueous solution" means a solution prepared by dissolving a "solute" in an "aqueous medium". The term "aqueous medium" is a notion which includes, needless to say, water, a liquid substance (such as alcohol) having a high affinity for water by itself or a mixture of a plurality of such substances, and a mixture of water therewith. Among these substances, water is most preferable. Accordingly, the term "aqueous solution" is used herein to mean all solutions prepared by using an "aqueous medium" as defined herein. Among these aqueous solutions, the most preferred is a solution prepared by using water as the "aqueous medium". On the other hand, the "solute" is appropriately selected depending on the the type of the aqueous solutions (raw material solution, reactant mother liquor, aqueous solution to be added, and the like).

The process for preparation is explained with respect to the constituent steps.

i) Mother Liquor Preparing Step

First, by using an aqueous medium, material compounds other than a fluorine-containing compound are dissolved to thereby prepare a reactant mother liquor. That is, $BaX_2$, a water-soluble compound of Ln, and, if necessary, a halide, nitrate, nitrite, or acetate of MII, and further, if necessary, a halide, nitrate, nitrite, or acetate of MI are placed in the aqueous medium, sufficiently mixed, and dissolved. In this way, an aqueous solution (reactant mother liquor) in which these components are dissolved is prepared. In this case, the proportion between the amounts of $BaX_2$ and the aqueous medium is adjusted such that the solution has a $BaX_2$ concentration of 2.5 mol/L or less if X is Cl or Br, or alternatively, a $BaX_2$ concentration of 5.0 mol/L or less if X is I. Examples of the water-soluble compound of Ln may include halides (specifically, chlorides, bromides, and so on), nitrates, nitrites, acetates, and the like of the aforementioned rare earth elements. If desired, the reactant mother liquor may contain a small amount of an acid, ammonia, a water-soluble polymer, a fine powder of a water-insoluble metal oxide, and so on.

ii) Precipitate Forming Step

The reactant mother liquor thus obtained is kept at 20 to 100° C., preferably at 40 to 80° C., and stirred. Then, an aqueous solution of an inorganic fluoride salt is added to the reactant mother liquor so as to obtain a precipitate of crystals of the phosphor precursor. Examples of the inorganic fluoride salt may include ammonium fluoride, fluorides of alkaline metals, fluorides of alkaline earth metals, hydrofluoric acid, and soon. Among these substances, ammonium fluoride and fluorides of alkaline metals are preferable from the standpoints of solubility, emission characteristics, and change in pH during reaction.

When the aqueous solution of an inorganic fluoride salt is added, it is preferable to adjust the adding rate in such a manner that the amount of the precipitate of crystals of a phosphor precursor to be formed during the addition is in the range of from 0.001 to 10 N/minute (more preferably in the range of from 0.01 to 1.0 N/minute), where N is the amount of the precipitate of crystals of a phosphor precursor to be finally obtained.

The reason why it is preferable that the adding rate of the aqueous solution of an inorganic fluoride salt is in the above-described range is explained below by using experimental data.

Crystals of a phosphor precursor were obtained by using aqueous $BaBr_2$ solutions having 4 levels of $BaBr_2$ concentrations of 1.0 mol/L, 1.5 mol/L, 2.0 mol/L, and 2.5 mol/L as reactant mother liquors, and by actually adding 300 mL of an aqueous solution of $NH_4F$ (5 mol/L) at 5 adding rates of (1) 0.3 mL/minute, (2) 3 mL/minute, (3) 30 mL/minute, (4) 300 mL/minute, and (5) 3000 mL/minute (the details of this experiment are the same as those of Example A1 (concentration of aqueous solution of $BaBr_2$: 1.0 mol/L) to Example A4 (concentration of aqueous solution of $BaBr_2$: 2.5 mol/L) except for the adding rate of the aqueous solution of inorganic fluoride salt).

The precipitates of the crystals of a phosphor precursor obtained were subjected to the following separating step and firing step (specifically the same procedure as that of Example A1 described later) and the rare earth element-activated, alkaline earth metal fluorohalide based stimulable phosphors were prepared. The grain size median diameters (Dm) of the rare earth element-activated, alkaline earth metal fluorohalide based stimulable phosphors thus prepared are shown in table 2.

TABLE 2

Table 2 illustrates the relationship between the $BaBr_2$ concentration in reactant mother liquor, the adding rate of aqueous solution of inorganic fluoride salt, and the grain size median diameter (Dm)

| Adding rate (mL/minute) | $BaBr_2$ concentration in reactant mother liquor (mol/L) | | | |
|---|---|---|---|---|
| | 1.0 | 1.5 | 2.0 | 2.5 |
| 0.3 | 25.12 | 12.21 | 7.97 | 5.15 |
| 3 | 8.95 | 5.17 | 3.51 | 2.02 |
| 30 | 4.10 | 2.59 | 1.68 | 1.16 |
| 300 | 2.03 | 1.45 | 1.12 | 0.87 |
| 3000 | 1.22 | 1.08 | 0.95 | 0.75 |

Figure 5:
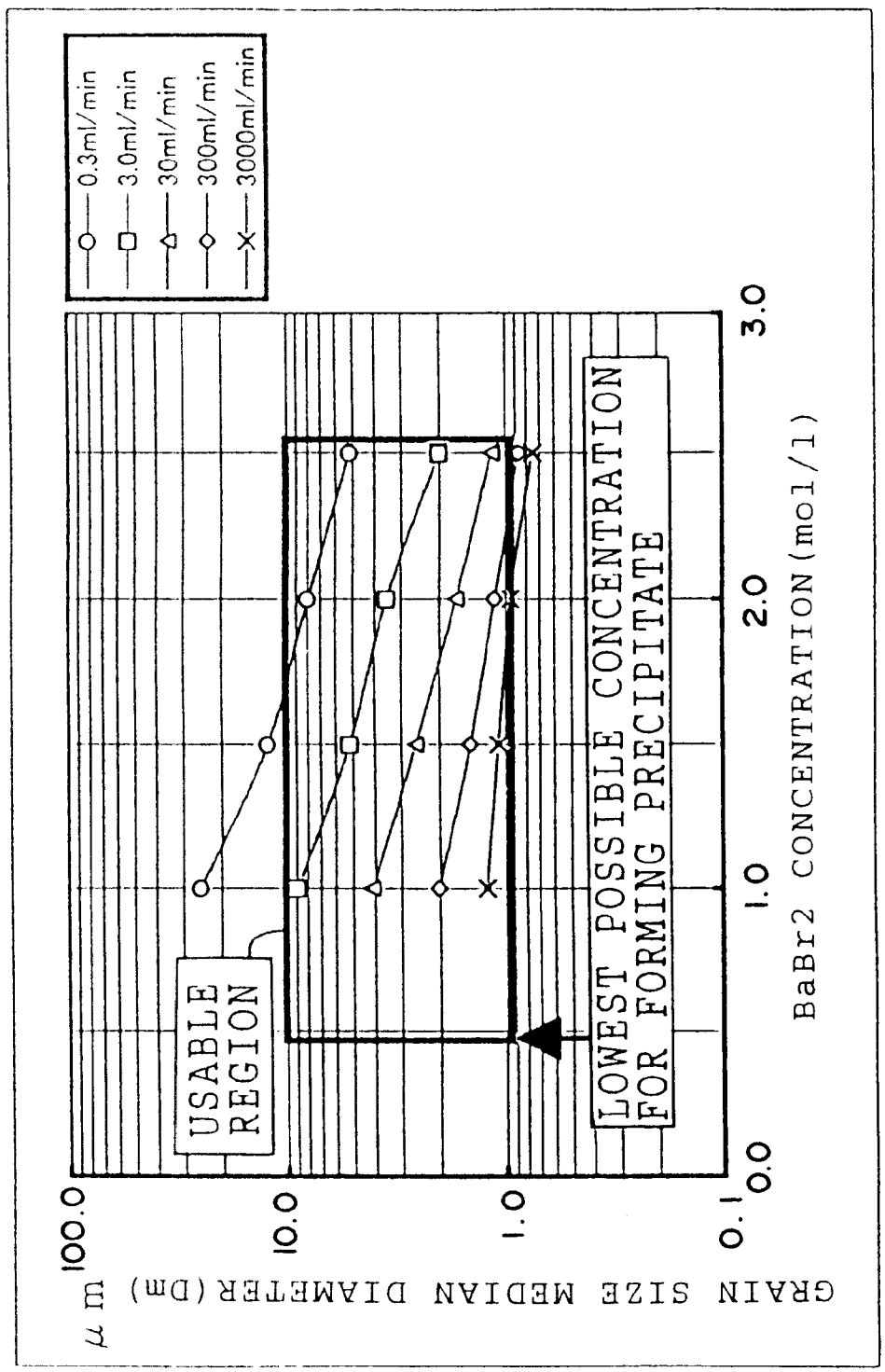
FIG. 5 is a graph illustrating the relationship between the $BaBr_2$ concentration in the reactant mother liquor, the adding rate of aqueous solution of inorganic fluoride salt, and the grain size median diameter (Dm) in the AA process of the present invention.

Based on the results shown in Table 2, FIG. 5 illustrates, by graphs, the relationship between the $BaBr_2$ concentration in the reactant mother liquor, the adding rate of aqueous solution of inorganic fluoride salt, and the grain size median diameter (Dm). The graphs of FIG. 5 indicate as a usable region the region between 1 μm which is the lower limit of the grain size median diameter (Dm) specified as the target grain size of the present invention, 10 μm which is the upper limit in the same sense, 0.5 mol/L which is the lowest possible concentration for forming the precipitate of crystals of a phosphor precursor from the aqueous $BaBr_2$ solutions, and 2.5 mol/L which is a saturated concentration of the aqueous $BaBr_2$ solution and constitutes the upper limit.

It can be seen from the graphs of FIG. 5 that almost all of each graph is included in the usable region of the graphs in a stable manner if the adding rate of aqueous solution of inorganic fluoride salt is in the range of from 3 to 3000 mL/minute.

Since the amount of the aqueous solution of inorganic fluoride salt is 300 mL as stated previously, the above-described results teach that the range of from 0.001 to 10 N/minute is preferable and the range of from 0.01 to 1.0 N/minute is more preferable.

Figure 6:
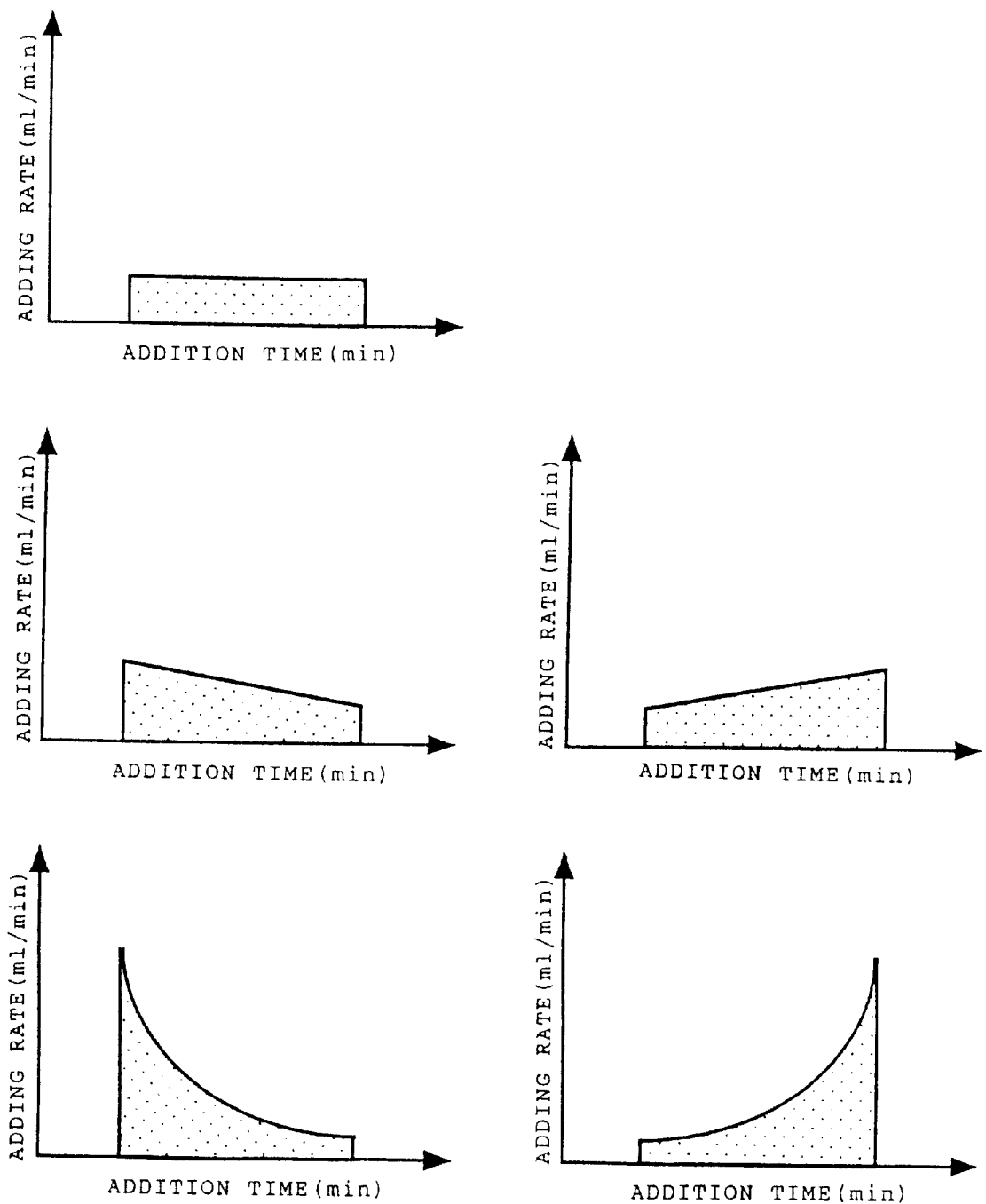
FIG. 6 are graphs illustrating addition patterns in the precipitate forming step according to the AA process of the present invention.

In order to adjust precisely the adding rate, the addition is made preferably by a precision pump (such as a precision cylinder pump, a precision gear pump, a tube pump, a diaphragm pump, or the like). Although the addition is ordinarily made at a constant adding rate, the adding rate may change with respect to addition time continuously or discontinuously in a function of n-degree (n=1, 2, or 3), exponential function, or differential function (see FIG. 6). This addition is made preferably to a regional part which is being particularly vigorously stirred.

The addition of the aqueous solution of inorganic fluoride salt to the reactant mother liquor causes the precipitation of the crystals of the phosphor precursor of the rare earth element-activated, alkaline earth metal fluorohalide based stimulable phosphor represented by the compositional formula (I).

An object of the present invention is to control simultaneously grain aspect ratio, grain size, and grain size distribution in addition to grain shape. This can be achieved in this precipitate forming step by properly combining the adding rate of the aqueous solution of inorganic fluoride salt with the $BaX_2$ concentration of the reactant mother liquor.

iii) Separating Step

The precipitate of crystals of the phosphor precursor obtained in the above-described manner is separated from the aqueous solution by a separating means such as suction filtration, pressurized filtration, centrifugal separation, and the like. The precipitate of crystals of the phosphor precursor thus separated is sufficiently washed with a lower alcohol such as methanol, and thereafter dried.

iv) Firing Step

The precipitate of the crystals of the phosphor precursor separated in the preceding step is fired while exercising caution to avoid sintering. Examples of the method for avoiding sintering may include a method wherein a sintering preventing agent composed of a fine powder of a metal oxide, such as alumina, silica, zirconia, titania, magnesia, or the like, is blended with the crystals of the phosphor precursor so as to adhere the fine powder of the sintering preventing agent to the surface of the crystals and thereafter the crystals are fired. It is also possible to omit the use of the sintering preventing agent by properly adjusting the firing conditions.

Examples of the specific firing method may include a method wherein the crystals of the phosphor precursor, which has the fine powder of the sintering preventing agent adhered to the surface thereof if necessary, are packed into a heat-resistant container such as a quartz boat, an alumina boat, a quartz crucible, an alumina crucible, or the like and thereafter placed in a core of an electric furnace or the like. The firing temperature is preferably in the range of from 400 to 1300° C.and more preferably in the range of from 500 to 1000° C. A proper firing time is generally 0.5 to 12 hours although it varies depending on the packed amount of the crystals of the phosphor precursor, firing temperatures, temperatures at which the fired crystals are taken out, and the like. Examples of the firing atmosphere employed include a neutral atmosphere such as a nitrogen atmosphere, an argon gas atmosphere, or the like, a weakly reducing atmosphere such as a nitrogen atmosphere containing a small amount of hydrogen gas, a carbon dioxide atmosphere containing carbon monoxide, and the like, and an atmosphere having a small amount of oxygen introduced.

After the firing, the target rare earth element-activated, alkaline earth metal fluorohalide based stimulable phosphor can be obtained.

The rare earth element-activated, alkaline earth metal fluorohalide based stimulable phosphor in the present invention can also be prepared by any one of the following 4 preparing processes (BA) to (BD).

BA Process

This is a process for preparing the rare earth element-activated, alkaline earth metal fluorohalide based stimulable phosphor, comprising: a mother liquor preparing step for preparing a reactant mother liquor which is an aqueous solution containing $BaX_2$, a halide, nitrate, nitrite, or acetate of MII in addition if x in the basic compositional formula (I) is not 0, and a halide, nitrate, nitrite, or acetate of MI in addition if y in the basic compositional formula (I) is not 0 (excluding, however, any of the above components which is to be added simultaneously with an aqueous solution of an inorganic fluoride salt to thereby cause no deficiency thereof), wherein the solution has a $BaX_2$ concentration of 2.5 mol/L or less if X is Cl or Br, or alternatively, a $BaX_2$ concentration of 5.0 mol/L or less if X is I after the foregoing components are dissolved; a precipitate forming step for preparing the precipitate of crystals of a phosphor precursor by adding an aqueous solution of an inorganic fluoride salt, an aqueous solution containing a water-soluble compound of Ln, and an aqueous solution of a halide, nitrate, nitrite, or acetate of MI and/or an aqueous solution of a halide, nitrate, nitrite, or acetate of MII simultaneously to the reactant mother liquor which has been kept at 20 to 100° C.; a separating step for separating the precipitate of crystals of a phosphor precursor from the aqueous solution; and a firing step for firing the separated precipitate of crystals of a phosphor precursor while avoiding sintering thereof.

BB Process

This is a process for preparing the rare earth element-activated, alkaline earth metal fluorohalide based stimulable phosphor, comprising: a mother liquor preparing step for preparing a reactant mother liquor which is an aqueous solution containing $BaX_2$, a water-soluble compound of Ln, a halide, nitrate, nitrite, or acetate of MII in addition if x in the basic compositional formula (I) is not 0, and a halide, nitrate, nitrite, or acetate of MI in addition if y in the basic compositional formula (I) is not 0 (excluding, however, any of the above components which is to be added simultaneously with an aqueous solution of an inorganic fluoride salt to thereby cause no deficiency thereof), wherein the solution has a $BaX_2$ concentration of 2.5 mol/L or less if X is Cl or Br, or alternatively, a $BaX_2$ concentration of 5.0 mol/L or less if X is I after the foregoing components are dissolved; a precipitate forming step for preparing the precipitate of crystals of a phosphor precursor by adding an aqueous solution of an inorganic fluoride salt, an aqueous solution of a halide, nitrate, nitrite, or acetate of MI and/or an aqueous solution of a halide, nitrate, nitrite, or acetate of MII (excluding the case where both x and y of the basic compositional formula (I) are 0) simultaneously to the reactant mother liquor which has been kept at 20 to 100° C.; a separating step for separating the precipitate of crystals of a phosphor precursor from the aqueous solution; and a firing step for firing the separated precipitate of crystals of a phosphor precursor while avoiding sintering thereof.

BC Process

This is a process for preparing the rare earth element-activated, alkaline earth metal fluorohalide based stimulable phosphor, comprising: a mother liquor preparing step for preparing a reactant mother liquor which is an aqueous solution containing $NH_4X$, a halide, nitrate, nitrite, or acetate of MII in addition if x in the basic compositional formula (I) is not 0, and a halide, nitrate, nitrite, or acetate of MI in addition if y in the basic compositional formula (I) is not 0 (excluding, however, any of the above components which is to be added simultaneously with an aqueous solution of an inorganic fluoride salt to thereby cause no deficiency thereof), wherein the solution has an $NH_4X$ concentration of 4.5 mol/L or less after the foregoing components are dissolved; a precipitate forming step for preparing the precipitate of crystals of a phosphor precursor by adding an aqueous solution of $BaX_2$, an aqueous solution of an inorganic fluoride salt, an aqueous solution containing a water-soluble compound of Ln, and an aqueous solution of a halide, nitrate, nitrite, or acetate of MI and/or an aqueous solution of a halide, nitrate, nitrite, or acetate of MII, simultaneously and in such a manner that the molar ratio of fluorine in the inorganic fluoride to $BaX_2$ is kept constant, to the reactant mother liquor which has been kept at 20 to 100° C.; a separating step for separating the precipitate of crystals of a phosphor precursor from the aqueous solution; and a firing step for firing the separated precipitate of crystals of a phosphor precursor while avoiding sintering thereof.

BD Process

This is a process for preparing the rare earth element-activated, alkaline earth metal fluorohalide based stimulable phosphor, comprising: a mother liquor preparing step for preparing a reactant mother liquor which is an aqueous solution containing $NH_4X$, a water-soluble compound of Ln, a halide, nitrate, nitrite, or acetate of MII in addition if x in the basic compositional formula (I) is not 0, and a halide, nitrate, nitrite, or acetate of MI in addition if y in the basic compositional formula (I) is not 0 (excluding, however, any of the above components which is to be added simultaneously with an aqueous solution of an inorganic fluoride salt to thereby cause no deficiency thereof), wherein the solution has an $NH_4X$ concentration of 4.5 mol/L or less after the foregoing components are dissolved; a precipitate forming step for preparing the precipitate of crystals of a phosphor precursor by adding an aqueous solution of $BaX_2$, an aqueous solution of an inorganic fluoride salt, an aqueous solution containing a water-soluble compound of Ln, and an aqueous solution of a halide, nitrate, nitrite, or acetate of MI and/or an aqueous solution of a halide, nitrate, nitrite, or acetate of MII (excluding the case where both x and y of the basic compositional formula (I) are 0), simultaneously and in such a manner that the molar ratio of fluorine in the inorganic fluoride to $BaX_2$ is kept constant, to the reactant mother liquor which has been kept at 20 to 100° C.; a separating step for separating the precipitate of crystals of a phosphor precursor from the aqueous solution; and a firing step for firing the separated precipitate of crystals of a phosphor precursor while avoiding sintering thereof.

In the aforedescribed processes (BA) to (BD), the process (BB) differs from the process (BA) and the process (BD) differs from the process (BC), respectively, in that the reactant mother liquor of the former process contains "a water-soluble compound of Ln" as a component in the mother liquor preparing step and the addition of an alkaline metal salt and an alkaline earth metal salt is not essential in the precipitate forming step.

The processes (BA) to (BD) are explained with respect to their constituent steps.

[Processes (BA) and (BB)

i) Mother Liquor Preparing Step

First, by using an aqueous medium, material compounds other than a fluorine-containing compound are dissolved to thereby prepare a reactant mother liquor. That is, $BaX_2$ (and a water-soluble compound of Ln in Process (BB)), and, if necessary, a halide, nitrate, nitrite, or acetate of MII, and further, if necessary, a halide, nitrate, nitrite, or acetate of MI are placed in the aqueous medium, sufficiently mixed, and dissolved. In this way, an aqueous solution (reactant mother liquor) in which these components (excluding, however, any of the above components which is to be added simultaneously with an aqueous solution of an inorganic fluoride salt to thereby cause no deficiency thereof) are dissolved is prepared. In this case, the proportion between the amounts of $BaX_2$ and the aqueous medium is adjusted such that the solution has a $BaX_2$ concentration of 2.5 mol/L or less if X is Cl or Br, or alternatively, a $BaX_2$ concentration of 5.0 mol/L or less if X is I. If desired, the reactant mother liquor may contain a small amount of an acid, ammonia, a water-soluble polymer, a fine powder of a water-insoluble metal oxide, and so on.

ii) Precipitate Forming Step

The reactant mother liquor thus obtained is kept at 20 to 100° C., preferably at 40 to 80° C., and stirred. Then, an aqueous solution of an inorganic fluoride salt, an aqueous solution containing a water-soluble compound of Ln, and an aqueous solution of a halide, nitrate, nitrite, or acetate of MI and/or an aqueous solution of a halide, nitrate, nitrite, or acetate of MII (excluding the case in Process BB where both x and y of the basic compositional formula (I) are 0) are added simultaneously, preferably by use of a precision pump, to the reactant mother liquor to thereby obtain a precipitate of crystals of the phosphor precursor. Examples of the inorganic fluoride salt may include ammonium fluoride, fluorides of alkaline metals, fluorides of alkaline earth metals, fluorides of transition metals, hydrofluoric acid, and so on. Among these substances, ammonium fluoride and fluorides of alkaline metals are preferable from the standpoints of solubility, emission characteristics, and change in pH during reaction.

When the aqueous solution of an inorganic fluoride salt is added, it is preferable to adjust the adding rate in such a manner that the amount of the precipitate of crystals of a phosphor precursor to be formed during the addition is in the range of from 0.001 to 10 N/minute (more preferably in the range of from 0.01 to 1.0 N/minute, where N is the amount of the precipitate of crystals of a phosphor precursor to be finally obtained. Adding rates outside the above-described range are not desirable, because a larger adding rate may cause the Dm of the phosphor precursor to become 1.0 μm or less or the grain aspect ratio to become 2 or greater, whereas a smaller adding rate may cause the Dm of the phosphor precursor to become 10 μm or more. In order to adjust precisely the adding rate, the addition is made preferably by a precision pump (such as a precision cylinder pump, a precision gear pump, a tube pump, a diaphragm pump, or the like). Although the addition is ordinarily made at a constant adding rate, the adding rate may change with respect to the addition time continuously or discontinuously in a function of n-degree (n=1, 2, or 3), exponential function, or differential function (see FIG. 6). This addition is made preferably to a regional part which is being particularly vigorously stirred.

As to the addition of the other aqueous solutions to be added simultaneously with the aqueous solution of the inorganic fluoride salt, the adding rates are not restricted and the addition starts and ends during the addition of the aqueous solution of the inorganic fluoride salt. In particular, it is preferable to add these other aqueous solutions in such a manner that the adding rates vary continuously or discontinuously during the addition thereof, in order to cause the distribution of the added substances to vary in the base to thereby upgrade the emission characteristics.

The addition of these aqueous solutions to the reactant mother liquor causes the precipitation of crystals of the phosphor precursor of the rare earth element-activated, alkaline earth metal fluorohalide based stimulable phosphor represented by the compositional formula (I).

iii) Separating Step and Firing Step

The precipitate of crystals of a phosphor precursor obtained in the above-described way is subjected to a separating step for the separation thereof from the aqueous solution and to a firing step for firing the separated precipitate of crystals of a phosphor precursor while avoiding sintering thereof. After that, the target rare earth element-activated, alkaline earth metal fluorohalide based stimulable phosphor is obtained. The details of the separating step and the firing step are the same as those of Process (AA).

[Processes (BC) and (BD)

Processes (BC) and (BD) are explained in detail below.

i) Mother Liquor Preparing Step

First, by using an aqueous medium, material compounds other than a fluorine-containing compound are dissolved to thereby prepare a mother liquor. That is, $NH_4X$ (and a water-soluble compound of Ln in Process (BD)), and, if necessary, a halide, nitrate, nitrite, or acetate of MII, and further, if necessary, a halide, nitrate, nitrite, or acetate of MI are placed in the aqueous medium, sufficiently mixed, and dissolved. In this way, an aqueous solution (reactant mother liquor) in which these components (excluding, however, any of the above components which is to be added simultaneously with the aqueous solution of an inorganic fluoride salt to thereby cause no deficiency thereof) are dissolved is prepared. In this case, the proportion between the amounts of $NH_4X$ and the aqueous medium is adjusted such that the solution has an $NH_4X$ concentration of 4.5 mol/L or less, preferably 2.0 to 4.5 mol/L, and more preferably 3.0 to 4.5 mol/L. If desired, the reactant mother liquor may contain a small amount of an acid, ammonia, a water-soluble polymer, a fine powder of a water-insoluble metal oxide, and so on.

ii) Precipitate Forming Step

The reactant mother liquor thus obtained is kept at 20 to 100° C., preferably at 40 to 80° C., and stirred. And, an aqueous solution of $BaX_2$, an aqueous solution of an inorganic fluoride salt, an aqueous solution containing a water-soluble compound of Ln, and an aqueous solution of a halide, nitrate, nitrite, or acetate of MI and/or an aqueous solution of a halide, nitrate, nitrite, or acetate of MII (excluding the case where both x and y of the basic compositional formula (I) are 0 in Process (BD)) are added, simultaneously and in such a manner that the molar ratio of fluorine in the inorganic fluoride to $BaX_2$ is kept constant, preferably by use of a precision pump, to the reactant mother liquor to thereby obtain a precipitate of the crystals of the phosphor precursor. Examples of the inorganic fluoride salt may include ammonium fluoride, fluorides of alkaline metals, fluorides of alkaline earth metals, fluorides of transition metals, hydrofluoric acid, and so on. Among these substances, ammonium fluoride and fluorides of alkaline metals are preferable from the standpoints of solubility, emission characteristics, and change in pH during reaction.

When the aqueous solution of an inorganic fluoride salt and the aqueous solution of $BaX_2$ are added, it is preferable to add the aqueous solution of an inorganic fluoride salt and the aqueous solution of $BaX_2$ by adjusting the adding rates in such a manner that the amount of the precipitate of crystals of a phosphor precursor to be formed during the addition is in the range of from 0.001 to 10 N/minute (more preferably in the range of from 0.01 to 1.0 N/minute), where N is the amount of the precipitate of crystals of a phosphor precursor to be finally obtained. Adding rates outside the above-described range are not desirable, because a larger adding rate may cause the Dm of the phosphor precursor to become 1.0 $\mu$m or less or the grain aspect ratio to become 2 or greater, whereas a smaller adding rate may cause the Dm of the phosphor precursor to become 10 $\mu$m or more. In order to adjust precisely the adding rate, the addition is made preferably by a precision pump (such as a precision cylinder pump, a precise gear pump, a tube pump, a diaphragm pump, and the like). Although the addition is ordinarily made at a constant adding rate, the adding rate may change with respect to addition time continuously or discontinuously in a function of n-degree (n=1, 2, or 3), exponential function, or differential function. This addition is made preferably to a regional part which is being particularly vigorously stirred.

As to the addition of the other aqueous solutions to be added simultaneously with the aqueous solution of the inorganic fluoride salt and the aqueous solution of $BaX_2$, the adding rates are not restricted and the addition starts and ends during the addition of the aqueous solution of the inorganic fluoride salt and the aqueous solution of $BaX_2$. In particular, it is preferable to add these other aqueous solutions in such a manner that the adding rates vary continuously or discontinuously during the addition thereof in order to cause the distribution of the added substances to vary in the base to thereby upgrade the emission characteristics.

The addition of these aqueous solutions to the reactant mother liquor causes the precipitation of crystals of the phosphor precursor of the rare earth element-activated, alkaline earth metal fluorohalide based stimulable phosphor represented by the compositional formula (I).

iii) Separating Step and Firing Step

The precipitate of crystals of a phosphor precursor obtained in the above-described way is subjected to a separating step for the separation thereof from the aqueous solution and to a firing step for firing the separated precipitate of crystals of a phosphor precursor while avoiding sintering thereof. After that, the target rare earth element-activated, alkaline earth metal fluorohalide based stimulable phosphor is obtained. The details of the separating step and the firing step are the same as those of Process (AA).

Further, the rare earth element-activated, alkaline earth metal fluorohalide based stimulable phosphor in the present invention may be prepared by the following Process (CA).

CA Process

This is a process for preparing the rare earth element-activated, alkaline earth metal fluorohalide based stimulable phosphor, comprising: a mother liquor preparing step for preparing a reactant mother liquor which is an aqueous solution containing $NH_4X$, an aqueous solution of a water-soluble compound of Ln, a halide, nitrate, nitrite, or acetate of MII in addition if x in the basic compositional formula (I) is not 0, and a halide, nitrate, nitrite, or acetate of MI in addition if y in the basic compositional formula (I) is not 0 and which has an $NH_4X$ concentration of between 2.0 and 4.5 mol/L; a precipitate forming step for preparing the precipitate of crystals of a phosphor precursor by adding an aqueous solution of an inorganic fluoride salt and an aqueous solution of $BaX_2$, in such a manner that the molar ratio of fluorine in the inorganic fluoride to $BaX_2$ is kept constant, to the reactant mother liquor which has been kept at 20 to 100° C.; a separating step for separating the precipitate of crystals of a phosphor precursor from the aqueous solution; and a firing step for firing the separated precipitate of crystals of a phosphor precursor while avoiding sintering thereof; characterized in that, in the precipitate forming step, the average adding rates of the aqueous solution of an inorganic fluoride salt and the aqueous solution of $BaX_2$ in the period ranging from the start of the addition to t (0<t<T, where T indicates the time when the addition ends) are faster than the average adding rates, respectively, in the period ranging from t to T.

Details of the steps are given below.

i) Mother Liquor Preparing Step

A reactant mother liquor is prepared by placing at least $NH_4X$ and a water-soluble compound of Ln in an aqueous medium, followed by mixing and dissolving these substances. X of $NH_4X$ represents at least one halogen selected from the group consisting of Cl, Br, and I and can be selected in accordance with the composition of the final product desired. Adjustment is made so that the $NH_4X$ concentration is between 2.0 and 4.5 mol/L and preferably between 3.0 and 4.5 mol/L. Ln represents at least one rare earth element selected from the group consisting of Ce, Pr, Sm, Eu, Gd, Tb, Tm, and Yb and can be selected in accordance with the composition of the final product desired. Examples of the water-soluble compound of Ln may include halides (chlorides, bromides, and the like), nitrates, acetates, and so on of the aforementioned rare earth elements.

In the case where x of the compositional formula (I) is not 0, a halide, nitrate, nitrite, or acetate of MII in addition is dissolved in the aqueous medium in a similar way. MII represents at least one alkaline earth metal selected from the group consisting of Sr and Ca and can be selected in accordance with the composition of the final product desired. Further, in the case where y of the compositional formula (I) is not 0, a halide, nitrate, nitrite, or acetate of MI in addition is dissolved in the aqueous medium in a similar way. MI represents at least one alkaline metal selected from the group consisting of Li, Na, K, Rb, and Cs and can be selected in accordance with the composition of the final product desired. In addition to these components, the reactant mother liquor may contain a small amount of an acid, ammonia, a water-soluble polymer, a fine powder of a water-insoluble metal oxide, and so on.

In the present invention, an "aqueous solution" means a solution prepared by dissolving a "solute" in an "aqueous medium". The term "aqueous medium" is a notion which includes, needless to say, water, a liquid substance (such as alcohol) having a high affinity for water by itself or a mixture of a plurality of such substances, and a mixture of water therewith. Among these substances, water is most preferable. Accordingly, the term "aqueous solution" is used herein to mean all solutions prepared by using an "aqueous medium" as defined herein. Among these aqueous solutions, the most preferred is a solution prepared by using water as the "aqueous medium".

ii) Precipitate Forming Step

An aqueous solution of $BaX_2$ and an aqueous solution of an inorganic fluoride salt are each added to the reactant mother liquor thus prepared. It is preferable that the addition is made while the reactant mother liquor is stirred and it is particularly preferable that the aqueous solutions are added to the central part being stirred (the vigorously stirred part) of the reactant mother liquor. In $BaX_2$, X represents at least one halogen selected from the group consisting of Cl, Br, and I and can be selected in accordance with the composition of the final product desired. Examples of the inorganic fluoride salt to be used may include ammonium fluoride, fluorides of alkaline metals, fluorides of alkaline earth metals, fluorides of transition metals, hydrofluoric acid, and so on. Among these substances, ammonium fluoride and fluorides of alkaline metals are preferable from the standpoints of solubility, emission characteristics, and change in pH during the reaction. The aqueous solution of an inorganic fluoride and the aqueous solution of $BaX_2$ are set in such a proportion that the molar ratio of fluorine to $BaX_2$ contained in respective solutions is always kept constant. The use of a precision pump, such as a precision cylinder pump, a precise gear pump, a tube pump, a diaphragm pump, and the like, is preferable, because the adding rate can be controlled in a highly precise manner. The reactant mother liquor is kept at 20 to 100° C. while the aqueous solution of $BaX_2$ and the aqueous solution of an inorganic fluoride salt are added.

In the present invention, the addition needs to be made such that the average adding rates of the aqueous solution of an inorganic fluoride salt and the aqueous solution of $BaX_2$ in the period ranging from the start of the addition to t (0<t<T, where T indicates the time when the addition ends) are faster than the average adding rates, respectively, in the period ranging from t to T. In the initial stage of the addition of the aqueous solution of an inorganic fluoride salt and the aqueous solution of $BaX_2$, mother nuclei of the precursor crystal grains of the stimulable phosphor are formed. If the number of the mother nuclei is too large, amorphous fine grains may be formed, or alternatively, the shapes or grains sizes of the crystal grains may be nonuniform. On the other hand, if the number of the mother nuclei is too small, the crystal grains may exhibit peculiar growth in the direction of a crystal axis C and become columnar. In the present invention, the formation of the mother nuclei is promoted in the initial stage of addition and the growth of the mother nuclei is promoted while inhibiting the formation of mother nuclei in the latter stage of the addition, by adjusting the adding rates of the two aqueous solutions in the above-described way. In this way, grain size, grain size distribution, and shape of the crystals of the phosphor precursor to be obtained are controlled.

In the present invention, the adding rates of the aqueous solution of an inorganic fluoride salt and the aqueous solution of $BaX_2$ may change with respect to time provided that the adding rates meet the above-described conditions. For example, respective initial rates $V_0$ and $V_{0'}$ may be maintained until an arbitrary time t to thereby form mother nuclei, and thereafter the adding rates may be maintained at $V_t$ and $V_{t'}$ (where $V_t<V_0$ and $V_{t'}<V_{0'}$) in the time period ranging from t to T when the addition ends to thereby promote the growth of the mother nuclei. The adding rate may change with respect to addition time and the change may be continuous or discontinuous. Alternatively, a combination of a continuous change and a discontinuous change is also possible. When the adding rates of the two aqueous solutions change with respect to time, the change may be in a function of n-degree (n=1, 2, or 3), exponential function, or differential function. In addition, the change of the adding rate with respect to time may be in accordance with an addition pattern exhibiting a hysteresis curve, a cos function, and the like.

Figure 9A:
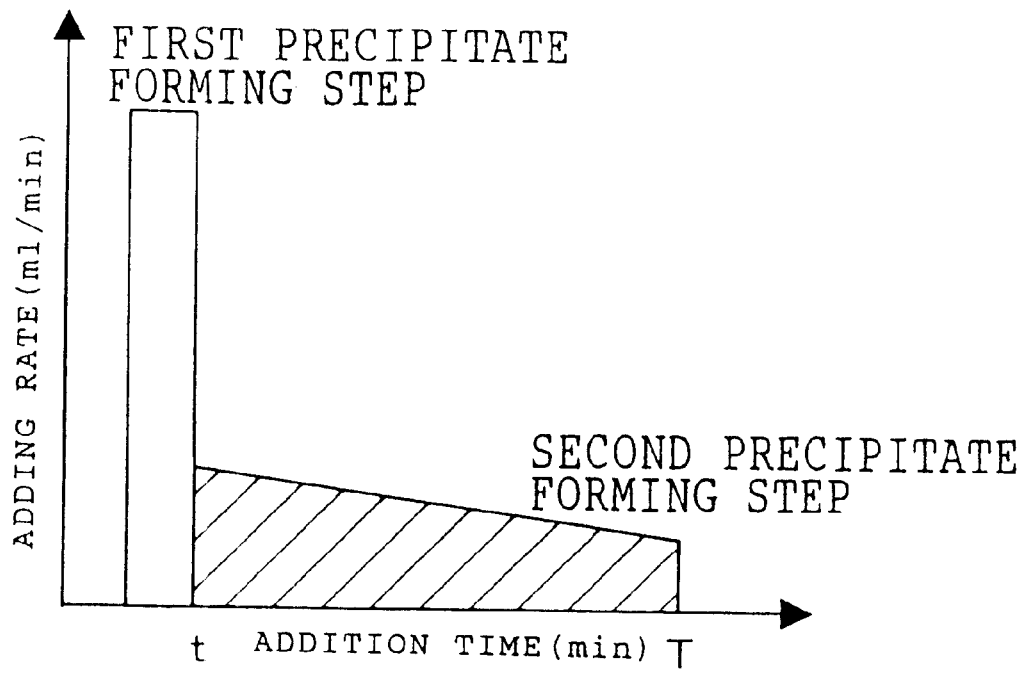
FIGS. 9A and 9B are graphs illustrating another examples of addition patterns in the first and second adding steps according to the CA process of the present invention.
Figure 9B:
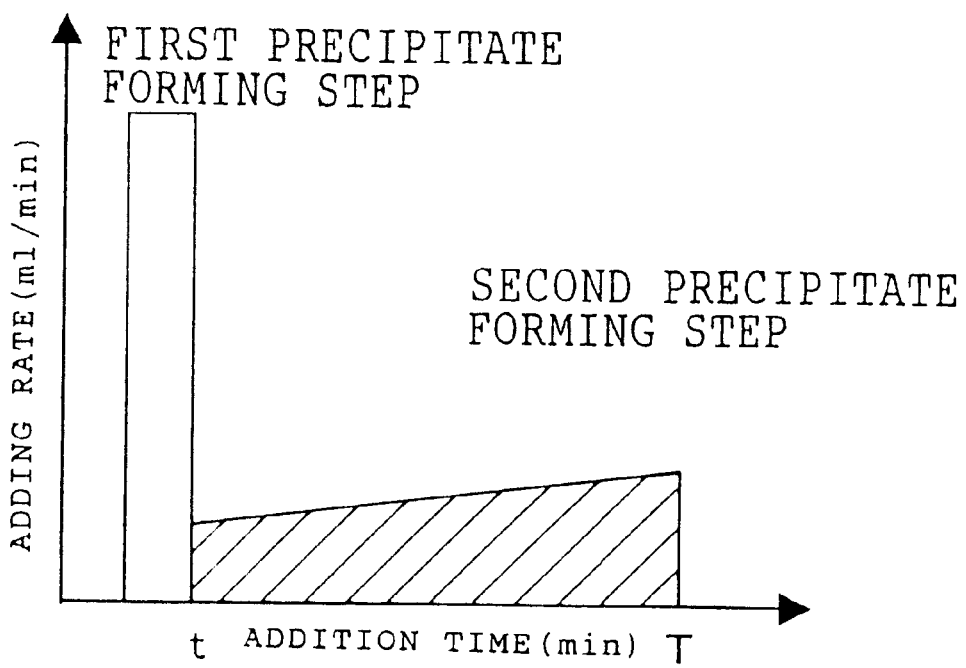
Figure 10A:
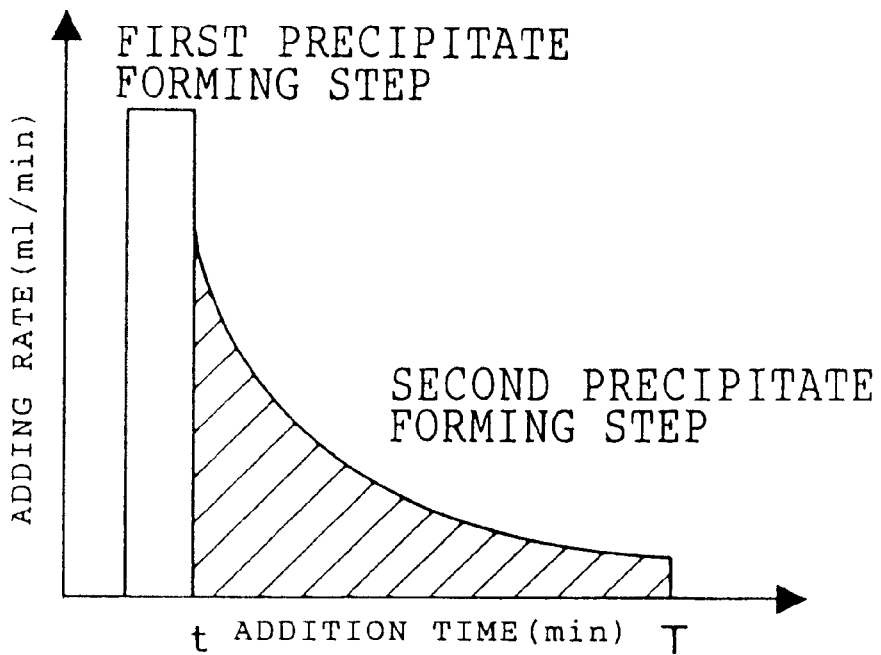
FIGS. 10A and 10B are graphs illustrating yet another examples of addition patterns in the first and second adding steps according to the CA process of the present invention.
Figure 10B:
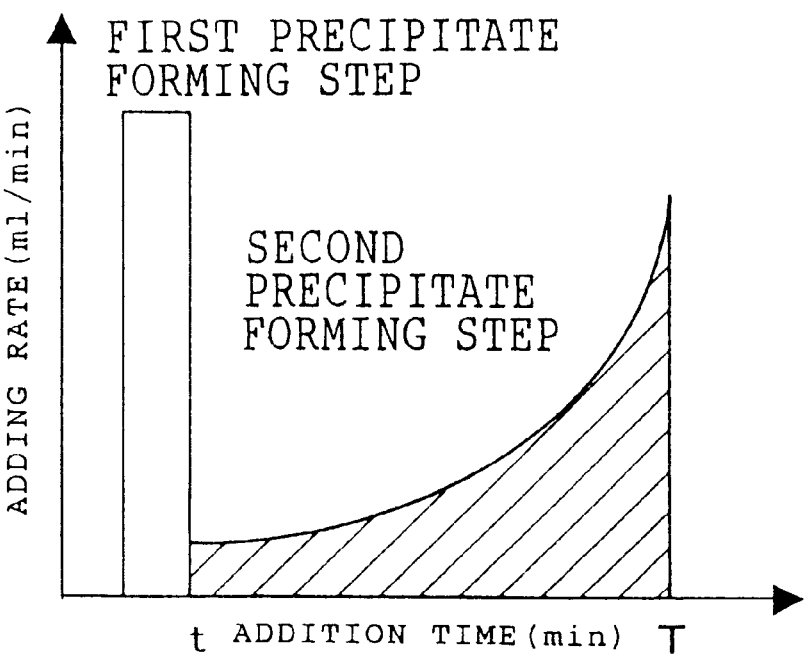

In FIGS. 8 to 10, some examples of the mode of addition pattern of the aqueous solution of an inorganic fluoride salt (or of the aqueous solution of $BaX_2$) are shown. However, the addition patterns in the process of the present invention are not limited to these examples.

Figure 8A:
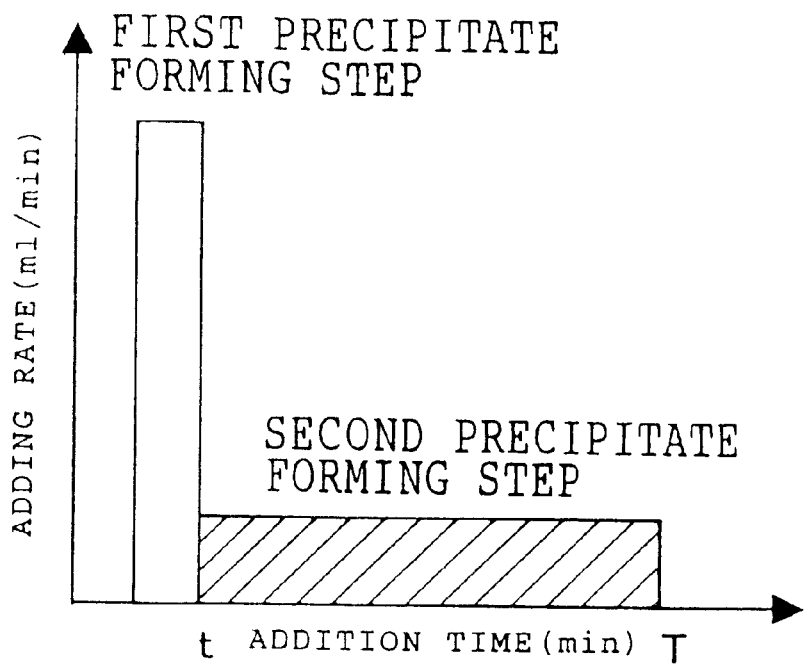
FIGS. 8A and 8B are graphs illustrating examples of addition patterns in the first and second adding steps according to the CA process of the present invention.
Figure 8B:
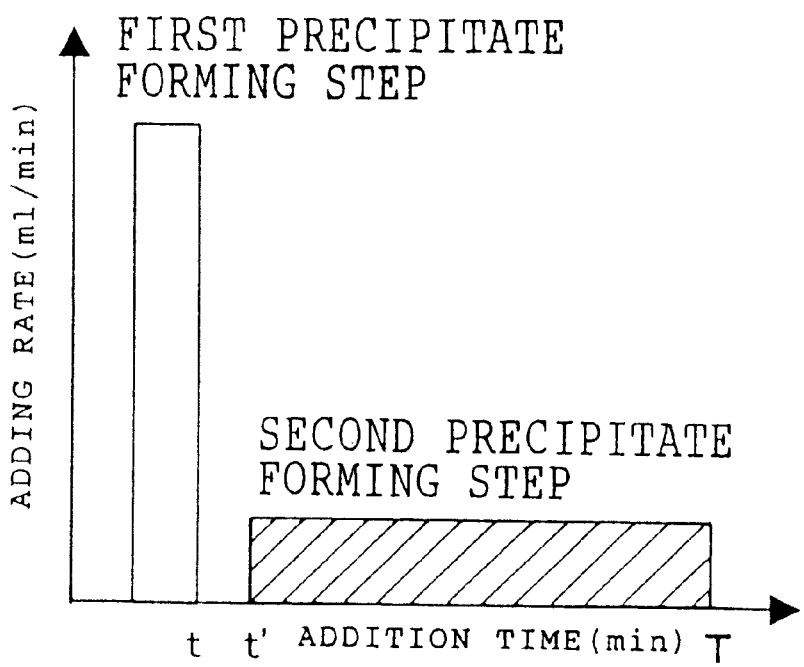

It is preferable to carry out the addition in two steps consisting of a first precipitate forming step in which the addition is made at a faster average adding rate and a second precipitate forming step in which the addition is made at a slower average adding rate, as shown in FIGS. 8 to 10. This type of two-step addition is preferable because it allows better control of grain shape, grain size, and the like of the crystals of the phosphor precursor. In this case, from the standpoint of producing the necessary amount of uniform mother nuclei, it is preferable to keep the adding rate constant in the first precipitate forming step. In the second precipitate forming step, the adding rate maybe kept constant (FIGS. 8(a) and (b)), the adding rate may decrease with time (FIG. 9(a) and FIG. 10(a)), or the adding rate may increase with time (FIG. 9(b) and FIG. 10(a)). The case in which the adding rate is kept constant results in the advantage that the grain sizes become uniform; the case in which the adding rate decreases with time results in the advantage that the grains have better crystallinity (stabilized exterior shape); and the case in which the adding rate increases with time results in the better production efficiency such as shortening of the time required for the production.

In the present invention, the curves indicating the change with time of the aqueous solution of an inorganic fluoride salt and the aqueous solution of $BaX_2$, respectively, may or may not have an inflection point (or bending point). The number of such points is not particularly limited if the curve has such a point. The term "bending point" as used herein means an intersecting point of two straight lines in a curve consisting of a combination of a plurality of straight lines having different gradients, as in FIG. 11(a), FIGS. 12(a) and (b), and FIG. 13(b), which intersecting point is indicated by an arrow in these figures. Meanwhile, the "inflection point" as used herein means a bending point in a curve obtained by approximating a curve, which is composed of non-straight lines such as a curve shown in FIG. 11(b), FIG. 12(c), or FIG. 13(c), to a curve consisting of a combination of straight lines having different gradients.

FIGS. 11(a) and (b) illustrates an example of curve having one inflection point (or bending point); FIGS. 12(a) to (c) illustrate examples of curve having two inflection points; and FIGS. 13(a) and (b) illustrate examples of curve having three or more inflection points. If the number of inflection points (or bending points) is one, it is preferable that the time ranging from the start of the addition to the inflection point (or bending point) constitutes the first precipitate forming step and the time ranging from the inflection point (or bending point) to T constitutes the second precipitate forming step. If the number of inflection points (or bending points) is two, it is preferable that the time ranging from the start of the addition to the midpoint of the two inflection points (or bending points) constitutes the first precipitate forming step and the time ranging from the midpoint of the two inflection points (or bending points to T constitutes the second precipitate forming step. If the number of inflection points (or bending points) is three or more, it is preferable that the time ranging from the start of the addition to the midpoint of the first inflection point (or bending point) and the second inflection point (or bending point) constitutes the first precipitate forming step and the time ranging from the midpoint of the first inflection point (or bending point) and the second inflection point (or bending point) to T constitutes the second precipitate forming step.

It is necessary to adjust the adding rate so as to set up a relation of $V_2 < V_1$ and $V_{1'} < V_{2'}$ and preferably a relation in which $V_1/V_2$ and $V_{1'}/V_{2'}$ ranges from 1 to 1000, more preferably from 10 to 100, where $V_1$ and $V_{1'}$ are the average adding rates of the respective aqueous solutions in the first precipitate forming step and $V_2$ and $V_{2'}$ are the average adding rates of the respective aqueous solutions in the second precipitate forming step. Further, it is also preferable to abruptly decrease the adding rate at the time t when the first precipitate forming step terminates, or alternatively, to set the adding rate to 0 at the time t and to start adding at an adding rate smaller than that of the first precipitate forming step at the time t' when an arbitrary period of time has lapsed. In this case, it is preferable to adjust the adding rate so as to set up a relation in which $V_0/V_t$ and $V_{0'}/V_{t'}$ ranges from 1 to 1000, and more preferably from 10 to 100, where $V_0$ and $V_{0'}$ are the initial adding rates of the respective aqueous solutions in the first precipitate forming step and $V_t$ and $V_{t'}$ are the initial adding rates of the respective aqueous solutions in the second precipitate forming step.

The second precipitate forming step may be carried out consecutively after the first precipitate forming step (for example, FIG. 8(a)), or the second precipitate forming step may be carried out when a certain period of time has passed after the first precipitate forming step (for example, FIG. 8(b)). The former is advantageous in that the reaction time can be shortened because the process is continuous, while the latter is advantageous in that grain size and grain shape can be stabilized because the maturation occurs after the formation of the mother nuclei.

The timing for decreasing the adding rate may be determined by the amount of the precipitated crystals of the phosphor precursor. For example, if the precipitate forming step is carried out in two steps in which average adding rates differ, it is preferable that N and $N_1$ satisfy the following relational expression where $N_1$ is the amount of the precipitate of crystals of a phosphor precursor to be obtained in the first precipitate forming step and N is the amount of the crystals of the phosphor precursor to be finally obtained $$0 < (N_1/N) \leq 0.8$$

and it is more preferable that N and $N_1$ satisfy the following relational expression.

$$0.05 \leq (N_1/N) \leq 0.3$$

Further, the adding rate is preferably $0.001 \times N$ to $100 \times N$/minute, more preferably $0.01 \times N$ to $1.0 \times N$/minute, where N is the total amount of the precipitate of crystals of a phosphor precursor to be obtained in the precipitate forming step. In particular, the adding rate is preferably $0.1 \times N$ to $100 \times N$/minute in the first precipitate forming step. In order to adjust precisely the adding rate, the addition is made preferably by a precision pump such as a precision cylinder pump, a precision gear pump, a tube pump, a diaphragm pump, and the like.

iii) Separating Step and Firing Step

The precipitate of crystals of a phosphor precursor obtained in the above-described way is subjected to a separating step for the separation thereof from the aqueous solution and to a firing step for firing the separated precipitate of crystals of a phosphor precursor while avoiding sintering thereof. After that, the target rare earth element-activated, alkaline earth metal fluorohalide based stimulable phosphor is obtained. The details of the separating step and the firing step are the same as those of Process (AA).

Further, the rare earth element-activated, alkaline earth metal fluorohalide based stimulable phosphor in the present invention may be prepared by the following two Processes (DA) and (DB).

DA Process

This is a process for preparing the rare earth element-activated, alkaline earth metal fluorohalide based stimulable phosphor, comprising: a mother liquor preparing step for preparing a reactant mother liquor which is an aqueous solution containing $NH_4X$, a water-soluble compound of Ln, a halide, nitrate, nitrite, or acetate of MII in addition if x in the basic compositional formula (I) is not 0, and a halide, nitrate, nitrite, or acetate of MI in addition if y in the basic compositional formula (I) is not 0, wherein the solution has an $NH_4X$ concentration of between 2.0 and 4.5 mol/L after the foregoing components are dissolved, and for keeping the reactant mother liquor at 20 to 100° C. while being stirred; a crystal nuclei forming step for forming crystal nuclei of the crystals of a phosphor precursor by stirring the aqueous solution of an inorganic fluoride salt and the aqueous solution of $BaX_2$ at a high speed to thereby form nuclei of crystals of phosphor while these solutions are being added and introducing the reacted suspension into the reactant mother liquor which is kept at 20 to 100° C. and stirred; a precipitate forming step for preparing the precipitate of crystals of a phosphor precursor by adding the aqueous solution of $BaX_2$ and the aqueous solution of an inorganic fluoride salt, in such a manner that the molar ratio of fluorine in the inorganic fluoride salt to $BaX_2$ is kept constant, to the reactant mother liquor which contains the suspension and is kept at 20 to 100° C.; a separating step for separating the precipitate of crystals of a phosphor precursor from the aqueous solution; and a firing step for firing the separated precipitate of crystals of a phosphor precursor while avoiding sintering thereof.

DB Process

This is a process for preparing the rare earth element-activated, alkaline earth metal fluorohalide based stimulable phosphor, comprising: a mother liquor preparing step for preparing a reactant mother liquor which is an aqueous solution containing $BaX_2$, a water-soluble compound of Ln, a halide, nitrate, nitrite, or acetate of MII in addition if x in the basic compositional formula (I) is not 0, and a halide, nitrate, nitrite, or acetate of MI in addition if y in the basic compositional formula (I) is not 0, wherein the solution has a $BaX_2$ concentration of 2.5 mol/L or less if X is Cl or Br, or alternatively, a $BaX_2$ concentration of 5.0 mol/L or less if X is I after the foregoing components are dissolved, and for keeping the reactant mother liquor at 20 to 100° C. while being stirred; a crystal nuclei forming step for forming crystal nuclei of the crystals of a phosphor precursor by stirring the aqueous solution of an inorganic fluoride salt and the aqueous solution of $BaX_2$ at a high speed to thereby form nuclei of crystals of phosphor while these solutions are being added and introducing the reacted suspension into the reactant mother liquor which is kept at 20 to 100° C. and stirred; a precipitate forming step for preparing the precipitate of crystals of a phosphor precursor by adding the aqueous solution of an inorganic fluoride salt to the reactant mother liquor which contains the suspension and is kept at 20 to 100° C.; a separating step for separating the precipitate of crystals of a phosphor precursor from the aqueous solution; and a firing step for firing the separated precipitate of crystals of a phosphor precursor while avoiding sintering thereof.

Processes (DA) and (DB) are explained with respect to their constituent steps.

[Process (DA)]

i) Mother Liquor Preparing Step

First, by using an aqueous medium, material compounds other than a fluorine-containing compound are dissolved to thereby prepare a mother liquor. That is, $NH_4X$ and a water-soluble compound of Ln, and, if necessary, a halide, nitrate, nitrite, or acetate of MII, and further, if necessary, a halide, nitrate, nitrite, or acetate of MI are placed in the aqueous medium, sufficiently mixed, and dissolved. In this way, an aqueous solution (reactant mother liquor) in which these components are dissolved is prepared. In this case, the proportion of the amounts of $NH_4X$ and the aqueous medium is adjusted such that the solution has an $NH_4X$ concentration of between 2.0 and 4.5 mol/L and preferably between 3.0 and 4.5 mol/L. Examples of the water-soluble compound of Ln may include halides (specifically, chlorides, bromides, and so on), nitrates, nitrites, acetates, and the like of the aforementioned rare earth elements. If desired, the reactant mother liquor may contain a small amount of an acid, ammonia, a water-soluble polymer, a fine powder of a water-insoluble metal oxide, and so on. The reactant mother liquor thus obtained is kept at 20 to 100° C., preferably at 40 to 80° C., and stirred.

ii) Crystal Nuclei Forming Step

An aqueous solution of an inorganic fluoride salt and an aqueous solution of $BaX_2$ (these solutions are each hereinafter referred to as "reactant liquid" on occasion) are added, using an aqueous solution of an ammonium halide as a carrier liquid if necessary, simultaneously by means of a known metering pump such as a precision cylinder pump, a precision gear pump, a tube pump, a diaphragm pump, or the like. Among these pumps, a precision cylinder pump is preferable. For the purpose of high-speed stirring of the reactant liquids thus added, an instant reactor is preferably used. The high-speed stirring of the reactant liquids while they are being added forms the nuclei of the crystals of the phosphor precursor. Examples of the inorganic fluoride salt to be used may include ammonium fluoride, fluorides of alkaline metals, fluorides of alkaline earth metals, fluorides of transition metals, hydrofluoric acid, and so on. Among these substances, ammonium fluoride and fluorides of alkaline metals are preferable from the standpoints of solubility, emission characteristics, and change in pH during reaction.

When the aqueous solution of an inorganic fluoride salt and the aqueous solution of $BaX_2$ are added, the adding rates of the aqueous solution of $BaX_2$ and the solution of an inorganic fluoride salt are preferably adjusted so that the amount of the crystal nuclei of a phosphor precursor to be formed in the crystal nuclei forming step is in the range of from 0 to 0.8N (more preferably in the range of from 0.05 to 0.3N), where N is the amount of the crystals of a phosphor precursor to be finally obtained in the precipitate forming step. If the amount of the crystal nuclei formed is more than 0.8N, amorphous fine grains may be formed because the crystals are not grown sufficiently.

The term instant reactor, which is preferably used in the present invention, means an apparatus capable of mixing the reactant liquids rapidly and uniformly. The instant reactor is preferably one capable of mixing reactants more rapidly than the reaction rate thereof. A preferred example of the instant reactor comprises a cell having a limited capacity and a pair of stirring means rotatable at a high speed and disposed in upper and lower portions of the cell for allowing instant mixing and reaction to thereby form uniform ultrafine crystal nuclei. Suspension liquid containing the crystal nuclei formed is successively pumped from the reaction cell by the addition of the reactant liquids or carrier liquid and is added into the reactant mother liquor kept at 20 to 100° C. and stirred. The present invention aims at the simultaneous control of grain aspect ratio, grain size, and grain size distribution in addition to the control of grain shape, and this can be accomplished by determining the number of the crystal nuclei to be formed through high-speed stirring of the reactant liquids while being added in the step for forming nuclei of the crystals of phosphor precursor.

iii) Precipitate Forming Step

While the reactant mother liquor which contains the suspension is kept at 20 to 100° C., the aqueous solution of an inorganic fluoride salt and the aqueous solution of $BaX_2$ are added, simultaneously and in such a manner that the molar ratio of fluorine in the inorganic fluoride salt to $BaX_2$ is kept constant, to the reactant mother liquor by means of a known metering pump such as a precision cylinder pump, a precision gear pump, a tube pump, a diaphragm pump, or the like. Among these pumps, a precision cylinder pump is preferable. In this way, the nuclei of the crystals of the phosphor precursor are grown and a precipitate of the crystals of the phosphor precursor is obtained.

When the aqueous solution of an inorganic fluoride salt and the aqueous solution of $BaX_2$ are added, it is preferable to add the aqueous solution of an inorganic fluoride salt and the aqueous solution of $BaX_2$ by adjusting the adding rates in such a manner that the amount of the precipitate of crystals of a phosphor precursor to be formed during the addition is in the range of from 0.001 to 10 N/minute (more preferably in the range of from 0.01 to 1.0 N/minute), where N is the amount of the precipitate of crystals of a phosphor precursor to be finally obtained. Adding rates outside the above-described range are not desirable, because a larger adding rate may not provide a sufficient time for uniform mixing whereas a smaller adding rate may cause the growth of crystals in the cell due to an excessively long residence time in the reaction cell. In order to adjust precisely the adding rate, the addition is made preferably by a precision cylinder pump. Although the addition is ordinarily made at a constant adding rate, the adding rate may change with respect to the addition time continuously or discontinuously in a function of n-degree (n=1, 2, or 3), exponential function, or differential function. This addition is made preferably to a regional part which is being particularly vigorously stirred.

iv) Separating Step and Firing Step

The precipitate of crystals of a phosphor precursor obtained in the above-described way is subjected to a separating step for the separation thereof from the aqueous solution and to a firing step for firing the separated precipitate of crystals of a phosphor precursor while avoiding sintering thereof. After that, the target rare earth element-activated, alkaline earth metal fluorohalide based stimulable phosphor is obtained. The details of the separating step and the firing step are the same as those of Process (AA).

[Process (DB)]

i) Mother Liquor Preparing Step

First, using an aqueous medium, material compounds other than a fluorine-containing compound are dissolved to thereby prepare a mother liquor. That is, $BaX_2$ and a water-soluble compound of Ln, and, if necessary, a halide, nitrate, nitrite, or acetate of MII, and further, if necessary, a halide, nitrate, nitrite, or acetate of MI are placed in the aqueous medium, sufficiently mixed, and dissolved. In this way, an aqueous solution (reactant mother liquor) in which these components are dissolved is prepared. In this case, the proportion between the amounts of $BaX_2$ and the aqueous medium is adjusted such that the solution has a $BaX_2$ concentration of 2.5 mol/L or less if X is Cl or Br, or alternatively, a $BaX_2$ concentration of 5.0 mol/L or less if X is I. Examples of the water-soluble compound of Ln may include halides (specifically, chlorides, bromides, and so on), nitrates, nitrites, acetates, and the like of the aforementioned rare earth elements. If desired, the reactant mother liquor may contain a small amount of an acid, ammonia, a water-soluble polymer, a fine powder of a water-insoluble metal oxide, and so on. The reactant mother liquor thus obtained is kept at 20 to 100° C., preferably at 40 to 80° C., and stirred.

ii) Crystal Nuclei Forming Step

An aqueous solution of an inorganic fluoride salt and an aqueous solution of $BaX_2$ are added, using an aqueous solution of an ammonium halide as a carrier liquid if necessary, simultaneously by means of a known metering pump such as a precision cylinder pump, a precision gear pump, a tube pump, a diaphragm pump, or the like. Among these pumps, a precision cylinder pump is preferable. For the purpose of high-speed stirring of the reactant liquids thus added, an instant reactor is preferably used. The high-speed stirring of the reactant liquids while being added forms the nuclei of the crystals of the phosphor precursor. Examples of the inorganic fluoride salt to be used may include ammonium fluoride, fluorides of alkaline metals, fluorides of alkaline earth metals, fluorides of transition metals, hydrofluoric acid, and so on. Among these substances, ammonium fluoride and fluorides of alkaline metals are preferable from the standpoints of solubility, emission characteristics, and change in pH during reaction.

When the aqueous solution of an inorganic fluoride salt and the aqueous solution of $BaX_2$ are added, the adding rates of the aqueous solution of $BaX_2$ and the solution of an inorganic fluoride are preferably adjusted so that the amount of the crystal nuclei of a phosphor precursor to be formed in the crystal nuclei forming step is in the range of from 0 to 0.8N (more preferably in the range of from 0.05 to 0.3N), where N is the amount of the crystals of a phosphor precursor to be finally obtained in the precipitate forming step. If the amount of the crystal nuclei formed is more than 0.8N, amorphous fine grains may be formed because crystals are not grown sufficiently.

The instant reactor, which is preferably used in this process is the same as that used in Process (DA).

A suspension liquid containing the crystal nuclei formed is successively pumped from the reaction cell by the addition of the reactant liquids or carrier liquid and is added into the reactant mother liquor which has been kept at 20 to 100° C. and stirred. The present invention aims at the simultaneous control of grain aspect ratio, grain size, and grain size distribution in addition to the control of grain shape, and this can be accomplished by determining the number of the crystal nuclei to be formed through high-speed stirring of the reactant liquids while being added in the step for forming nuclei of the crystals of phosphor precursor.

iii) Precipitate Forming Step

While the reactant mother liquor which contains the suspension is kept at 20 to 100° C., the aqueous solution of an inorganic fluoride salt is added to the reactant mother liquor by means of a known metering pump such as a precision cylinder pump, a precision gear pump, a tube pump, a diaphragm pump, or the like. Among these pumps, a precision cylinder pump is preferable. In this way, the nuclei of the crystals of the phosphor precursor are grown and a precipitate of the crystals of the phosphor precursor is obtained.

When the aqueous solution of an inorganic fluoride salt is added, it is preferable to add the aqueous solution of an inorganic fluoride salt by adjusting the adding rate in such a manner that the amount of the precipitate of crystals of a phosphor precursor to be formed during the addition is in the range of from 0.001 to 10 N/minute (more preferably in the range of from 0.01 to 1.0 N/minute), where N is the amount of the precipitate of crystals of a phosphor precursor to be finally obtained. Adding rates outside the above-described range are not desirable, because a faster adding rate may not provide a sufficient time for uniform mixing whereas a slower adding rate may cause the growth of crystals in the cell due to an excessively long residence time in the reaction cell. In order to adjust precisely the adding rate, the addition is made preferably by a precision cylinder pump. Although the addition is ordinarily made at a constant adding rate, the adding rate may change with respect to the addition time continuously or discontinuously in a function of n-degree (n=1, 2, or 3), exponential function, or differential function. This addition is made preferably to a regional part which is being particularly vigorously stirred.

iv) Separating Step and Firing Step

The precipitate of crystals of a phosphor precursor obtained in the above-described way is subjected to a separating step for the separation thereof from the aqueous solution and to a firing step for firing the separated precipitate of crystals of a phosphor precursor while avoiding sintering thereof. After that, the target rare earth element-activated, alkaline earth metal fluorohalide based stimulable phosphor is obtained. The details of the separating step and the firing step are the same as those of Process (AA).

(3) Reaction Apparatus

The reaction apparatus in the present invention is preferably used in the processes for preparing the above-described rare earth element-activated, alkaline earth metal fluorohalide based stimulable phosphors.

The reaction apparatus in the present invention comprises two or more liquid adding devices for accommodating and pumping out a liquid; an instant reactor for accommodating the liquid pumped from the two or more liquid adding devices, stirring the liquid at a high speed, and thereafter pumping out the liquid; and a stirring tank for accommodating the liquid pumped from the two or more liquid adding devices and the liquid pumped from the instant reactor to stir these liquids together with a reactant mother liquid which is accommodated therein in advance.

It is preferable for the reaction apparatus in the present invention to have a switching valve for pumping out the liquid, which is accommodated in one of the two liquid adding devices, into the instant reactor or the stirring tank and to have a switching valve for pumping out the liquid, which is accommodated in the other liquid adding devices, into the instant reactor or the stirring tank.

In the present invention, the number of the liquid adding devices and the type of liquid which is accommodated in the liquid adding devices are not particularly limited, and can be selected depending on the purposes. In the present invention, although a mode, in which the switching valve is provided, is preferable, it is possible to employ a mode which is not equipped with a switching valve but equipped separately with a liquid adding device for pumping out the liquid solely to the instant reactor and a liquid adding device for pumping out the liquid solely to the stirring tank.

Referring now to the drawings, the reaction apparatus of he present invention will be explained below. However, the present invention is not limited to the following.

FIG. 16 is a diagram schematically illustrating an example of the reaction apparatus of the present invention.

The liquid adding devices, which accommodate the liquids and pump out them, comprise three precision cylinder pumps 101, 102, and 103, accommodating, respectively, a first reactant liquid 104, a second reactant liquid 105, and a carrier liquid 106. The precision cylinder pumps are designed to be capable of adjusting precisely the adding amounts and adding rates of these reactant liquids.

Underneath the precision cylinder pumps, there is provided an instant reactor 107 which accommodates part of the liquid pumped from the cylinder pumps 101, 102, and 103, stirs the accommodated liquid, and thereafter pumps out the liquid. The instant reactor 107 is equipped with stirring means 108 and 109. The details of the instant reactor are given later.

Underneath the instant reactor 107, there is provided a reactor 113 as a stirring tank which accommodates part of the liquid pumped from the cylinder pumps 101 and 102 and the liquid pumped from the instant reactor 107, and stirs these liquids together with the reactant mother liquor which is accommodated inside the reactor 113 in advance. The capacity of the reactor 113 is preferably 0.01 to 100N(L) and more preferably 0.1 to 10N(L), where N is the total amount (mol) of the reaction product to be obtained by the reaction. The shape of the reactor 113 is not particularly limited provided the effects of the present invention are not impaired. The liquid inside the reactor 113 is stirred by the rotation of the stirring blade 116 driven by a motor 115 for stirring. The revolving speed is about 100 to 10000 rpm and preferably 500 to 5000 rpm. While the liquid is stirred, the liquid is kept at 20 to 100° C., preferably at 40 to 80° C., by means of a temperature adjusting device 112.

In the reaction apparatus of FIG. 16, there are provided a switching valve 110 for pumping out the first reactant liquid 104, which is accommodated in the precision cylinder pump 101, into the instant reactor 107 or into the reactor 113 and a switching valve 111 for pumping out the second reactant liquid 105, which is accommodated in the precision cylinder pump 102, into the instant reactor 107 or the reactor 113.

Referring now to FIGS. 16 and 17, an example of the instant reactor will be explained in detail. The instant reactor 200 comprises a reaction cell 203 having a pair of stirring means 201 and 202 rotatable at a high speed and disposed in upper and lower portions of the cell. The revolving speed of each of the stirring means 201 and 202 is about 1000 to 10000 rpm and preferably 1000 to 5000 rpm. The content volume of the reaction cell 203 is preferably 0.01 to 100N (mL) and more preferably 0.1 to 10N(mL), where N is the total amount (mol) of the reaction product to be obtained by the reaction. The shape of the reaction cell is not particularly limited, but it is preferably in the shape of a cylinder. Inside the reaction cell 203, stirrers 204 and 205, which can rotate by means of magnetic force driven by the stirring means 201 and 202 or which are linked directly to the rotation axis of the motor, rotate. Although the shape of the stirrers 204 and 205 is not particularly limited, examples of the shape may include the shapes shown in FIG. 18. Shown in the upper region of FIG. 18 is a tabular stirrer whose bottom face is in the shape of a cross. Shown in the middle region of FIG. 18 is a stirrer having a thin cylindrical base and a cross-shaped protrusion provided thereon. Shown in the lower region of FIG. 18 is a stirrer having an approximately cylindrical shape. It is preferable that the stirrers 204 and 205 rotate in directions opposite to each other.

In the instant reactor 200 of FIG. 17, a first reactant liquid 104 from the direction of the arrow A, a carrier liquid 106 from the direction of the arrow B, and a second reactant liquid 106 from the direction of the arrow C, are added into the reaction cell 203 by means of precision cylinder pumps 101, 103, and 102, respectively. However, the addition is not limited to this manner, and other ports may be used. The liquids added are rapidly mixed in the reaction cell 203 into a uniform liquid by the stirring means 210 and 202. The suspension liquid thus produced by the mixing is successively pumped in the direction of the arrow D from the reaction cell 203 by the successively added first reactant liquid 104, second reactant liquid 105, and carrier liquid 106, and is introduced into the mixing chamber 114 inside the reactor 113.

(4) Process for Preparing a Radiographic Image Conversion Panel

Next, a radiographic image conversion panel using the rare earth element-activated, alkaline earth metal fluorohalide based stimulable phosphor of the present invention is described.

The rare earth element-activated, alkaline earth metal fluorohalide based stimulable phosphor of the present invention (hereinafter referred to simply as "stimulable phosphor" on occasion) is contained in a stimulable phosphor layer of the radiographic image conversion panel. Normally, the stimulable phosphor layer comprises a stimulable phosphor and a binder which holds the stimulable phosphor in a dispersed state. In addition, the stimulable phosphor layer may further contain other stimulable phosphors and/or an additive such as a colorant.

A process for preparing a radiographic image conversion panel is described below by taking as an example a stimulable phosphor layer comprising a stimulable phosphor and a binder which holds the stimulable phosphor in a dispersed state.

The stimulable phosphor layer can be formed on a support by a known method given below. First, a stimulable phosphor and a binder are added into a solvent, and these substances are well mixed to thereby prepare a coating liquid having the stimulable phosphor uniformly dispersed in the binder solution. Although the mixing ratio between the binder and the stimulable phosphor varies depending on the target characteristics of the radiographic image conversion panel, the type of stimulable phosphor, and other factors, the mixing ratio (weight ratio) of the binder to the stimulable phosphor is generally selected from a range of from 1:1 to 1:100 and is preferably selected from a range of from 1:8 to 1:40. The coating liquid, which is prepared as described above and contains the stimulable phosphor and the binder, is coated uniformly on the surface of a support to thereby form a coating film. This coating operation may be performed by using a conventional coating means such as a doctor blade, a roll coater, a knife coater, and the like.

The support may be optionally selected from the materials conventionally known as those for supports of radiographic image conversion panels. In conventional radiographic image conversion panels, the provision of an adhesion promoting layer by coating a polymeric substance such as gelatin on the support surface of the side, which is to have the stimulable phosphor layer, for such purposes as strengthening the bond between the support and the stimulable phosphor or enhancing the sensitivity or image quality (sharpness, granularity), or the provision of a light-reflective layer comprised of a light-reflective substance such as titanium dioxide or a light-absorptive layer comprised of a light-absorptive substance such as carbon black are known. These layers may also be provided on the supports to be used in the present invention, and the construction of the layers can be optionally selected in accordance with the purpose, use, and the like of the desired radiographic image conversion panel. Further, as described in JP-A No. 58-200,200, fine irregularities may be formed on the support surface of the side (support surface meaning the surface of the adhesion promoting layer, light-reflective layer, or light-absorptive layer, if such a layer is provided on the support surface, of the side which is to have the stimulable phosphor layer) which is to have the stimulable phosphor layer, for the purpose of increasing the sharpness of the image to be obtained.

The coating film thus formed on the support is dried to thereby form a stimulable phosphor layer on the support. The thickness of the stimulable phosphor layer is normally 20 $\mu$m to 1 mm, although it varies depending on the target characteristics of the radiographic image conversion panel, the type of the stimulable phosphor, the mixing ratio between the binder and the stimulable phosphor, and other factors. Preferably, the thickness is 50 to 500 $\mu$m. The stimulable phosphor layer is not necessarily formed on the support as described above. For example, a phosphor layer may be formed on a separate sheet, such as a glass sheet, a metal sheet, a plastic sheet, or the like by coating the coating liquid and thereafter drying the coated layer. And, the phosphor layer thus obtained may be joined with the support by, for example, pressure or the use of an adhesive.

As stated previously, normally a protective film is provided on the stimulable phosphor layer. Examples of the protective film may include a film formed by coating a solution, which is prepared by dissolving a transparent organic polymer such as a cellulose derivative, polymethyl methacrylate, or the like, on the stimulable phosphor layer, a film formed by applying a protective film forming sheet, which is prepared separately and which is an organic polymer film such as polyethylene terephthalate, a transparent glass plate, or the like, to the stimulable phosphor layer by using a suitable adhesive, or a film of an inorganic compound formed by, for example, vapor-deposition on the stimulable phosphor layer. Further, the protective film may be a film which is formed by coating a fluorocarbon resin soluble in an organic solvent and which contains a perfluoroolefinic resin powder or a silicone resin powder dispersed therein.

Furthermore, in order to enhance the sharpness of the images to be obtained, at least one layer of the layers constituting the radiographic image conversion panel may be colored with a colorant which absorbs exciting light but does not absorb stimulable emission, or alternatively, an independent colored intermediate layer may be provided (see JP-B No. 23,4000).

According to any one of the processes described above, it is possible to prepare a radiographic image conversion panel comprising a support and a stimulable phosphor layer, which comprises a stimulable phosphor and a binder holding the stimulable phosphor in a dispersed state thereof, provided on the support.

EXAMPLES

The present invention is explained more specifically by the following examples. In the Examples and Comparative Examples, the term "aqueous solution" is used to mean an aqueous solution in general using water as the sole medium, regardless of how the term is used in the present invention.

Example A1

In order to synthesize the precursor of a europium-activated, barium fluorobromide based stimulable phosphor, a reactant mother liquor (having a $BaBr_2$ concentration of 1.0 mol/L) composed of 1200 mL of an aqueous solution of $BaBr_2$ (2.5mol/L), 37.5mL of an aqueous solution of $EuBr_3$ (0.2mol/L), and 1762.5 mL of water was placed in a reactor having a capacity of 4 L. The reactant mother liquor in the reactor was kept at 60° C. and the reactant mother liquor was stirred by means of a screw-shaped stirring blade, which had a diameter of 45 mm and whose periphery was enclosed in a mixing chamber having a capacity of about 100 mL, rotating at 500 rpm so that an upward stream was generated from the mixing chamber.

150 mL of an aqueous solution of ammonium fluoride ($NH_4F$) (10 mol/L) and 150 mL of water were mixed together and 300 mL of the resulting solution was added into the reactant mother liquor being stirred and kept at the temperature in the mixing chamber at an adding rate of 3 mL/minute using a precision cylinder pump to thereby form a precipitate. After the completion of the addition, the reactant mother liquor was kept at the temperature and stirred for 2 hours so as to carry out the maturation of the precipitate.

The precipitate was separated by filtration and washed with 2 L of methanol. The precipitate after being washed was collected and dried at 120° C. for 4 hours under a vacuum to thereby obtain about 330 g of crystals of europium-activated, barium fluorobromide.

To the crystals of europium-activated, barium fluorobromide thus obtained were added 1% by weight of ultrafine grain powder of alumina to prevent any change in grain shape due to sintering and change in grain size due to inter-grain fusion at the time of firing, and were subjected to sufficient mixing by means of a mixer so as to adhere the ultrafine grain powder of alumina uniformly to the surface of the crystals. After that, 100 g of the resultant mixture was taken out and packed into a quartz boat, which was fired using a tube furnace in a nitrogen gas atmosphere at 850° C. for 2 hours. In this way, grains of europium-activated, barium fluorobromide based stimulable phosphor (BaFBr:0.005Eu$^{2+}$) were obtained.

Example A2

In order to synthesize the precursor of a europium-activated, barium fluorobromide based stimulable phosphor, a reactant mother liquor (having a BaBr$_2$ concentration of 1.5 mol/L) composed of 1800 mL of an aqueous solution of BaBr$_2$ (2.5mol/L), 37.5 mL of an aqueous solution of EuBr$_3$ (0.2mol/L), and 1162.5 mL of water was placed in a reactor having a capacity of 4 L. The reactant mother liquor in the reactor was kept at 60° C. and the reactant mother liquor was stirred by means of a screw-shaped stirring blade, which had a diameter of 45 mm and whose periphery was enclosed in a mixing chamber having a capacity of about 100 mL, rotating at 500 rpm so that an upward stream was generated from the mixing chamber.

150 mL of an aqueous solution of NH$_4$F (10 mol/L) and 150 mL of water were mixed together and 300 mL of the resulting solution was added into the reactant mother liquor being stirred and kept at the temperature in the mixing chamber at an adding rate of 3 mL/minute using a precision cylinder pump to thereby form a precipitate. After the completion of the addition, the reactant mother liquor was kept at the temperature and stirred for 2 hours so as to carry out the maturation of the precipitate.

The precipitate was separated by filtration and washed with 2 L of methanol. The precipitate after being washed was collected and dried at 120° C. for 4 hours under a vacuum to thereby obtain about 330 g of crystals of europium-activated, barium fluorobromide.

The crystals of europium-activated, barium fluorobromide thus obtained were fired as in Example A1 and grains of europium-activated, barium fluorobromide based stimulable phosphor (BaFBr:0.005Eu$^{2+}$) were obtained.

Example A3

In order to synthesize the precursor of a europium-activated, barium fluorobromide based stimulable phosphor, a reactant mother liquor (having a BaBr$_2$ concentration of 2.0 mol/L) composed of 2400 mL of an aqueous solution of BaBr$_2$ (2.5mol/L), 37.5 mL of an aqueous solution of EuBr$_3$ (0.2mol/L), and 562.5 mL of water was placed in a reactor having a capacity of 4 L. The reactant mother liquor in the reactor was kept at 60° C. and the reactant mother liquor was stirred by means of a screw-shaped stirring blade, which had a diameter of 45 mm and whose periphery was enclosed in a mixing chamber having a capacity of about 100 mL, rotating at 500 rpm so that an upward stream was generated from the mixing chamber.

150 mL of an aqueous solution of NH$_4$F (10 mol/L) and 150 mL of water were mixed together and 300 mL of the resulting solution was added into the reactant mother liquor being stirred and kept at the temperature in the mixing chamber at an adding rate of 3 mL/minute using a precision cylinder pump to thereby form a precipitate. After the completion of the addition, the reactant mother liquor was kept at the temperature and stirred for 2 hours so as to carry out the maturation of the precipitate.

The precipitate was separated by filtration and washed with 2 L of methanol. The precipitate after being washed was collected and dried at 120° C. for 4 hours under a vacuum to thereby obtain about 330 g of crystals of europium-activated, barium fluorobromide.

The crystals of europium-activated, barium fluorobromide thus obtained were fired as in Example A1 and grains of europium-activated, barium fluorobromide based stimulable phosphor (BaFBr:0.005Eu$^{2+}$) were obtained.

Example A4

In order to synthesize the precursor of a europium-activated, barium fluorobromide based stimulable phosphor, a reactant mother liquor (having a BaBr$_2$ concentration of 2.5 mol/L) composed of 3000 mL of an aqueous solution of BaBr$_2$ (2.5 mol/L) and 37.5 mL of an aqueous solution of EuBr$_3$ (0.2 mol/L) was placed in a reactor having a capacity of 4 L. The reactant mother liquor in the reactor was kept at 60° C. and the reactant mother liquor was stirred by means of a screw-shaped stirring blade, which had a diameter of 45 mm and whose periphery was enclosed in a mixing chamber having a capacity of about 100 mL, rotating at 500 rpm so that an upward stream was generated from the mixing chamber.

150 mL of an aqueous solution of NH$_4$F (10 mol/L) and 150 mL of water were mixed together and 300 mL of the resulting solution was added into the reactant mother liquor being stirred and kept at the temperature in the mixing chamber at an adding rate of 3 mL/minute using a precision cylinder pump to thereby form a precipitate. After the completion of the addition, the reactant mother liquor was kept at the temperature and stirred for 2 hours so as to carry out the maturation of the precipitate.

The precipitate was separated by filtration and washed with 2 L of methanol. The precipitate after being washed was collected and dried at 120° C. for 4 hours under a vacuum to thereby obtain about 330 g of crystals of europium-activated, barium fluorobromide.

The crystals of europium-activated, barium fluorobromide thus obtained were fired as in Example A1 and grains of europium-activated, barium fluorobromide based stimulable phosphor (BaFBr:0.005Eu$^{2+}$) were obtained.

Comparative Example A1

In order to synthesize the precursor of a europium-activated, barium fluorobromide based stimulable phosphor, a reactant mother liquor (having an NH$_4$Br concentration of 0.5 mol/L and a BaBr$_2$ concentration of 0.6 mol/L) composed of 220 mL of an aqueous solution of NH$_4$Br (4.5 mol/L), 25 mL of an aqueous solution of EuBr$_3$ (0.2 mol/L), 480 mL of an aqueous solution of BaBr$_2$ (2.5 mol/L), and 1295 mL of water was placed in a reactor having a capacity of 4 L. The reactant mother liquor in the reactor was kept at 60° C. and the reactant mother liquor was stirred by means of a screw-shaped stirring blade, which had a diameter of 45 mm and whose periphery was enclosed in a mixing chamber having a capacity of about 100 mL, rotating at 500 rpm so that an upward stream was generated from the mixing chamber.

100 mL of an aqueous solution of NH$_4$F (10 mol/L) and 400 mL of an aqueous solution of BaBr$_2$ (2.5 mol/L) were prepared separately. By using separate precision cylinder pumps, these aqueous solutions were added simultaneously at an adding rate of 2 mL/minute for the aqueous solution of NH$_4$F and at an adding rate of 8 mL/minute for the aqueous solution of BaBr$_2$ into the mixing chamber in the reactant mother liquor being stirred and kept at the temperature in such a manner that the molar ratio of $NH_4F$ to $BaX_2$ was kept constant to thereby form a precipitate. After the completion of the addition, the reactant mother liquor was kept at the temperature and stirred for 2 hours so as to carry out the maturation of the precipitate.

The precipitate was separated by filtration and washed with 2 L of methanol. The precipitate after being washed was collected and dried at 120° C. for 4 hours under a vacuum to thereby obtain about 220 g of crystals of europium-activated, barium fluorobromide.

The crystals of europium-activated, barium fluorobromide thus obtained were fired as in Example A1 and grains of europium-activated, barium fluorobromide based stimulable phosphor ($BaFBr:0.005Eu^{2+}$) were obtained.

Measurement of Grain Shape of Phosphors

The phosphors obtained in Examples A1 to A4 and in Comparative Example A1 were subjected to the following grain shape measurements using a grain size distribution measuring apparatus based on light diffraction (model LA-500 manufactured by Horiba Seisakusho Co., Ltd.) and a scanning electron microscope (model JSM-5400LV manufactured by Hitachi Denshi Ltd.). The results are shown in Table 3.

(1) Grain size median diameter: values obtained by the measurement using the grain size distribution measuring apparatus based on light diffraction were used without correction.

(2) Grain size distribution: calculated from a distribution chart (FIG. 7) obtained by the measurements using the grain size distribution measuring apparatus based on light diffraction.

(3) Grain shape: determined by the observation of the photographs obtained by the scanning electron microscope.

(4) Grain aspect ratio: calculated by actually measuring the length to width ratios of 200 grains in the photographs obtained by the scanning electron microscope and averaging these values.

Preparation of Radiographic Image Conversion Panels

A coating liquid having a viscosity of 25 to 30 PS was prepared by adding 356 g of a phosphor ($BaFBr:0.005Eu^{2+}$) obtained in Examples A1 to A4 and Comparative Example A1, 15.8 g of a polyurethane resin (Desmolac 4125 manufactured by Sumitomo Bayer Urethane Co., Ltd.), and 2.0 g of a bisphenol A based epoxy resin into a methyl ethyl ketone/toluene mixture (1:1) and dispersing these substances using a propeller-type mixer. The coating liquid was coated using a doctor blade on a support comprising a polyethylene terephthalate film (having a thickness of 250 $\mu$m) which had been already primed with an acrylic resin (Cryscoat P1018GS manufactured by Dainippon Ink & Chemicals, Inc.) to a thickness of 20 $\mu$m. The coating was dried at 100° C. for 15 minutes and a stimulable fluorescent layer having a thickness of 150 to 300 $\mu$m was formed.

Next, a coating liquid was prepared by adding 70 g of a fluoroolefin/vinyl ether copolymer as a fluorocarbon resin (Lumifron LF-100 manufactured by Asahi Glass Co., Ltd.), 25 g of isocyanate as a crosslinking agent (Desmodul Z4370 manufactured by Sumitomo Bayer Urethane Co., Ltd.), 5.0 g of a bisphenol A based epoxy resin, and 10 g of a silicone resin powder having particle sizes of 1 to 2 $\mu$m (KMP-590 manufactured by Shin-Etsu Chemical Co., Ltd.), as materials for forming a protective layer, into a toluene/isopropyl alcohol (1:1) solvent mixture. The coating liquid was coated using a doctor blade on the stimulable fluorescent layer formed on the support. The coating was thermally treated at 120° C. for 30 minutes for drying and hardening so as to form a protective layer having a thickness of 10 $\mu$m.

In the above-described way, radiographic image conversion panels having stimulable fluorescent layers of various thicknesses each containing a phosphor obtained in Examples A1 to A4 and Comparative Example A1 were obtained.

Method for Evaluating the Radiographic Image Conversion Panels

The radiographic image conversion panels obtained were each subjected to evaluations in terms of sensitivity, image sharpness, and granularity according to the methods given below.

Sensitivity: Each of the radiographic image conversion panels was irradiated with X-rays having a tube voltage of 80 kV, followed by scanning with He—Ne laser light (having a wavelength of 632.8 nm). The intensity of the stimulable emission from the phosphor layer was measured. The values thus obtained were evaluated as relative values by taking the value for the radiographic image conversion panel of Example A1 as 100. A radiographic image conversion panel given a larger value has a better sensitivity.

Sharpness: Each of the radiographic image conversion panels was irradiated with X-rays having a tube voltage of 80 kV through a CTF chart, followed by scanning with He—Ne laser light (having a wavelength of 632.8 nm). A contrast transmission function (CTF) was measured from the image obtained and the sharpness was evaluated by the CTF value at a spatial frequency of 2 cycles/mm.

Granularity: Each of the radiographic image conversion panels was irradiated uniformly with X-rays having a tube voltage of 80 kV, followed by scanning with He—Ne laser light (having a wavelength of 632.8 nm). In this way, uniformly exposed images were obtained. The granularities of the images obtained were measured by RMS values. The values thus obtained were evaluated as relative values by taking the value for the radiographic image conversion panel of Example A1 as 100. A radiographic image conversion panel given a smaller value has a better granularity.

TABLE 3

Table 3 shows the results from the Examples and Comparative Example

|  | Example A1 | Example A2 | Example A3 | Example A4 | Comparative example A1 |
|---|---|---|---|---|---|
| Grain size median diameter (Dm): $\mu$m | 9.97 | 6.96 | 3.62 | 1.93 | 9.21 |

TABLE 3-continued

Table 3 shows the results from the Examples and Comparative Example

|  | Example A1 | Example A2 | Example A3 | Example A4 | Comparative example A1 |
|---|---|---|---|---|---|
| Deviation ($\sigma$) | 3.69 | 2.49 | 1.23 | 0.76 | 4.84 |
| Grain size distribution ($\sigma$/Dm): % | 37.0 | 35.7 | 34.0 | 39.2 | 52.6 |
| Grain shape | Tetradecahedron | Tetradecahedron | Tetradecahedron | Tetradecahedron | Tetradecahedron |
| Grain aspect ratio | 1.02 | 1.04 | 1.05 | 1.09 | 1.09 |
| Evaluation results of radiographic image conversion panels |  |  |  |  |  |
| Sensitivity | 100 | 102 | 105 | 95 | 96 |
| Sharpness | 32 | 35 | 40 | 42 | 32 |
| Granularity | 100 | 98 | 95 | 91 | 108 |

It can be seen that, whereas the phosphors of Examples A1 to A4 are monodispersed as shown in FIG. 7 and have $\sigma$/Dm of 50% or less, the phosphor of Comparative Example A1 has $\sigma$/Dm exceeding 50% and has a broader distribution of grain sizes. Further, whereas image qualities of the radiographic image conversion panels containing the phosphors of Examples A1 to A4 have a good balance of sensitivity, image sharpness, and granularity, the image quality of the panel using the phosphor of Comparative Example A1 having a broader distribution of grain sizes tends to be poor.

According to the present invention, it is possible to upgrade the image qualities (sharpness and structural noise in particular) of a radiographic image conversion panel by controlling the grain shape, grain aspect ratio, grain size (median diameter), and grain size distribution of the rare earth element-activated, alkaline earth metal fluorohalide based stimulable phosphor contained in the radiographic image conversion panel.

Further, the employment of combinations of synthesis conditions of precursors of the phosphors in aqueous solutions makes it possible to carry out synthesis under conditions of concentrations in a range broader than that of the prior art and improves the controllability of the grain size and grain size distribution and the efficiency in synthesis.

Example B1

In order to synthesize the precursor of a europium-activated, barium fluorobromide based stimulable phosphor, a reactant mother liquor (having a $BaBr_2$ concentration of 1.0 mol/L) composed of 1200 mL of an aqueous solution of $BaBr_2$ (2.5 mol/L) and 1800 mL of water was placed in a reactor having a capacity of 4 L. The reactant mother liquor in the reactor was kept at 60° C. and the reactant mother liquor was stirred by means of a screw-shaped stirring blade, which had a diameter of 45 mm and whose periphery was enclosed in a mixing chamber having a capacity of about 100 mL, rotating at 500 rpm so that an upward stream was generated from the mixing chamber.

A dilute aqueous solution of $NH_4F$ composed of 150 mL of an aqueous solution of ammonium fluoride ($NH_4F$) (10 mol/L) and 150 mL of water, a dilute aqueous solution of $EuBr_3$ composed of 7.5 mL of an aqueous solution of $EuBr_3$ (0.2 mol/L) and 92.5 mL of water, 10 mL of an aqueous solution of $CaBr_2$ (0.15mol/L), and 100 mL of an aqueous solution of KBr (0.25 mol/L) were prepared separately. By using separate precision cylinder pumps, these aqueous solutions were added simultaneously at an adding rate of 6 mL/minute for the dilute aqueous solution of $NH_4F$ and at an adding rate of 2 mL/minute for each of the dilute aqueous solution of $EuBr_3$, the aqueous solution of $CaBr_2$, and the aqueous solution of KBr into the mixing chamber in the reactant mother liquor being stirred and kept at the temperature to thereby form a precipitate. After the completion of the addition, the reactant mother liquor was kept at the temperature and stirred for 2 hours so as to carry out the maturation of the precipitate.

The precipitate was separated by filtration and washed with 2 L of methanol. The precipitate after being washed was collected and dried at 120° C. for 4 hours under a vacuum to thereby obtain about 330 g of crystals of europium-activated, barium fluorobromide.

To the crystals of europium-activated, barium fluorobromide thus obtained were added 1% by weight of ultrafine grain powder of alumina to prevent a change in grain shape due to sintering and a change in grain size due to inter-grain fusion at the time of firing, and were subjected to sufficient mixing by means of a mixer so as to adhere the ultrafine grain powder of alumina uniformly to the surface of the crystals. After that, 100 g of the resultant mixture was taken out and packed into a quartz boat, which was fired using a tube furnace in a nitrogen gas atmosphere at 850° C. for 2 hours. In this way, grains of europium-activated, barium fluorobromide based stimulable phosphor (Ba0.99Ca0.01FBr:0.0003K•0.001Eu$^{2+}$) were obtained.

Example B2

In order to synthesize the precursor of a europium-activated, barium fluorobromide based stimulable phosphor, a reactant mother liquor (having an $NH_4Br$ concentration of 4.0 mol/L) composed of 1780 mL of an aqueous solution of $NH_4Br$ (4.5 mol/L) and 220 mL of water was placed in a reactor having a capacity of 4 L. The reactant mother liquor in the reactor was kept at 60° C. and the reactant mother liquor was stirred by means of a screw-shaped stirring blade, which had a diameter of 45 mm and whose periphery was enclosed in a mixing chamber having a capacity of about 100 mL, rotating at 500 rpm so that an upward stream was generated from the mixing chamber.

100 mL of an aqueous solution of $NH_4F$ (10 mol/L), 400 mL of an aqueous solution of $BaBr_2$ (2.5 mol/L), a dilute aqueous solution of $EuBr_3$ composed of 5 mL of an aqueous solution of $EuBr_3$ (0.2 mol/L) and 95 mL of water, 100 mL of an aqueous solution of $CaBr_2$ (0.1 mol/L), and 100 mL of an aqueous solution of KBr (0.25 mol/L) were prepared separately. By using separate precision cylinder pumps, these aqueous solutions were added simultaneously at an adding rate of 8 mL/minute for the aqueous solution of $BaBr_2$ and at an adding rate of 2 mL/minute for each of the aqueous solution of $NH_4F$, the dilute aqueous solution of $EuBr_3$, the aqueous solution of $CaBr_2$, and the aqueous solution of KBr into the mixing chamber in the reactant mother liquor being stirred and kept at the temperature to thereby form a precipitate. After the completion of the addition, the reactant mother liquor was kept at the temperature and stirred for 2 hours so as to carry out the maturation of the precipitate.

The precipitate was separated by filtration and washed with 2 L of methanol. The precipitate after being washed was collected and dried at 120° C. for 4 hours under a vacuum to thereby obtain about 220 g of crystals of europium-activated, barium fluorobromide.

The crystals of europium-activated, barium fluorobromide thus obtained were fired as in Example B1 and grains of europium-activated, barium fluorobromide based stimulable phosphor ($Ba0.99Ca0.01FBr:0.0003K\cdot0.001Eu^{2+}$) were obtained.

Example B3

In order to synthesize the precursor of a europium-activated, barium fluorobromide based stimulable phosphor, a reactant mother liquor (having a $BaBr_2$ concentration of 1.0 mol/L) composed of 1200 mL of an aqueous solution of $BaBr_2$ (2.5mol/L), 3.54 g of $CaBr_2\cdot2H_2O$ and 1800 mL of water was placed in a reactor having a capacity of 4 L. The reactant mother liquor in the reactor was kept at 60° C. and the reactant mother liquor was stirred by means of a screw-shaped stirring blade, which had a diameter of 45 mm and whose periphery was enclosed in a mixing chamber having a capacity of about 100 mL, rotating at 500 rpm so that an upward stream was generated from the mixing chamber.

A dilute aqueous solution of $NH_4F$ composed of 150 mL of an aqueous solution of $NH_4F$ (10 mol/L) and 150 mL of water, 100 mL of an aqueous solution of KBr (0.25 mol/L), and a dilute aqueous solution of $EuBr_3$ composed of 7.5 mL of an aqueous solution of $EuBr_3$ (0.2mol/L) and 92.5 mL of water were prepared separately. By using separate precision cylinder pumps, these aqueous solutions were added simultaneously at an adding rate of 6 mL/minute for the dilute aqueous solution of $NH_4F$, at an adding rate of 2 mL/minute for the dilute aqueous solution of KBr and at an adding rate of 2 mL/minute for the dilute aqueous solution of $EuBr_3$ into the mixing chamber in the reactant mother liquor being stirred and kept at the temperature to thereby form a precipitate. After the completion of the addition, the reactant mother liquor was kept at the temperature and stirred for 2 hours so as to carry out the maturation of the precipitate.

The precipitate was separated by filtration and washed with 2 L of methanol. The precipitate after being washed was collected and dried at 120° C. for 4 hours under a vacuum to thereby obtain about 330 g of crystals of europium-activated, barium fluorobromide.

The crystals of europium-activated, barium fluorobromide thus obtained were fired as in Example B1 and grains of europium-activated, barium fluorobromide based stimulable phosphor ($Ba0.99Ca0.01FBr:0.0003K\cdot0.001Eu^{2+}$) were obtained.

Example B4

In order to synthesize the precursor of a europium-activated, barium fluorobromide based stimulable phosphor, a reactant mother liquor (having a $BaBr_2$ concentration of 1.0 mol/L) composed of 1200 mL of an aqueous solution of $BaBr_2$ (2.5mol/L), 3.54 g of $CaBr_2.2H_2O$ and1800 mL of water was placed in a reactor having a capacity of 4 L. The reactant mother liquor in the reactor was kept at 60° C. and the reactant mother liquor was stirred by means of a screw-shaped stirring blade, which had a diameter of 45 mm and whose periphery was enclosed in a mixing chamber having a capacity of about 100 mL, rotating at 500 rpm so that an upward stream was generated from the mixing chamber.

A dilute aqueous solution of $NH_4F$ composed of 150 mL of an aqueous solution of $NH_4F$ (10 mol/L) and 150 mL of water, 100 mL of an aqueous solution of KBr (0.25 mol/L), and a dilute aqueous solution of $EuBr_3$ composed of 7.5 mL of an aqueous solution of $EuBr_3$ (0.2 mol/L) and 92.5 mL of water were prepared separately. By using separate precision cylinder pumps, these aqueous solutions were added simultaneously at an adding rate of 6 mL/minute for the dilute aqueous solution of $NH_4F$, at an adding rate of 2 mL/minute for the dilute aqueous solution of KBr and at an adding rate of v=0.08t for the dilute aqueous solution of $EuBr_3$ into the mixing chamber in the reactant mother liquor being stirred and kept at the temperature to thereby form a precipitate, wherein t is the addition time in minutes, such that the adding rate v increases in a linear function with the addition time t (minute). After the completion of the addition, the reactant mother liquor was kept at the temperature and stirred for 2 hours so as to carry out the maturation of the precipitate.

The precipitate was separated by filtration and washed with 2 L of methanol. The precipitate after being washed was collected and dried at 120° C. for 4 hours under a vacuum to thereby obtain about 330 g of crystals of europium-activated, barium fluorobromide.

The crystals of europium-activated, barium fluorobromide thus obtained were fired as in Example B1 and grains of europium-activated, barium fluorobromide based stimulable phosphor ($Ba0.99Ca0.01FBr:0.0003K\cdot0.001Eu^{2+}$) were obtained.

Example B5

In order to synthesize the precursor of a europium-activated, barium fluorobromide based stimulable phosphor, a reactant mother liquor (having a $BaBr_2$ concentration of 1.0 mol/L) composed of 1200 mL of an aqueous solution of $BaBr_2$ (2.5 mol/L), 3.54 g of $CaBr_2\cdot2H_2O$, 2.98 g of KBr, and 1800 mL of water was placed in a reactor having a capacity of 4 L. The reactant mother liquor in the reactor was kept at 60° C. and the reactant mother liquor was stirred by means of a screw-shaped stirring blade, which had a diameter of 45 mm and whose periphery was enclosed in a mixing chamber having a capacity of about 100 mL, rotating at 500 rpm so that an upward stream was generated from the mixing chamber.

A dilute aqueous solution of $NH_4F$ composed of 150 mL of an aqueous solution of $NH_4F$ (10 mol/L) and 150 mL of water and a dilute aqueous solution of $EuBr_3$ composed of 5 mL of an aqueous solution of $EuBr_3$ (0.2 mol/L) and 95 mL of water were prepared separately. By using separate precision cylinder pumps, these aqueous solutions were added simultaneously at an adding rate of 6 mL/minute for the dilute aqueous solution of $NH_4F$ and at an adding rate of 4 mL/minute for the dilute aqueous solution of $EuBr_3$ into the mixing chamber in the reactant mother liquor being stirred and kept at the temperature to thereby form a precipitate, wherein the addition of the dilute aqueous solution of EuBr₃ was started 25 minutes after the start of the addition of the dilute aqueous solution of NH₄F. After the completion of the addition, the reactant mother liquor was kept at the temperature and stirred for 2 hours so as to carry out the maturation of the precipitate.

The precipitate was separated by filtration and washed with 2 L of methanol. The precipitate after being washed was collected and dried at 120° C. for 4 hours under a vacuum to thereby obtain about 330 g of crystals of europium-activated, barium fluorobromide.

The crystals of europium-activated, barium fluorobromide thus obtained were fired as in Example B1 and grains of europium-activated, barium fluorobromide based stimulable phosphor (Ba0.99Ca0.01FBr:0.0003K•0.001Eu$^{2+}$) were obtained.

Example B6

In order to synthesize the precursor of a europium-activated, barium fluorobromide based stimulable phosphor, a reactant mother liquor (having an NH₄Br concentration of 4.0 mol/L) composed of 1780 mL of an aqueous solution of NH₄Br (4.5 mol/L), 2.5 mL of an aqueous solution of EuBr₃ (0.2 mol/L), and 217.5 mL of water was placed in a reactor having a capacity of 4 L. The reactant mother liquor in the reactor was kept at 60° C. and the reactant mother liquor was stirred by means of a screw-shaped stirring blade, which had a diameter of 45 mm and whose periphery was enclosed in a mixing chamber having a capacity of about 100 mL, rotating at 500 rpm so that an upward stream was generated from the mixing chamber.

100 mL of an aqueous solution of NH₄F (10 mol/L), 400 mL of an aqueous solution of BaBr₂ (2.5 mol/L), a dilute aqueous solution of EuBr₃ composed of 2.5 mL of an aqueous solution of EuBr₃ (0.2 mol/L) and 97.5 mL of water, 100 mL of an aqueous solution of CaBr₂ (0.1 mol/L), and 100 mL of an aqueous solution of KBr (0.25 mol/L) were prepared separately. By using separate precision cylinder pumps, these aqueous solutions were added simultaneously at an adding rate of 8 mL/minute for the aqueous solution of BaBr₂ and at an adding rate of 2 mL/minute for each of the aqueous solution of NH₄Br, the dilute aqueous solution of EuBr₃, the aqueous solution of aqueous solution of CaBr₂, and the aqueous solution of KBr into the mixing chamber in the reactant mother liquor being stirred and kept at the temperature to thereby form a precipitate. After the completion of the addition, the reactant mother liquor was kept at the temperature and stirred for 2 hours so as to carry out the maturation of the precipitate.

The precipitate was separated by filtration and washed with 2 L of methanol. The precipitate after being washed was collected and dried at 120° C. for 4 hours under a vacuum to thereby obtain about 220 g of crystals of europium-activated, barium fluorobromide.

The crystals of europium-activated, barium fluorobromide thus obtained were fired as in Example B1 and grains of europium-activated, barium fluorobromide based stimulable phosphor (Ba0.99Ca0.01FBr:0.0003K•0.001Eu$^{2+}$) were obtained.

Comparative Example B1

In order to synthesize the precursor of a europium-activated, barium fluorobromide based stimulable phosphor, a reactant mother liquor (having a BaBr₂ concentration of 1.0 mol/L) composed of 1200 mL of an aqueous solution of BaBr₂ (2.5mol/L), 7.5 mL of an aqueous solution of EuBr₃ (0.2mol/L), 2.98 g of KBr, and 1800 mL of water was placed in a reactor having a capacity of 4 L. The reactant mother liquor in the reactor was kept at 60° C. and the reactant mother liquor was stirred by means of a screw-shaped stirring blade, which had a diameter of 45 mm and whose periphery was enclosed in a mixing chamber having a capacity of about 100 mL, rotating at 500 rpm so that an upward stream was generated from the mixing chamber.

A dilute aqueous solution of NH₄F composed of 150 mL of an aqueous solution of NH₄F (10 mol/L) and 150 mL of water and 100 mL of an aqueous solution of CaBr₂ (0.15 mol/L) were prepared separately. By using separate precision cylinder pumps, these aqueous solutions were added simultaneously at an adding rate of 6 mL/minute for the dilute aqueous solution of NH₄F and at an adding rate of 2 mL/minute for the aqueous solution of CaBr₂ into the mixing chamber in the reactant mother liquor being stirred and kept at the temperature to thereby form a precipitate. After the completion of the addition, the reactant mother liquor was kept at the temperature and stirred for 2 hours so as to carry out the maturation of the precipitate.

The precipitate was separated by filtration and washed with 2 L of methanol. The precipitate after being washed was collected and dried at 120° C. for 4 hours under a vacuum to thereby obtain about 330 g of crystals of europium-activated, barium fluorobromide.

The crystals of europium-activated, barium fluorobromide thus obtained were fired as in Example B1 and grains of europium-activated, barium fluorobromide based stimulable phosphor (Ba0.99Ca0.01FBr:0.0003K•0.001Eu$^{2+}$) were obtained.

Comparative Example B2

In order to synthesize the precursor of a europium-activated, barium fluorobromide based stimulable phosphor, a reactant mother liquor (having a BaBr₂ concentration of 1.0 mol/L) composed of 1200 mL of an aqueous solution of BaBr₂ (2.5 mol/L), 7.5 mL of an aqueous solution of EuBr₃ (0.2 mol/L), 3.54 g of CaBr₂•2H₂O, and 1800 mL of water was placed in a reactor having a capacity of 4 L. The reactant mother liquor in the reactor was kept at 60° C. and the reactant mother liquor was stirred by means of a screw-shaped stirring blade, which had a diameter of 45 mm and whose periphery was enclosed in a mixing chamber having a capacity of about 100 mL, rotating at 500 rpm so that an upward stream was generated from the mixing chamber.

A dilute aqueous solution of NH₄F composed of 150 mL of an aqueous solution of NH₄F (10 mol/L) and 150 mL of water and 100 mL of an aqueous solution of KBr (0.25 mol/L) were prepared separately. By using separate precision cylinder pumps, these aqueous solutions were added simultaneously at an adding rate of 6 mL/minute for the aqueous solution of NH₄F and at an adding rate of 2 mL/minute for the aqueous solution of KBr into the mixing chamber in the reactant mother liquor being stirred and kept at the temperature to thereby form a precipitate. After the completion of the addition, the reactant mother liquor was kept at the temperature and stirred for 2 hours so as to carry out the maturation of the precipitate.

The precipitate was separated by filtration and washed with 2 L of methanol. The precipitate after being washed was collected and dried at 120° C. for 4 hours under a vacuum to thereby obtain about 330 g of crystals of europium-activated, barium fluorobromide.

The crystals of europium-activated, barium fluorobromide thus obtained were fired as in Example B1 and grains of europium-activated, barium fluorobromide based stimulable phosphor (Ba0.99Ca0.01FBr:0.0003K•0.001Eu$^{2+}$) were obtained.

Comparative Example B3

In order to synthesize the precursor of a europium-activated, barium fluorobromide based stimulable phosphor, a reactant mother liquor (having a BaBr$_2$ concentration of 1.0 mol/L) composed of 1200 mL of an aqueous solution of BaBr$_2$ (2.5 mol/L), 7.5 mL of an aqueous solution of EuBr$_3$ (0.2 mol/L), 3.54 g of CaBr$_2$•2H$_2$O, 2.98 g of KBr, and 1792.5 mL of water was placed in a reactor having a capacity of 4 L. The reactant mother liquor in the reactor was kept at 60° C. and the reactant mother liquor was stirred by means of a screw-shaped stirring blade, which had a diameter of 45 mm and whose periphery was enclosed in a mixing chamber having a capacity of about 100 mL, rotating at 500 rpm so that an upward stream was generated from the mixing chamber.

A dilute aqueous solution of NH$_4$F composed of 150 mL of an aqueous solution of NH$_4$F (10 mol/L) and 150 mL of water was prepared. By using a precision cylinder pump, the aqueous solution was added at an adding rate of 6 mL/minute into the mixing chamber in the reactant mother liquor being stirred and kept at the temperature to thereby form a precipitate. After the completion of the addition, the reactant mother liquor was kept at the temperature and stirred for 2 hours so as to carry out the maturation of the precipitate.

The precipitate was separated by filtration and washed with 2 L of methanol. The precipitate after being washed was collected and dried at 120° C. for 4 hours under a vacuum to thereby obtain about 330 g of crystals of europium-activated, barium fluorobromide.

The crystals of europium-activated, barium fluorobromide thus obtained were fired as in Example B1 and grains of europium-activated, barium fluorobromide based stimulable phosphor (Ba0.99Ca0.01FBr:0.0003K•0.001Eu$^{2+}$) were obtained.

Measurement of Shape of Grains of the Phosphors

As in Examples A1 to A4, the shapes of phosphors obtained in Examples B1 to B6 and Comparative Examples B1 to B3 were subjected to measurement. The results are shown in Table 4.

Evaluation of Emission Characteristics of the Phosphors

The emission characteristics of the phosphors obtained in Examples B1 to B6 and Comparative Examples B1 to B3 were subjected to evaluation. The results are shown in Table 4.

(1) Sensitivity: Each of the phosphors was irradiated with X-rays of 80 kV and 100 mR, followed by the irradiation with He—Ne laser light at 12.4 J/m$^2$. The amount of stimulable emission from the phosphor was sought to thereby calculate the sensitivity level and the value obtained was defined as sensitivity.

(2) Value of erasure: Each of the phosphors was irradiated with X-rays of 80 kV and 100 mR, followed by the irradiation with He—Ne laser light at 12.4 J/m$^2$. The amount of stimulable emission from the phosphor was sought. The value thus obtained was defined as the amount of initial emission (initial value). Subsequently, the phosphor was irradiated with the light of a daylight fluorescent lamp under a condition of 400,000 lx•s, followed by the irradiation with He—Ne laser light at 12.4 J/m$^2$. The amount of stimulable emission from the phosphor was sought. The value thus obtained was defined as the erased level value. The value obtained by standardization of the erased level value using the initial value was used as a value of erasure.

TABLE 4

Characteristics of the phosphors obtained in Examples and Comparative Examples

| | Grain size median diameter (Dm/μm) | Grain size distribution σ/Dm (%) | Shape of grains | Grain aspect ratio | Sensitivity | Value of erasure |
|---|---|---|---|---|---|---|
| Example B1 | 6.2 | 37 | Tetradecahedron | 1.05 | 115 | $1.0 \times 10^{-4}$ |
| Example B2 | 5.7 | 39 | Tetradecahedron | 1.07 | 114 | $2.2 \times 10^{-4}$ |
| Example B3 | 6.2 | 37 | Tetradecahedron | 1.04 | 117 | $1.3 \times 10^{-4}$ |
| Example B4 | 6.1 | 36 | Tetradecahedron | 1.05 | 115 | $1.2 \times 10^{-4}$ |
| Example B5 | 5.8 | 36 | Tetradecahedron | 1.05 | 117 | $1.0 \times 10^{-4}$ |
| Example B6 | 6.0 | 38 | Tetradecahedron | 1.07 | 116 | $1.6 \times 10^{-4}$ |
| Comparative example B1 | 5.9 | 37 | Tetradecahedron | 1.06 | 104 | $2.8 \times 10^{-4}$ |
| Comparative example B2 | 6.1 | 35 | Tetradecahedron | 1.05 | 108 | $2.2 \times 10^{-4}$ |
| Comparative example B3 | 5.9 | 37 | Tetradecahedron | 1.04 | 100 | $3.5 \times 10^{-4}$ |

As shown in Table 4, it can be seen that the phosphors prepared by adding the additives simultaneously with the aqueous solution of NH$_4$F in Examples B1 to B6 are far superior to the phosphors of Comparative Examples B1 to B3, which were prepared by adding in advance the additives to the reactant mother liquors, in terms of sensitivity and erasure characteristics.

According to the present invention, it is possible to upgrade the image qualities (sharpness and structural noise in particular) of a radiographic image conversion panel by controlling the grain shape, grain aspect ratio, grain size (median diameter), and grain size distribution of the rare earth element-activated, alkaline earth metal fluorohalide based stimulable phosphor contained in the radiographic image conversion panel.

Further, according to the present invention, the simultaneous addition of the additives and the aqueous solution of an inorganic fluoride in the synthesis of the precursors of rare earth element-activated, barium fluorobromide based stimulable phosphors in the mother liquors makes it possible to significantly improve the sensitivity and erasure characteristics of the phosphors to be obtained.

Example C1

A europium-activated, barium fluorobromide based stimulable phosphor (BaFBr:0.001Eu$^{2+}$) was prepared according to the following procedure.

1780 mL of an aqueous solution of NH$_4$Br (4.5 mol/L), 5 mL of an aqueous solution of EuBr$_3$ (0.2 mol/L), and 215 mL of water were placed in a reactor having a capacity of 4 L. The reactant mother liquor (having an NH$_4$Br concentration of 4.0 mol/L) in the reactor was kept at 60° C. and the reactant mother liquor was stirred by means of a screw-shaped stirring blade, which had a diameter of 45 mm and whose periphery was enclosed in a mixing chamber having a capacity of about 100 mL, rotating at 500 rpm so that an upward stream was generated from the mixing chamber. Next, by using separate precision cylinder pumps, 100 mL of an aqueous solution of NH$_4$F (10 mol/L) and 400 mL of an aqueous solution of BaBr$_2$ (2.5 mol/L) were added simultaneously into the reactant mother liquor being stirred and kept at the temperature in the mixing chamber in such a manner that the molar ratio of NH$_4$F to BaX$_2$ was kept constant.

The addition was carried out in two stages. In the first stage, the addition was carried out for 1 minute at a constant rate of 20 mL/minute (average adding rate of 20 mL/minute) for the aqueous solution of NH$_4$F and at a constant rate of 80 mL/minute (average adding rate of 80 mL/minute) for the aqueous solution of BaBr$_2$. Subsequent to the completion of the first-stage addition, the second-stage addition was carried out. In the second stage, the addition was carried out for 40 minutes at a constant rate of 2 mL/minute (average adding rate of 2 mL/minute) for the aqueous solution of NH$_4$F and at a constant rate of 8 mL/minute (average adding rate of 8 mL/minute) for the aqueous solution of BaBr$_2$. The amount of the precipitate produced in the first-stage addition accounted for 20% of the total amount of the crystals of the precursor that finally precipitated. During the addition of the two aqueous solutions, the reactant solution was kept at 60° C. The precipitate was separated by filtration and washed with 2 L of methanol. The precipitate after being washed was collected and dried at 120° C. for 4 hours under a vacuum to thereby obtain about 220 g of crystals of europium-activated, barium fluorobromide. To the crystals of europium-activated, barium fluorobromide thus obtained were added 1% by weight of ultrafine grain powder of alumina to prevent the change in grain shape due to sintering and the change in grain size due to inter-grain fusion at the time of firing, and were subjected to sufficient mixing by means of a mixer so as to adhere the ultrafine grain powder of alumina uniformly to the surface of the crystals. After that, 100 g of the resultant mixture was taken out and packed into a quartz boat, which was fired using a tube furnace in a nitrogen gas atmosphere at 850° C. for 2 hours. In this way, grains of europium-activated, barium fluorobromide based stimulable phosphor (BaFBr:0.001Eu$^{2+}$) were obtained.

Example C2

Grains of europium-activated, barium fluorobromide based stimulable phosphor (BaFBr:0.001Eu$^{2+}$) were obtained by repeating the procedure of Example C1, except that the first-stage addition was carried out for 0.4 minutes at an adding rate of 50 mL/minute (constant adding rate, average adding rate of 50 mL/minute) for the aqueous solution of NH$_4$F and at an adding rate of 200 mL/minute (constant adding rate, average adding rate of 200 mL/minute) for the aqueous solution of BaBr$_2$ and the second-stage addition was carried out for 40 minutes at an adding rate of 2 mL/minute (constant adding rate, average adding rate of 2 mL/minute) for the aqueous solution of NH$_4$F and at an adding rate of 8 mL/minute (constant adding rate, average adding rate of 8 mL/minute) for the aqueous solution of BaBr$_2$. The amount of the precipitate produced in the first-stage addition accounted for 20% of the total amount of the crystals of the precursor that finally precipitated.

Example C3

Grains of europium-activated, barium fluorobromide based stimulable phosphor (BaFBr:0.001Eu$^{2+}$) were obtained by repeating the procedure of Example C1, except that the first-stage addition was carried out for 0.2 minutes at an adding rate of 100 mL/minute (constant adding rate, average adding rate of 100 mL/minute) for the aqueous solution of NH$_4$F and at an adding rate of 400 mL/minute (constant adding rate, average adding rate of 400 mL/minute) for the aqueous solution of BaBr$_2$ and the second-stage addition was carried out for 40 minutes at an adding rate of 2 mL/minute (constant adding rate, average adding rate of 2 mL/minute) for the aqueous solution of NH$_4$F and at an adding rate of 8 mL/minute (constant adding rate, average adding rate of 8 mL/minute) for the aqueous solution of BaBr$_2$. The amount of the precipitate produced in the first-stage addition accounted for 20% of the total amount of the crystals of the precursor that finally precipitated.

Comparative Example C1

A europium-activated, barium fluorobromide based stimulable phosphor (BaFBr:0.00Eu$^{2+}$) was prepared according to the following procedure.

1780 mL of an aqueous solution of NH$_4$Br (4.5 mol/L), 5 mL of an aqueous solution of EuBr$_3$ (0.2 mol/L), and 215 mL of water were placed in a reactor having a capacity of 4 L. The reactant mother liquor in the reactor (having an NH$_4$Br concentration of 4.0 mol/L) was kept at 60° C. and the reactant mother liquor was stirred by means of a screw-shaped stirring blade, which had a diameter of 45 mm and whose periphery was enclosed in a mixing chamber having a capacity of about 100 mL, rotating at 500 rpm so that an upward stream was generated from the mixing chamber. Next, 100 mL of an aqueous solution of NH$_4$F (10 mol/L) and 400 mL of an aqueous solution of BaBr$_2$ (2.5 mol/L) were added simultaneously by using separate precision cylinder pumps at a constant adding rate of 10 mL/minute for the aqueous solution of NH$_4$F and at a constant adding rate of 40 mL/minute for the aqueous solution of BaBr$_2$ into the mixing chamber in the reactant mother liquor being stirred and kept at the temperature in such a manner that the molar ratio of NH$_4$F to BaBr$_2$ was kept constant to thereby form a precipitate. After the completion of the addition, the reactant mother liquor was kept at the temperature and stirred for 2 hours so as to carry out the maturation of the precipitate.

The precipitate was separated by filtration and washed with 2 L of methanol. The precipitate after being washed was collected and dried at 120° C. for 4 hours under a vacuum to thereby obtain about 220 g of crystals of europium-activated, barium fluorobromide. The crystals were fired as in Example C1 and grains of europium-activated, barium fluorobromide based stimulable phosphor (BaFBr:0.001Eu$^{2+}$) were obtained.

Comparative Example C2

A europium-activated, barium fluorobromide based stimulable phosphor (BaFBr:0.001Eu$^{2+}$) was prepared according to the following procedure.

In order to synthesize the precursor, 220 mL of an aqueous solution of NH$_4$Br (4.5 mol/L), 5 mL of an aqueous solution of EuBr$_3$ (0.2 mol/L), 480 mL of an aqueous solution of BaBr$_2$ (2.5 mol/L), and 1295 mL of water were placed in a reactor having a capacity of 4 L. The reactant mother liquor in the reactor (having an NH$_4$Br concentration of 0.5 mol/L and a BaBr$_2$ concentration of 0.6 mol/L) was kept at 60° C. and the reactant mother liquor was stirred by means of a screw-shaped stirring blade, which had a diameter of 45 mm and whose periphery was enclosed in a mixing chamber having a capacity of about 100 mL, rotating at 500 rpm so that an upward stream was generated from the mixing chamber. Next, 100 mL of an aqueous solution of NH$_4$F (10 mol/L) and 400 mL of an aqueous solution of BaBr$_2$ (2.5 mol/L) were added simultaneously by using separate precision cylinder pumps at a constant adding rate of 2 mL/minute for the aqueous solution of NH$_4$F and at a constant adding rate of 8 mL/minute for the aqueous solution of BaBr$_2$ into the mixing chamber in the reactant mother liquor being stirred and kept at the temperature in such a manner that the molar ratio of NH$_4$F to BaBr$_2$ was kept constant to thereby form a precipitate. After the completion of the addition, the reactant mother liquor was kept at the temperature and stirred for 2 hours so as to carry out the maturation of the precipitate.

The precipitate was separated by filtration and washed with 2 L of methanol. The precipitate after being washed was collected and dried at 120° C. for 4 hours under a vacuum to thereby obtain about 220 g of crystals of europium-activated, barium fluorobromide. The crystals were fired as in Example C1 and grains of europium-activated, barium fluorobromide based stimulable phosphor (BaFBr:0.001Eu$^{2+}$) were obtained.

Evaluation of the Shape etc. of the Phosphor Grains

The stimulable phosphors obtained in Examples C1 to C3 and Comparative Examples C1 to C2 were evaluated as in Examples A1 to A4. The results are shown in Table 5.

Next, by using the stimulable phosphors obtained in Examples C1 to C3 and Comparative Examples C1 to C2, radiographic image conversion panels were prepared according to the following procedure and the panels thus prepared were evaluated in the following way.

A coating liquid for the phosphor layer having a viscosity of 25 to 30 PS was prepared by adding 356 g of stimulable phosphor obtained in Examples C1 to C3 and Comparative Examples C1 to C2, 15.8 g of a polyurethane resin (Desmolac 4125 manufactured by Sumitomo Bayer Urethane Co., Ltd.), and 2.0 g of a bisphenol A based epoxy resin into a methyl ethyl ketone/toluene (1:1) solvent mixture and dispersing these substances using a propeller-type mixer. The coating liquid was coated using a doctor blade on a support comprising a polyethylene terephthalate film, which had been already coated with a primer. The coating was dried at 100° C. for 15 minutes and fluorescent layers having various thicknesses were formed.

Next, a coating liquid for the protective layer was prepared by adding 70 g of a fluorocarbon resin (a fluoroolefin/vinyl ether copolymer: Lumifron LF-100 manufactured by Asahi Glass Co., Ltd.), 25 g of a crosslinking agent (isocyanate Desmodul Z4370 manufactured by Sumitomo Bayer Urethane Co., Ltd.), 5.0 g of a bisphenol A based epoxy resin, and 10 g of a silicone resin powder having particle sizes of 1 to 2 μm (KMP-590 manufactured by Shin-Etsu Chemical Co., Ltd.) into a toluene/isopropyl alcohol (1:1) solvent mixture. The coating liquid was coated using a doctor blade on the stimulable fluorescent layer previously formed on the support. The coating was thermally treated at 120° C. for 30 minutes for drying and hardening so as to form a protective layer having a thickness 10 μm.

In the above-described way, radiographic image conversion panels having stimulable fluorescent layers of various thicknesses were obtained.

Methods for Evaluating the Radiographic Image Conversion Panels

<Evaluation of sensitivity>

Each of the radiographic image conversion panels thus prepared was irradiated with X-rays having a tube voltage of 80 kV, followed by scanning with He—Ne laser light (having a wavelength of 632.8 nm). The intensity of the stimulable emission from the phosphor layer was measured and used for the evaluation of the sensitivity (the values thus obtained were evaluated as relative values by taking the value for the radiographic image conversion panel of Example C1 as 100).

<Evaluation of sharpness>

Each of the radiographic image conversion panels was irradiated with X-rays having a tube voltage of 80 kV through a CTF chart, followed by scanning with He—Ne laser light. A contrast transmission function (CTF) was measured from the image obtained and the sharpness was evaluated by the CTF value at a spatial frequency of 2 cycles/mm.

<Evaluation of granularity>

Each of the radiographic image conversion panels was irradiated uniformly with X-rays having a tube voltage of 80 kV, followed by scanning with He—Ne laser light. In this way, uniformly exposed images were obtained. The granularities of the image signals obtained were measured by RMS values (the values thus obtained were evaluated as relative values by taking the value for the radiographic image conversion panel of Example A1 as 100).

The results are shown in Table 5.

TABLE 5

|  | Example C1 | Example C2 | Example C3 | Comparative example C1 | Comparative example C2 |
| --- | --- | --- | --- | --- | --- |
| Median grain diameter (Dm) | 4.73 | 3.93 | 3.30 | 5.66 | 9.21 |
| Deviation (σ) | 1.91 | 1.68 | 1.39 | 2.19 | 4.84 |

TABLE 5-continued

|  | Example C1 | Example C2 | Example C3 | Comparative example C1 | Comparative example C2 |
|---|---|---|---|---|---|
| σ/Dm (%) | 40.4 | 42.7 | 42.1 | 38.7 | 52.6 |
| Grain shape | Tetradecahedron | Tetradecahedron | Tetradecahedron | Columnar | Tetradecahedron |
| Grain aspect ratio | 1.05 | 1.07 | 1.04 | 2.54 | 1.09 |
| Panel sensitivity | 100 | 98 | 95 | 90 | 91 |
| Degree of sharpness of panel (%) | 35 | 37 | 40 | 31 | 32 |
| Granularity of panel | 100 | 95 | 93 | 108 | 113 |

As can be seen from the results of Table 5, whereas Examples C1 to C3, in which the reactant solutions were added at a faster adding rate in the first stage and at a slower adding rate in the second stage, provide tetradecahedral grains having aspect ratios of about 1 and exhibit better controllability of grain size distribution, Comparative Example C1 provides columnar grains. Although Comparative Example C2 provides tetradecahedral grains, the grain size distribution of the grains of Comparative Example C2 is more than 50% and broad. Further, whereas image qualities of the radiographic image conversion panels containing the phosphors of Examples C1 to C3 have a good balance of sensitivity, image sharpness, and granularity, the image quality of the panels using the phosphors of Comparative Example C1 and C2 tends to be poor in terms of sharpness and granularity.

The processes for preparing stimulable phosphors of the present invention facilitate the control of the grain shape, grain aspect ratio, grain size (median diameter), and grain size distribution of the phosphor grains to be obtained and make it possible to provide stimulable phosphors which can upgrade the image quality (sharpness and structural noise in particular) when the stimulable phosphors are used in a radiographic image conversion panel or the like.

Example D1

In order to synthesize the precursor of a europium-activated, barium fluorobromide based stimulable phosphor, a reactant mother liquor (having an NH$_4$Br concentration of 3.5 mol/L) composed of 1560 mL of an aqueous solution of NH$_4$Br (4.5 mol/L), 5 mL of an aqueous solution of EuBr$_3$ (0.2 mol/L), and 435 mL of water was placed in a reactor having a capacity of 4 L. The reactant mother liquor in the reactor was kept at 60° C. and the reactant mother liquor was stirred by means of a screw-shaped stirring blade, which had a diameter of 45 mm and whose periphery was enclosed in a mixing chamber having a capacity of about 100 mL, rotating at 500 rpm so that an upward stream was generated from the mixing chamber.

By using separate precision cylinder pumps, 80 mL of an aqueous solution of NH$_4$F (2.5 mol/L), 80 mL of an aqueous solution of BaBr$_2$ (2.5 mol/L)$_1$ and 340 mL of an aqueous solution of NH$_4$Br (4.5 mol/L) were added simultaneously at an adding rate of 20 mL/minute for each of the aqueous solution of NH$_4$F and the aqueous solution of BaBr$_2$ and at an adding rate of 85 mL/minute for the aqueous solution of NH$_4$Br into an instant reactor (which comprised a cylindrical cell having a content volume of 2 mL and a pair of stirrers having a diameter of 10 mm, disposed in upper and lower portions of the cell, rotating at 3000 rpm in directions opposite to each other), and these aqueous solutions were caused to react. The suspension produced by the reaction was successively pumped from the reaction cell by the addition of the aqueous solutions and was introduced into the mixing chamber in the reactant mother liquor kept at the temperature and stirred.

Subsequently, 320 mL of an aqueous solution of NH$_4$F (2.5 mol/L) and 320 mL of an aqueous solution of BaBr$_2$ (2.5 mol/L) were prepared separately. By using separate precision cylinder pumps, these aqueous solutions were added simultaneously at an adding rate of 8 mL/minute in such a manner that the molar ratio of NH$_4$F to BaBr$_2$ was constant into the mixing chamber in the reactant mother liquor, which contained the suspension, being stirred and kept at the temperature to thereby form a precipitate. After the completion of the addition, the reactant mother liquor was kept at the temperature and stirred for 2 hours so as to carry out the maturation of the precipitate.

The precipitate was separated by filtration and washed with 2 L of methanol. The precipitate after being washed was collected and dried at 120° C. for 4 hours under a vacuum to thereby obtain about 220 g of crystals of europium-activated, barium fluorobromide.

To the crystals of europium-activated, barium fluorobromide thus obtained were added 1% by weight of ultrafine grain powder of alumina to prevent a change in grain shape due to sintering and a change in grain size due to inter-grain fusion at the time of firing, and were subjected to sufficient mixing by means of a mixer so as to adhere the ultrafine grain powder of alumina uniformly to the surface of the crystals. After that, 100 g of the resultant mixture was taken out and packed into a quartz boat, which was fired using a tube furnace in a nitrogen gas atmosphere at 850° C. for 2 hours. In this way, grains of europium-activated, barium fluorobromide based stimulable phosphor (BaFBr:0.001Eu$^{2+}$) were obtained.

Example D2

In order to synthesize the precursor of a europium-activated, barium fluorobromide based stimulable phosphor, a reactant mother liquor (having an NH$_4$Br concentration of 4.0 mol/L) composed of 1780 mL of an aqueous solution of NH$_4$Br (4.5 mol/L), 5 mL of an aqueous solution of EuBr$_3$ (0.2 mol/L), and 215 mL of water was placed in a reactor having a capacity of 4 L. The reactant mother liquor in the reactor was kept at 60° C. and the reactant mother liquor was stirred by means of a screw-shaped stirring blade, which had a diameter of 45 mm and whose periphery was enclosed in a mixing chamber having a capacity of about 100 mL, rotating at 500 rpm so that an upward stream was generated from the mixing chamber.

By using separate precision cylinder pumps, 80 mL of an aqueous solution of NH$_4$F (2.5 mol/L), 80 mL of an aqueous solution of BaBr$_2$ (2.5mol/L), and 340mL of an aqueous solution of NH$_4$Br (4.5 mol/L) were added simultaneously at an adding rate of 80 mL/minute for each of the aqueous solution of NH$_4$F and the aqueous solution of BaBr$_2$ and at an adding rate of 340 mL for the aqueous solution of NH$_4$Br into an instant reactor (which comprised a cylindrical cell having a content volume of 2 mL and a pair of stirrers having a diameter of 10 mm, disposed in upper and lower portions of the cell, rotating at 3000 rpm in directions opposite to each other), and these aqueous solutions were caused to react. The suspension produced by the reaction was successively pumped from the reaction cell by the addition of the aqueous solutions and was introduced into the mixing chamber in the reactant mother liquor kept at the temperature and stirred.

Subsequently, 320 mL of an aqueous solution of NH$_4$F (2.5 mol/L) and 320 mL of an aqueous solution of BaBr$_2$ (2.5 mol/L) were prepared separately. By using separate precision cylinder pumps, these aqueous solutions were added simultaneously at an adding rate of 8 mL/minute in such a manner that the molar ratio of NH$_4$F to BaBr$_2$ was constant into the reactant mother liquor in the mixing chamber, which contained the suspension, being stirred and kept at the temperature to thereby form a precipitate. After the completion of the addition, the reactant mother liquor was kept at the temperature and stirred for 2 hours so as to carry out the maturation of the precipitate.

The precipitate was separated by filtration and washed with 2 L of methanol. The precipitate after being washed was collected and dried at 120° C. for 4 hours under a vacuum to thereby obtain about 220 g of crystals of europium-activated, barium fluorobromide.

The crystals of europium-activated, barium fluorobromide thus obtained were fired as in Example D1 and grains of europium-activated, barium fluorobromide based stimulable phosphor (BaFBr:0.001Eu$^{2+}$) were obtained.

Example D3

In order to synthesize the precursor of a europium-activated, barium fluorobromide based stimulable phosphor, a reactant mother liquor (having a BaBr$_2$ concentration of 1.0 mol/L) composed of 800 mL of an aqueous solution of BaBr$_2$ (2.5 mol/L), 5 mL of an aqueous solution of EuBr$_3$ (0.2 mol/L), and 1195 mL of water was placed in a reactor having a capacity of 4 L. The reactant mother liquor in the reactor was kept at 60° C. and the reactant mother liquor was stirred by means of a screw-shaped stirring blade, which had a diameter of 45 mm and whose periphery was enclosed in a mixing chamber having a capacity of about 100 mL, rotating at 500 rpm so that an upward stream was generated from the mixing chamber.

By using separate precision cylinder pumps, 80 mL of an aqueous solution of NH$_4$F (2.5 mol/L), 80 mL of an aqueous solution of BaBr$_2$ (2.5mol/L), and 340 mL of an aqueous solution of NH$_4$Br (4.5 mol/L) were added simultaneously at an adding rate of 80 mL/minute for each of the aqueous solution of NH$_4$F and the aqueous solution of BaBr$_2$ and at an adding rate of 340 mL for the aqueous solution of NH$_4$Br into an instant reactor (which comprised a cylindrical cell having a content volume of 2 mL and a pair of stirrers having a diameter of 10 mm, disposed in upper and lower portions of the cell, rotating at 3000 rpm in directions opposite to each other), and these aqueous solutions were caused to react. The suspension produced by the reaction was successively pumped from the reaction cell by the addition of the aqueous solutions and was introduced into the mixing chamber of the reactant mother liquor kept at the temperature and stirred.

Subsequently, 320 mL of an aqueous solution of NH$_4$F (2.5 mol/L) was prepared. By using a precision cylinder pump, this aqueous solution was added at an adding rate of 8 mL/minute into the reactant mother liquor in the mixing chamber, which contained the suspension, being stirred and kept at the temperature to thereby form a precipitate. After the completion of the addition, the reactant mother liquor was kept at the temperature and stirred for 2 hours so as to carry out the maturation of the precipitate.

The precipitate was separated by filtration and washed with 2 L of methanol. The precipitate after being washed was collected and dried at 120° C. for 4 hours under a vacuum to thereby obtain about 220 g of crystals of europium-activated, barium fluorobromide.

The crystals of europium-activated, barium fluorobromide thus obtained were fired as in Example D1 and grains of europium-activated, barium fluorobromide based stimulable phosphor (BaFBr:0.001Eu$^{2+}$) were obtained.

Example D4

In order to synthesize the precursor of a europium-activated, barium fluorobromide based stimulable phosphor, a reactant mother liquor (having a BaBr$_2$ concentration of 1.2 mol/L) composed of 960 mL of an aqueous solution of BaBr$_2$ (2.5 mol/L), 5 mL of an aqueous solution of EuBr$_3$ (0.2 mol/L), and 1035 mL of water was placed in a reactor having a capacity of 4 L. The reactant mother liquor in the reactor was kept at 60° C. and the reactant mother liquor was stirred by means of a screw-shaped stirring blade, which had a diameter of 45 mm and whose periphery was enclosed in a mixing chamber having a capacity of about 100 mL, rotating at 500 rpm so that an upward stream was generated from the mixing chamber.

By using separate precision cylinder pumps, 80 mL of an aqueous solution of NH$_4$F (2.5 mol/L), 80 mL of an aqueous solution of BaBr$_2$ (2.5mol/L), and 340 mL of an aqueous solution of NH$_4$Br (4.5 mol/L) were added simultaneously at an adding rate of 80 mL/minute for each of the aqueous solution of NH$_4$F and the aqueous solution of BaBr$_2$ and at an adding rate of 340 mL for the aqueous solution of NH$_4$Br into an instant reactor (which comprised a cylindrical cell having a content volume of 2 mL and a pair of stirrers having a diameter of 10 mm, disposed in upper and lower portions of the cell, rotating at 3000 rpm in directions opposite to each other), and these aqueous solutions were caused to react. The suspension produced by the reaction was successively pumped from the reaction cell by the addition of the aqueous solutions and was introduced into the reactant mother liquor kept at the temperature and stirred in the mixing chamber.

Subsequently, 320 mL of an aqueous solution of NH$_4$F (2.5 mol/L) was prepared. By using a precision cylinder pump, this aqueous solution was added at an adding rate of 8 mL/minute into the reactant mother liquor in the mixing chamber, which contained the suspension, being stirred and kept at the temperature to thereby form a precipitate. After the completion of the addition, the reactant mother liquor was kept at the temperature and stirred for 2 hours so as to carry out the maturation of the precipitate.

The precipitate was separated by filtration and washed with 2 L of methanol. The precipitate after being washed was collected and dried at 120° C. for 4 hours under a vacuum to thereby obtain about 220 g of crystals of europium-activated, barium fluorobromide.

The crystals of europium-activated, barium fluorobromide thus obtained were fired as in Example D1 and grains of europium-activated, barium fluorobromide based stimulable phosphor (BaFBr:0.001Eu$^{2+}$) were obtained.

Comparative Example D1

In order to synthesize the precursor of a europium-activated, barium fluorobromide based stimulable phosphor, a reactant mother liquor (having an NH$_4$Br concentration of 4.0 mol/L) composed of 1780 mL of an aqueous solution of NH$_4$Br (4.5 mol/L), 5 mL of an aqueous solution of EuBr$_3$ (0.2 mol/L), and 215 mL of water was placed in a reactor having a capacity of 4 L. The reactant mother liquor in the reactor was kept at 60° C. and the reactant mother liquor was stirred by means of a screw-shaped stirring blade, which had a diameter of 45 mm and whose periphery was enclosed in a mixing chamber having a capacity of about 100 mL, rotating at 500 rpm so that an upward stream was generated from the mixing chamber.

100 mL of an aqueous solution of NH$_4$F (10 mol/L) and 400 mL of an aqueous solution of BaBr$_2$ (2.5 mol/L) were prepared separately. By using separate precision cylinder pumps, the aqueous solution of NH$_4$F and the aqueous solution of BaBr$_2$ were added simultaneously at an adding rate of 10 mL/minute for the aqueous solution of NH$_4$F and at an adding rate of 40 mL for the aqueous solution of BaBr$_2$ into the reactant mother liquor being stirred and kept at the temperature in the mixing chamber in such a manner that the molar ratio of NH$_4$F to BaBr$_2$ was kept constant to thereby form a precipitate. After the completion of the addition, the reactant mother liquor was kept at the temperature and stirred for 2 hours so as to carry out the maturation of the precipitate.

The precipitate was separated by filtration and washed with 2 L of methanol. The precipitate after being washed was collected and dried at 120° C. for 4 hours under a vacuum to thereby obtain about 220 g of crystals of europium-activated, barium fluorobromide.

The crystals of europium-activated, barium fluorobromide thus obtained were fired as in Example D1 and grains of europium-activated, barium fluorobromide based stimulable phosphor (BaFBr:0.001Eu$^{2+}$) were obtained.

Comparative Example D2

In order to synthesize the precursor of a europium-activated, barium fluorobromide based stimulable phosphor, a reactant mother liquor (having an NH$_4$Br concentration of 4.0 mol/L) composed of 220 mL of an aqueous solution of NH$_4$Br (4.5 mol/L), 5 mL of an aqueous solution of EuBr$_3$ (0.2 mol/L), 480 mL of an aqueous solution of BaBr$_2$ (2.5 mol/L), and 1295 mL of water was placed in a reactor having a capacity of 4 L. The reactant mother liquor in the reactor was kept at 60° C. and the reactant mother liquor was stirred by means of a screw-shaped stirring blade, which had a diameter of 45 mm and whose periphery was enclosed in a mixing chamber having a capacity of about 100 mL, rotating at 500 rpm so that an upward stream was generated from the mixing chamber. 100 mL of an aqueous solution of NH$_4$F (10 mol/L) and 400 mL of an aqueous solution of BaBr$_2$ (2.5 mol/L) were prepared separately. By using separate precision cylinder pumps, these aqueous solutions were added simultaneously at an adding rate of 2 mL/minute for the aqueous solution of NH$_4$F and at an adding rate of 8 mL for the aqueous solution of BaBr$_2$ into the reactant mother liquor being stirred and kept at the temperature in the mixing chamber in such a manner that the molar ratio of NH$_4$F to BaBr$_2$ was kept constant to thereby form a precipitate. After the completion of the addition, the reactant mother liquor was kept at the temperature and stirred for 2 hours so as to carry out the maturation of the precipitate.

The precipitate was separated by filtration and washed with 2 L of methanol. The precipitate after being washed was collected and dried at 120° C. for 4 hours under a vacuum to thereby obtain about 220 g of crystals of europium-activated, barium fluorobromide.

The crystals of europium-activated, barium fluorobromide thus obtained were fired as in Example D1 and grains of europium-activated, barium fluorobromide based stimulable phosphor (BaFBr:0.001Eu$^{2+}$) were obtained.

Evaluation of the Shape etc. of the Phosphor Grains

The stimulable phosphors obtained in Examples D1 to D4 and Comparative Examples D1 and D2 were evaluated as in Examples A1 to A4. The results are shown in Table 6.

Next, by using the stimulable phosphors obtained in Examples D1 to D4 and Comparative Examples D1 and D2, radiographic image conversion panels were prepared according to the following procedure and the panels thus prepared were evaluated in the following way.

A coating liquid for a phosphor layer having a viscosity of 25 to 30 PS was prepared by adding 356 g of a phosphor obtained in Examples D1 to D4 and Comparative Examples D1 and D2, 15.8 g of a polyurethane resin (Desmolac 4125 manufactured by Sumitomo Bayer Urethane Co., Ltd.), and 2.0 g of a bisphenol A based epoxy resin into a methyl ethyl ketone/toluene (1:1) solvent mixture and dispersing these substances using a propeller-type mixer. The coating liquid was coated using a doctor blade on a support comprising a polyethylene terephthalate film which had been already coated with a primer. The coating was dried at 100° C. for 15 minutes and fluorescent layers having various thicknesses were formed.

Next, a coating liquid for a protective layer was prepared by adding 70 g of a fluorocarbon resin (a fluoroolefin/vinyl ether copolymer Lumifron LF-100 manufactured by Asahi Glass Co., Ltd.), 25 g of a crosslinking agent (isocyanate: Desmodul Z4370 manufactured by Sumitomo Bayer Urethane Co., Ltd.), 5.0 g of a bisphenol A based epoxy resin, and 10 g of a silicone resin powder having particle sizes of 1 to 2 m (KMP-590 manufactured by Shin-Etsu Chemical Co., Ltd.) into a toluene/isopropyl alcohol (1:1) solvent mixture. The coating liquid was coated using a doctor blade on the stimulable fluorescent layer previously formed on the support. The coating was thermally treated at 120° C. for 30 minutes for drying and hardening so as to form a protective layer having a thickness of 10 µm.

In the above-described way, radiographic image conversion panels having stimulable fluorescent layers of various thicknesses were obtained.

Methods for Evaluating the Radiographic image Conversion Panels

<Evaluation of sensitivity>

Each of the radiographic image conversion panels thus prepared was irradiated with X-rays having a tube voltage of 80 kV, followed by scanning with He—Ne laser light (having a wavelength of 632.8 nm). The intensity of the stimulable emission from the phosphor layer was measured and used for the evaluation of the sensitivity (The values thus obtained were evaluated as relative values by taking the value for the radiographic image conversion panel of Example D1 as 100).

<Evaluation of sharpness>

Each of the radiographic image conversion panels was irradiated with X-rays having a tube voltage of 80 kV through a CTF chart, followed by scanning with He—Ne laser light to thereby obtain an image of CTF chart. A contrast transmission function (CTF) was measured from the image obtained and the sharpness was evaluated by the CTF value at a spatial frequency of 2 cycles/mm.

<Evaluation of granularity>

Each of the radiographic image conversion panels was irradiated uniformly with X-rays having a tube voltage of 80 kV, followed by scanning with He—Ne laser light. In this way, uniformly exposed images were obtained. The granularities of the image signals obtained were measured by RMS values (The values thus obtained were evaluated as relative values by taking the value for the radiographic image conversion panel of Example D1 as 100).

The results are shown in Table 6.

TABLE 6

|  | Example D1 | Example D2 | Example D3 | Example D4 | Comparative example D1 | Comparative example D2 |
| --- | --- | --- | --- | --- | --- | --- |
| Median grain diameter (Dm) | 8.36 | 5.65 | 5.72 | 3.62 | 5.66 | 9.21 |
| Deviation (σ) | 2.97 | 2.21 | 1.99 | 1.28 | 2.19 | 4.84 |
| σ/Dm (%) | 35.5 | 39.1 | 34.8 | 35.4 | 38.7 | 52.6 |
| Grain shape | Tetradecahedron | Tetradecahedron | Tetradecahedron | Tetradecahedron | Columnar | Tetradecahedron |
| Grain aspect ratio | 1.04 | 1.05 | 1.05 | 1.06 | 2.54 | 1.09 |
| Panel sensitivity | 100 | 101 | 102 | 97 | 90 | 91 |
| Degree of sharpness of panel (%) | 33 | 35 | 34 | 38 | 31 | 32 |
| Granularity of panel | 100 | 97 | 97 | 93 | 106 | 110 |

As can be seen from the results of Table 6, whereas Examples D1 to D4, in which nuclei of the crystals of the phosphor precursor were first formed by use of an instant reactor and thereafter the crystal growth was carried out in a reactor, provide tetradecahedral grains having aspect ratios of about 1 and exhibit better controllability of grain size distribution, Comparative Example D1 provides columnar grains. Although Comparative Example D2 provides tetradecahedral grains, the grain size distribution of the grains of Comparative Example D2 is more than 50% and broad. Further, whereas the image quality of the radiographic image conversion panels comprising the phosphors of Examples D1 to D4 have a good balance of sensitivity, image sharpness, and granularity, the image quality of the panels using the phosphors of Comparative Examples D1 and D2 tends to be poor in terms of sharpness and granularity.

The processes for preparing stimulable phosphors of the present invention facilitates the control of the grain shape, grain aspect ratio, grain size (median diameter), and grain size distribution of the phosphor grains to be obtained and make it possible to provide stimulable phosphors which can upgrade the image quality (sharpness and structural noise in particular) when the stimulable phosphors are used in a radiographic image conversion panel or the like, because the number of the grains is determined by forming the nuclei of crystals of the phosphor precursor. The reaction apparatus according to the present invention can provide the above-described stimulable phosphors.

What is claimed is:

1. A process for preparing a rare earth element-activated, alkaline earth metal fluorohalide based stimulable phosphor which is represented by the basic compositional formula (I):

$$Ba_{1-x}MII_xFX:yMI,zLn \qquad (I)$$

wherein MII represents at least one alkaline earth metal selected from the group consisting of Sr and Ca; MI represents at least one alkaline metal selected from the group consisting of Li, Na, K, Rb, and Cs; X represents at least one halogen selected from the group consisting of Cl, Br, and I; Ln represents at least one rare earth element selected from the group consisting of Ce, Pr, Sm, Eu, Gd, Tb, Tm, and Yb; and x, y, and z represent, respectively, numerals within the ranges of $0 \leq x \leq 0.5$, $0 \leq y \leq 0.05$, and $0 < z \leq 0.2$, and which has a grain size median diameter (Dm) of 1 to 10 μm, σ/Dm of 50% or less where σ is a standard deviation of grain size distribution, and a grain aspect ratio within the range of from 1.0 to 2.0, comprising:

a mother liquor preparing step for preparing a reactant mother liquor which is an aqueous solution containing $BaX_2$, a water-soluble compound of Ln, a halide, nitrate, nitrite, or acetate of MII in addition if x in the basic compositional formula (I) is not 0, and a halide, nitrate, nitrite, or acetate of MI in addition if y in the basic compositional formula (I) is not 0, wherein the solution has a $BaX_2$ concentration of 2.5 mol/L or less if X is Cl or Br, or alternatively, a $BaX_2$ concentration of 5.0 mol/L or less if X is I after the foregoing components are dissolved;

a precipitate forming step for preparing the precipitate of crystals of a phosphor precursor by adding an aqueous solution of an inorganic fluoride salt to the reactant mother liquor kept at 20 to 100° C. while adjusting the adding rate in such a manner that the amount of the precipitate of crystals of a phosphor precursor to be formed during the addition is within the range of from 0.001 to 10 N/minute, where N is the amount of the precipitate of crystals of a phosphor precursor to be finally obtained;

a separating step for separating the precipitate of crystals of a phosphor precursor from the aqueous solution; and a firing step for firing the separated precipitate of crystals of a phosphor precursor while avoiding sintering thereof.

2. A process of claim 1 for preparing the rare earth element-activated, alkaline earth metal fluorohalide based stimulable phosphor, wherein the inorganic fluoride salt is ammonium fluoride or a fluoride of an alkaline metal.

3. A process of claim 1 for preparing the rare earth element-activated, alkaline earth metal fluorohalide based stimulable phosphor, wherein a precision cylinder pump is used for the addition of the aqueous solution of an inorganic fluoride in the precipitate forming step.

4. A process of claim 1 for preparing the rare earth element-activated, alkaline earth metal fluorohalide based stimulable phosphor, wherein the adding rate of the aqueous solution of an inorganic fluoride in the precipitate forming step is adjusted to 0.01 to 1.0 N/minute.

5. A process of claim 1 for preparing the rare earth element-activated, alkaline earth metal fluorohalide based stimulable phosphor, wherein the adding rate of the aqueous solution of an inorganic fluoride salt in the precipitate forming step is constant, or alternatively, varies continuously or discontinuously with respect to addition time.

6. A process for preparing a rare earth element-activated, alkaline earth metal fluorohalide based stimulable phosphor which is represented by the basic compositional formula (I):

$$Ba_{1-x}MII_xFX:yMI,zLn \quad (I)$$

wherein MII represents at least one alkaline earth metal selected from the group consisting of Sr and Ca; MI represents at least one alkaline metal selected from the group consisting of Li, Na, K, Rb, and Cs; X represents at least one halogen selected from the group consisting of Cl, Br, and I; Ln represents at least one rare earth element selected from the group consisting of Ce, Pr, Sm, Eu, Gd, Tb, Tm, and Yb; and x, y, and z represent, respectively, numerals within the ranges of $0 \leq x \leq 0.5$, $0 \leq y \leq 0.05$, and $0 < z \leq 0.2$, and which has a grain size median diameter (Dm) of 1 to 10 μm, σ/Dm of 50% or less where σ is a standard deviation of grain size distribution, and a grain aspect ratio within the range of from 1.0 to 2.0, comprising:

a mother liquor preparing step for preparing a reactant mother liquor which is an aqueous solution containing $BaX_2$, a halide, nitrate, nitrite, or acetate of MII in addition if x in the basic compositional formula (I) is not 0, and a halide, nitrate, nitrite, or acetate of MI in addition if y in the basic compositional formula (I) is not 0 (excluding, however, any of the above components which is to be added simultaneously with an aqueous solution of an inorganic fluoride salt to thereby cause no deficiency thereof), wherein the solution has a $BaX_2$ concentration of 2.5 mol/L or less if X is Cl or Br, or alternatively, a $BaX_2$ concentration of 5.0 mol/L or less if X is I after the foregoing components are dissolved;

a precipitate forming step for preparing the precipitate of crystals of a phosphor precursor by adding an aqueous solution of an inorganic fluoride salt, an aqueous solution containing a water-soluble compound of Ln, and an aqueous solution of a halide, nitrate, nitrite, or acetate of MI and/or an aqueous solution of a halide, nitrate, nitrite, or acetate of MII simultaneously to the reactant mother liquor which has been kept at 20 to 100° C.;

a separating step for separating the precipitate of crystals of a phosphor precursor from the aqueous solution; and a firing step for firing the separated precipitate of crystals of a phosphor precursor while avoiding sintering thereof.

7. A process for preparing the rare earth element-activated, alkaline earth metal fluorohalide based stimulable phosphor of claim 6, wherein, in the precipitate forming step, the aqueous solution of an inorganic fluoride salt is added by adjusting the adding rate thereof in such a manner that the amount of the precipitate of crystals of a phosphor precursor to be formed during the addition is within the range of from 0.001 to 10 N/minute, where N is the amount of the precipitate of crystals of a phosphor precursor to be finally obtained.

8. A process of claim 6 for preparing the rare earth element-activated, alkaline earth metal fluorohalide based stimulable phosphor, wherein the inorganic fluoride salt is ammonium fluoride or a fluoride of an alkaline metal.

9. A process of claim 6 for preparing the rare earth element-activated, alkaline earth metal fluorohalide based stimulable phosphor, wherein the adding rates of the aqueous solutions, which are to be added simultaneously with the aqueous solution of an inorganic fluoride salt and which are other than the solution of an inorganic fluoride salt and the aqueous solution of $BaX_2$, vary continuously or discontinuously during the addition time in the precipitate forming step.

10. A process for preparing a rare earth element-activated, alkaline earth metal fluorohalide based stimulable phosphor which is represented by the basic compositional formula (I):

$$Ba_{1-x}MII_xFX:yMI,zLn \quad (I)$$

wherein MII represents at least one alkaline earth metal selected from the group consisting of Sr and Ca; MI represents at least one alkaline metal selected from the group consisting of Li, Na, K, Rb, and Cs; X represents at least one halogen selected from the group consisting of Cl, Br, and I; Ln represents at least one rare earth element selected from the group consisting of Ce, Pr, Sm, Eu, Gd, Tb, Tm, and Yb; and x, y, and z represent, respectively, numerals within the ranges of $0 \leq x \leq 0.5$, $0 \leq y \leq 0.05$, and $0 < z \leq 0.2$, and which has a grain size median diameter (Dm) of 1 to 10 μm, σ/Dm of 50% or less where σ is a standard deviation of grain size distribution, and a grain aspect ratio within the range of from 1.0 to 2.0, comprising:

a mother liquor preparing step for preparing a reactant mother liquor which is an aqueous solution containing $BaX_2$, a water-soluble compound of Ln, a halide, nitrate, nitrite, or acetate of MII in addition if x in the basic compositional formula (I) is not 0, and a halide, nitrate, nitrite, or acetate of MI in addition if y in the basic compositional formula (I) is not 0 (excluding, however, any of the above components which is to be added simultaneously with an aqueous solution of an inorganic fluoride salt to thereby cause no deficiency thereof), wherein the solution has a $BaX_2$ concentration of 2.5 mol/L or less if X is Cl or Br, or alternatively, a $BaX_2$ concentration of 5.0 mol/L or less if X is I after the foregoing components are dissolved;

a precipitate forming step for preparing the precipitate of crystals of a phosphor precursor by adding an aqueous solution of an inorganic fluoride salt, an aqueous solution containing a water-soluble compound of Ln, and an aqueous solution of a halide, nitrate, nitrite, or acetate of MI and/or an aqueous solution of a halide, nitrate, nitrite, or acetate of MII (excluding the case where both x and y of the basic compositional formula (I) are 0) simultaneously to the reactant mother liquor which has been kept at 20 to 100° C.;

a separating step for separating the precipitate of crystals of a phosphor precursor from the aqueous solution; and a firing step for firing the separated precipitate of crystals of a phosphor precursor while avoiding sintering thereof.

11. A process for preparing a rare earth element-activated, alkaline earth metal fluorohalide based stimulable phosphor which is represented by the basic compositional formula (I):

$$Ba_{1-x}MII_xFX:yMI,zLn \quad (I)$$

wherein MII represents at least one alkaline earth metal selected from the group consisting of Sr and Ca; MI represents at least one alkaline metal selected from the group consisting of Li, Na, K, Rb, and Cs; X represents at least one halogen selected from the group consisting of Cl, Br, and I; Ln represents at least one rare earth element selected from the group consisting of Ce, Pr, Sm, Eu, Gd, Tb, Tm, and Yb; and x, y, and z represent, respectively, numerals within the ranges of $0 \leq x \leq 0.5$, $0 \leq y \leq 0.05$, and $0 < z \leq 0.2$, and which has a grain size median diameter (Dm) of 1 to 10 μm, σ/Dm of 50% or less where σ is a standard deviation of grain size distribution, and a grain aspect ratio within the range of from 1.0 to 2.0, comprising:

a mother liquor preparing step for preparing a reactant mother liquor which is an aqueous solution containing $NH_4X$, a halide, nitrate, nitrite, or acetate of MII in addition if x in the basic compositional formula (I) is not 0, and a halide, nitrate, nitrite, or acetate of MI in addition if y in the basic compositional formula (I) is not 0 (excluding, however, any of the above components which is to be added simultaneously with an aqueous solution of an inorganic fluoride salt to thereby cause no deficiency thereof), wherein the solution has an $NH_4X$ concentration of 4.5 mol/L or less after the foregoing components are dissolved;

a precipitate forming step for preparing the precipitate of crystals of a phosphor precursor by adding an aqueous solution of $BaX_2$, an aqueous solution of an inorganic fluoride salt, an aqueous solution containing a water-soluble compound of Ln, and an aqueous solution of a halide, nitrate, nitrite, or acetate of MI and/or an aqueous solution of a halide, nitrate, nitrite, or acetate of MII, simultaneously and in such a manner that the molar ratio of fluorine in the inorganic fluoride to $BaX_2$ is kept constant, to the reactant mother liquor which has been kept at 20 to 100° C.;

a separating step for separating the precipitate of crystals of a phosphor precursor from the aqueous solution; and a firing step for firing the separated precipitate of crystals of a phosphor precursor while avoiding sintering thereof.

12. A process of claim 11 for preparing the rare earth element-activated, alkaline earth metal fluorohalide based stimulable phosphor, wherein, in the precipitate forming step, the aqueous solution of an inorganic fluoride salt and the aqueous solution of $BaX_2$ are added by adjusting the adding rates thereof in such a manner that the amount of the precipitate of crystals of a phosphor precursor to be formed during the addition is within the range of from 0.001 to 10 N/minute, where N is the amount of the precipitate of crystals of a phosphor precursor to be finally obtained.

13. A process for preparing a rare earth element-activated, alkaline earth metal fluorohalide based stimulable phosphor which is represented by the basic compositional formula (I):

$$Ba_{1-x}MII_xFX:yMI,zLn \qquad (I)$$

wherein MII represents at least one alkaline earth metal selected from the group consisting of Sr and Ca; MI represents at least one alkaline metal selected from the group consisting of Li, Na, K, Rb, and Cs; X represents at least one halogen selected from the group consisting of Cl, Br, and I; Ln represents at least one rare earth element selected from the group consisting of Ce, Pr, Sm, Eu, Gd, Tb, Tm, and Yb; and x, y, and z represent, respectively, numerals within the ranges of $0 \leq x \leq 0.5$, $0 \leq y \leq 0.05$, and $0 < z \leq 0.2$, and which has a grain size median diameter (Dm) of 1 to 10 μm, σ/Dm of 50% or less where σ is a standard deviation of grain size distribution, and a grain aspect ratio within the range of from 1.0 to 2.0, comprising:

a mother liquor preparing step for preparing a reactant mother liquor which is an aqueous solution containing $NH_4X$, a water-soluble compound of Ln, a halide, nitrate, nitrite, or acetate of MII in addition if x in the basic compositional formula (I) is not 0, and a halide, nitrate, nitrite, or acetate of MI in addition if y in the basic compositional formula (I) is not 0 (excluding, however, any of the above components which is to be added simultaneously with an aqueous solution of an inorganic fluoride salt to thereby cause no deficiency thereof), wherein the solution has an concentration of 4.5 mol/L or less after the foregoing components are dissolved;

a precipitate forming step for preparing the precipitate of crystals of a phosphor precursor by adding an aqueous solution of $BaX_2$, an aqueous solution of an inorganic fluoride salt, an aqueous solution containing a water-soluble compound of Ln, and an aqueous solution of a halide, nitrate, nitrite, or acetate of MI and/or an aqueous solution of a halide, nitrate, nitrite, or acetate of MII (excluding the case where both x and y of the basic compositional formula (I) are 0), simultaneously and in such a manner that the molar ratio of fluorine in the inorganic fluoride to $BaX_2$ is kept constant, to the reactant mother liquor which has been kept at 20 to 100° C.;

a separating step for separating the precipitate of crystals of a phosphor precursor from the aqueous solution; and a firing step for firing the separated precipitate of crystals of a phosphor precursor while avoiding sintering thereof.

14. A process for preparing a rare earth element-activated, alkaline earth metal fluorohalide based stimulable phosphor which is represented by the basic compositional formula (I):

$$Ba_{1-x}MII_xFX:yMI,zLn \qquad (I)$$

wherein MII represents at least one alkaline earth metal selected from the group consisting of Sr and Ca; MI represents at least one alkaline metal selected from the group consisting of Li, Na, K, Rb, and Cs; X represents at least one halogen selected from the group consisting of Cl, Br, and I; Ln represents at least one rare earth element selected from the group consisting of Ce, Pr, Sm, Eu, Gd, Tb, Tm, and Yb; and x, y, and z represent, respectively, numerals within the ranges of $0 \leq x \leq 0.5$, $0 \leq y \leq 0.05$, and $0 < z \leq 0.2$, and which has a grain size median diameter (Dm) of 1 to 10 μm, σ/Dm of 50% or less where σ is a standard deviation of grain size distribution, and a grain aspect ratio within the range of from 1.0 to 2.0, comprising:

a mother liquor preparing step for preparing a reactant mother liquor which is an aqueous solution containing $NH_4X$, a water-soluble compound of Ln, a halide, nitrate, nitrite, or acetate of MII in addition if x in the basic compositional formula (I) is not 0, and a halide, nitrate, nitrite, or acetate of MI in addition if y in the basic compositional formula (I) is not 0, wherein the solution has an $NH_4X$ concentration of between 2.0 and 4.5 mol/L;

a precipitate forming step for preparing the precipitate of crystals of a phosphor precursor by adding an aqueous solution of an inorganic fluoride salt and an aqueous solution of $BaX_2$, in such a manner that the molar ratio of fluorine in the inorganic fluoride salt to $BaX_2$ is kept constant, to the reactant mother liquor which has been kept at 20 to 100° C.;

a separating step for separating the precipitate of crystals of a phosphor precursor from the aqueous solution; and a firing step for firing the separated precipitate of crystals of a phosphor precursor while avoiding sintering thereof;

wherein, in the precipitate forming step, the average adding rates of the aqueous solution of an inorganic fluoride salt and the aqueous solution of $BaX_2$ in the period ranging from the start of the addition to t (0<t<T, where T indicates the time when the addition ends) are faster than the average adding rates, respectively, in the period ranging from t to T.

15. A process of claim 14 for preparing the rare earth element-activated, alkaline earth metal fluorohalide based stimulable phosphor, wherein the precipitate forming step consists of a first precipitate forming step and a second precipitate forming step.

16. A process of claim 15 for preparing the rare earth element-activated, alkaline earth metal fluorohalide based stimulable phosphor, wherein N and $N_1$ satisfy the following relational expression where N is the amount of the precipitate of crystals of a phosphor precursor to be finally obtained and $N_1$ is the amount of the crystals of a phosphor precursor to be precipitated in the first precipitate forming step.

$$0<(N_1/N)\leqq 0.8$$

17. A process of claim 15 for preparing the rare earth element-activated, alkaline earth metal fluorohalide based stimulable phosphor, wherein, in the precipitate forming step, the curve indicating the change with time of the adding rate of the aqueous solution of an inorganic fluoride salt and the aqueous solution of $BaX_2$ has an inflection or bending point numbering n (where n represents a natural number of 1 or greater) and the first precipitate forming step is defined by the time ranging from the start of addition to the inflection or bending point if n=1, while the first precipitate forming step is defined by the time ranging from the start of addition to the midpoint between the first inflection or bending point and the second first inflection or bending point if n $\leqq$ 2.

18. A process of claim 15 for preparing the rare earth element-activated, alkaline earth metal fluorohalide based stimulable phosphor, wherein the second precipitate forming step is carried out consecutively after the first precipitate forming step, or the second precipitate forming step is carried out when a certain period of time has passed after the first precipitate forming step.

19. A process for preparing the rare earth element-activated, alkaline earth metal fluorohalide based stimulable phosphor of claim 14, wherein the adding rates of the aqueous solution of $BaX_2$ and the solution of an inorganic fluoride are kept constant or vary continuously or discontinuously with respect to addition time in the precipitate forming step.

20. A process of claim 14 for preparing the rare earth element-activated, alkaline earth metal fluorohalide based stimulable phosphor, wherein the inorganic fluoride salt is ammonium fluoride or a fluoride of an alkaline metal.

21. A process of claim 14 for preparing the rare earth element-activated, alkaline earth metal fluorohalide based stimulable phosphor, wherein the adding rates of the solution of an inorganic fluoride salt and the aqueous solution of $BaX_2$ are adjusted so that the amount of the precipitate of crystals of a phosphor precursor to be formed during the addition is within the range of from 0.001 to 10 N/minute, where N is the amount of the precipitate of crystals of a phosphor precursor to be finally obtained.

22. A process for preparing a rare earth element-activated, alkaline earth metal fluorohalide based stimulable phosphor which is represented by the basic compositional formula (I):

$$Ba_{1-x}MII_xFX:yMI,zLn \quad (I)$$

wherein MII represents at least one alkaline earth metal selected from the group consisting of Sr and Ca; MI represents at least one alkaline metal selected from the group consisting of Li, Na, K, Rb, and Cs; X represents at least one halogen selected from the group consisting of Cl, Br, and I; Ln represents at least one rare earth element selected from the group consisting of Ce, Pr, Sm, Eu, Gd, Tb, Tm, and Yb; and x, y, and z represent, respectively, numerals within the ranges of $0\leqq x\leqq 0.5$, $0\leqq y\leqq 0.05$, and $0<z\leqq 0.2$, and which has a grain size median diameter (Dm) of 1 to 10 μm, σ/Dm of 50% or less where σ is a standard deviation of grain size distribution, and a grain aspect ratio within the range of from 1.0 to 2.0, comprising:

a mother liquor preparing step for preparing a reactant mother liquor which is an aqueous solution containing $NH_4X$, a water-soluble compound of Ln, a halide, nitrate, nitrite, or acetate of MII in addition if x in the basic compositional formula (I) is not 0, and a halide, nitrate, nitrite, or acetate of MI in addition if y in the basic compositional formula (I) is not 0, wherein the solution has an $NH_4X$ concentration of between 2.0 and 4.5 mol/L after the foregoing components are dissolved, and for keeping the reactant mother liquor at 20 to 100° C. while being stirred;

a crystal nuclei forming step for forming crystal nuclei of the crystals of a phosphor precursor by stirring the aqueous solution of an inorganic fluoride salt and the aqueous solution of $BaX_2$ at a high speed while these solutions are being added and introducing the reacted suspension into the reactant mother liquor which is kept at 20 to 100° C. and stirred;

a precipitate forming step for preparing the precipitate of crystals of a phosphor precursor by adding the aqueous solution of $BaX_2$ and the aqueous solution of an inorganic fluoride salt in such a manner that the molar ratio of fluorine in the inorganic fluoride salt to $BaX_2$ is kept constant to the reactant mother liquor which contains the suspension and is kept at 20 to 100° C.;

a separating step for separating the precipitate of crystals of a phosphor precursor from the aqueous solution; and a firing step for firing the separated precipitate of crystals of a phosphor precursor while avoiding sintering thereof.

23. A process of claim 22 for preparing the rare earth element-activated, alkaline earth metal fluorohalide based stimulable phosphor, wherein, in the precipitate forming step, the adding rates of the solution of an inorganic fluoride salt and the aqueous solution of $BaX_2$ are adjusted so that the amount of the precipitate of crystals of a phosphor precursor to be formed during the addition is within the range of from 0.001 to 10 N/minute, where N is the amount of the precipitate of crystals of a phosphor precursor to be finally obtained.

24. A process of claim 22 for preparing the rare earth element-activated, alkaline earth metal fluorohalide based stimulable phosphor, wherein, in the crystal nuclei forming step, the adding rates of the solution of an inorganic fluoride salt and the aqueous solution of $BaX_2$ are adjusted so that the amount of the crystal nuclei of a phosphor precursor to be formed in the crystal nuclei forming step is between 0 and 0.8N, where N is the amount of the crystals of a phosphor precursor to be finally obtained in the precipitate forming step.

25. A process of claim 22 for preparing the rare earth element-activated, alkaline earth metal fluorohalide based stimulable phosphor, wherein the inorganic fluoride salt is ammonium fluoride or a fluoride of an alkaline metal.

26. A process of claim 22 for preparing the rare earth element-activated, alkaline earth metal fluorohalide based stimulable phosphor, wherein, in the crystal nuclei forming step, the solution of an inorganic fluoride salt and the aqueous solution of $BaX_2$ are stirred at a high speed using an instant reactor.

27. A process for preparing a rare earth element-activated, alkaline earth metal fluorohalide based stimulable phosphor which is represented by the basic compositional formula (I):

$$Ba_{1-x}MII_xFX:yMI,zLn \qquad (I)$$

wherein MII represents at least one alkaline earth metal selected from the group consisting of Sr and Ca; MI represents at least one alkaline metal selected from the group consisting of Li, Na, K, Rb, and Cs; X represents at least one halogen selected from the group consisting of Cl, Br, and I; Ln represents at least one rare earth element selected from the group consisting of Ce, Pr, Sm, Eu, Gd, Tb, Tm, and Yb; and x, y, and z represent, respectively, numerals within the ranges of $0 \leq x \leq 0.5$, $0 \leq y \leq 0.05$, and $0 < z \leq 0.2$, and which has a grain size median diameter (Dm) of 1 to 10 μm, σ/Dm of 50% or less where σ is a standard deviation of grain size distribution, and a grain aspect ratio within the range of from 1.0 to 2.0, comprising:

a mother liquor preparing step for preparing a reactant mother liquor which is an aqueous solution containing $BaX_2$, a water-soluble compound of Ln, a halide, nitrate, nitrite, or acetate of MII in addition if x in the basic compositional formula (I) is not 0, and a halide, nitrate, nitrite, or acetate of MI in addition if y in the basic compositional formula (I) is not 0, wherein the solution has a $BaX_2$ concentration of 2.5 mol/L or less if X is Cl or Br, or alternatively, a $BaX_2$ concentration of 5.0 mol/L or less if X is I after the foregoing components are dissolved, and for keeping the reactant mother liquor at 20 to 100° C. while being stirred;

a crystal nuclei forming step for forming crystal nuclei of the crystals of a phosphor precursor by stirring the aqueous solution of an inorganic fluoride salt and the aqueous solution of $BaX_2$ at a high speed while these solutions are being added and introducing the reacted suspension into the reactant mother liquor which is kept at 20 to 100° C. and stirred;

a precipitate forming step for preparing the precipitate of crystals of a phosphor precursor by adding the aqueous solution of an inorganic fluoride salt to the reactant mother liquor which contains the suspension and is kept at 20 to 100° C.;

a separating step for separating the precipitate of crystals of a phosphor precursor from the aqueous solution; and a firing step for firing the separated precipitate of crystals of a phosphor precursor while avoiding sintering thereof.

28. A process of claim 27 for preparing the rare earth element-activated, alkaline earth metal fluorohalide based stimulable phosphor, wherein, in the precipitate forming step, the adding rate of the solution of an inorganic fluoride is adjusted so that the amount of the precipitate of crystals of a phosphor precursor to be formed during the addition is within the range of from 0.001 to 10 N/minute, where N is the amount of the precipitate of crystals of a phosphor precursor to be finally obtained.

* * * * *